(12) United States Patent
Wanke et al.

(10) Patent No.: US 7,681,960 B2
(45) Date of Patent: Mar. 23, 2010

(54) METHOD AND SYSTEM FOR IMPROVING THE DRIVING BEHAVIOR OF A VEHICLE

(75) Inventors: Peter Wanke, Frankfurt (DE); Torsten Herrmann, Frankfurt am Main (DE); Mario Roszyk, Eppstein (DE); Thorsten Wickenhöfer, Frankfurt am Main (DE); Matthias Pank, Oberursel (DE); Jochen Konanz, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 894 days.

(21) Appl. No.: 11/417,278

(22) Filed: Apr. 28, 2006

(65) Prior Publication Data

US 2006/0273657 A1 Dec. 7, 2006

Related U.S. Application Data

(63) Continuation-in-part of application No. PCT/EP2004/052689, filed on Oct. 28, 2004.

(30) Foreign Application Priority Data

Oct. 28, 2003 (DE) ................. 103 50 398

(51) Int. Cl.
*B60T 8/60* (2006.01)
(52) U.S. Cl. ......................... 303/146; 701/72
(58) Field of Classification Search ............. 303/146, 303/147, 148; 701/72
See application file for complete search history.

(56) References Cited

U.S. PATENT DOCUMENTS

| 4,998,593 | A | * | 3/1991 | Karnopp et al. | 303/146 |
| 5,172,961 | A | * | 12/1992 | Inoue et al. | 303/146 |
| 5,668,724 | A | | 9/1997 | Ehret et al. | |
| 5,694,321 | A | | 12/1997 | Eckert et al. | |
| 6,289,272 | B1 | | 9/2001 | Batistic et al. | |
| 6,611,747 | B1 | | 8/2003 | Schmitt et al. | |
| 6,625,527 | B1 | | 9/2003 | Ding et al. | |
| 6,957,873 | B2 | * | 10/2005 | Wanke et al. | 303/146 |
| 2004/0046447 | A1 | | 3/2004 | Wanke et al. | |
| 2004/0130210 | A1 | | 7/2004 | Wanke et al. | |
| 2005/0004738 | A1 | * | 1/2005 | Gronau et al. | 701/70 |

FOREIGN PATENT DOCUMENTS

WO WO 03002392 A1 * 1/2003

* cited by examiner

*Primary Examiner*—Thomas J Williams

(57) ABSTRACT

A method for a Sensitive Electronic Stability Program (SESP) presents a general approach for the correction of maneuvers of turning into a bend at low speed. It integrates existing methods as well as subsequent extensions. SESP supplements the standard active yaw control (AYC) function. This allows the SESP to use variables and mechanisms of AYC, on the one hand. On the other hand, AYC continues operating unimpeded in the background and will intervene as usual when SESP cannot stabilize the vehicle appropriately. When the standard AYC intervenes, SESP control operations are forbidden, or running SESP control operations are stopped. This stop can take place either abruptly or (which is more comfortable) by way of a moderate decrease of the correcting variables.

1 Claim, 32 Drawing Sheets

METHOD AND SYSTEM FOR IMPROVING THE DRIVING BEHAVIOR OF A VEHICLE

This patent application is a Continuation-In-Part of the International Patent Application PCT/EP2004/052689, international filing date Oct. 28, 2004.

BACKGROUND OF THE INVENTION

1. General Structure of Driving Stability Control (DSC)

The term driving stability control (DSC) covers four principles of influencing the driving behavior of a vehicle by means of predeterminable pressures in individual wheel brakes and by interfering with the engine management of the driving engine. These include brake slip control (ABS) which is to prevent locking of individual wheels during a brake operation, traction slip control (TCS), which prevents the spinning of the driven wheels; the electronic brake force distribution system (EBD), which controls the ratio of the brake forces between the front and the rear axle of the vehicle; and a yaw torque control system (YTC), which ensures stable driving conditions during travel in a curve.

Consequently, a vehicle is defined in this connection as a motor vehicle with four wheels, which is equipped with a hydraulic brake system. In a hydraulic brake system, brake pressure can be built up by the driver by means of a pedal-actuated master cylinder. Each wheel has a brake, with which one inlet valve and one outlet valve each is associated. The wheel brakes communicate with the master cylinder by way of the inlet valves, while the outlet valves lead to a pressureless tank or to a low-pressure accumulator. Finally, there also is an auxiliary pressure source, which is able to build up a pressure in the wheel brakes regardless of the position of the brake pedal. The inlet and outlet valves can be electromagnetically actuated for pressure regulation in the wheel brakes.

To detect states in the dynamics of the vehicle movement, there are four speed sensors, one per wheel, one yaw rate meter, one lateral accelerometer, and at least one pressure sensor for the brake pressure generated by the brake pedal. The pressure sensor may be replaced with a pedal travel or pedal force meter if the auxiliary pressure source is arranged such that a brake pressure built up by the driver is not distinguishable from that of the auxiliary pressure source. In addition, it is possible to poll information about the condition of the transmission, e.g. about gearshift control, etc.

A fall-back solution is advantageously put into practice in light of such a large number of sensors. This means that, in the case of failure of part of the sensor system, only the component of the control system that depends on that part is switched off. If, for example, the yaw rate meter fails, no yaw torque control can be performed, but the ABS, TCS and EBD systems continue to function. The driving stability control can consequently be limited to these other three functions.

In a driving stability control, the driving behavior of a vehicle is influenced such that the driver will be better able to master the vehicle in critical situations, or critical situations will be avoided to begin with. A critical situation is defined herein as an unstable driving condition in which, in the extreme case, the vehicle does not follow the driver's instructions. The function of the driving stability control is consequently to impart to the vehicle the behavior desired by the driver in such situations within the physical limits.

While the longitudinal slip of the tires on the road surface is mainly of significance for the brake slip control system, the traction slip control system and the electronic brake force distribution system, the yaw torque control system (YTC) also involves additional variables, e.g., the yaw rate $\dot{\Psi}$.

Various vehicle reference models may be used for yaw torque control. The calculation is simplest on the basis of a single-track model, i.e., the front wheels and the rear wheels are integrated in this model into one wheel each, which is located on the longitudinal axis of the vehicle. The calculations become considerably more complicated if they are based on a two-track model. However, since lateral displacements of the center of gravity (rolling movements) can also be taken into account in the two-track model, the results are more accurate.

The system equations $$\dot{\beta} = c_{11}\frac{\beta}{v} - \dot{\Psi} + c_{12}\frac{\dot{\Psi}}{v^2} + c_{13}\frac{\delta}{v} \qquad \text{F 1.1}$$

$$\ddot{\Psi} = c_{21}\beta + c_{22}\frac{\dot{\Psi}}{v} + c_{23}\delta \qquad \text{F 1.2}$$

can be written in the phase space diagram for a single-track model.

The sideslip angle $\beta$ and the yaw rate $\dot{\Psi}$ represent the phase variables of the system. The input variable acting on the vehicle is the steering angle $\delta$, as a result of which the vehicle receives the yaw rate $\dot{\Psi}$ as an output variable. The model coefficients $c_{ii}$ are formed as follows:

$$c_{11} = -\frac{c_h + c_v}{m} \quad c_{12} = \frac{c_h l_h - c_v l_v}{m} \quad c_{13} = \frac{c_v}{m} \qquad \text{F 1.3}$$

$$c_{21} = \frac{c_h l_h - c_v l_v}{\Theta} \quad c_{22} = -\frac{c_h l_h^2 + c_v l_v^2}{\Theta} \quad c_{23} = \frac{c_v l_v}{\Theta}$$

$c_h$ and $c_v$ are the resulting rigidities from the elasticity of the tire, wheel suspension and steering on the rear axle and the front axle, respectively. $l_h$ and $l_v$ are the distances of the rear axle and the front axle, respectively, from the center of gravity of the vehicle. $\Theta$ is the moment of inertia of the vehicle, i.e., the moment of inertia of the vehicle around its vertical axis.

Longitudinal forces and displacements of the center of gravity are taken into account in this model. This approximation is also valid only for low angular velocities. Consequently, the accuracy of this model decreases with decreasing curve radii and increasing velocities. However, the amount of calculations is manageable. Further explanations of this single-track model can be found in the book Fahrwerktechnik: Fahrverhalten [Chassis Engineering: Driving Behavior] by Adam Zomotor, Vogel Buchverlag, Wurzburg, 1987.

A two-track model, whose accuracy is superior to that of a single-track model, is proposed for a vehicle in DE-40 30 704 A1. The yaw rate $\dot{\Psi}$ and the sideslip angle $\beta$ form the phase variables in this case as well. However, when a two-track model is used, it is necessary to consider the fact that an enormous calculation capacity is needed to make it possible to perform a control intervention in a relatively short time.

The methods and the control systems are used to create an additional torque by targeted interventions at the individual brakes of a vehicle, which torque leads by way of the actually measured yaw variation per time unit (actual yaw rate) of a vehicle to the yaw variation per time unit (desired yaw rate) which is influenced by the driver. Hence, a method and a control system will particularly intervene in a supporting manner into the steering performance of the vehicle when due to certain conditions (e.g. excessive speed, slippery roadway) the curved track actually covered by the vehicle does not correspond to the curved track desired by the driver without additional torque. In principle, methods and control systems of this type to improve driving stability have already been described comprehensively and, therefore, shall not be explained again in detail. In methods and control systems of this type, input parameters which result from the curved track desired by the driver (e.g. steering wheel angle, driving speed) are always sent to a vehicle model circuit which, on the basis of a known single-track model or another driving model, determines a nominal yaw rate ($\psi_{Desired}$) from these input parameters and from parameters being characteristic of the driving performance of the vehicle, yet also from quantities (coefficient of friction of the roadway) predetermined by the characteristics of the ambience, which yaw rate is compared to the measured actual yaw rate ($\psi_{actual}$). The difference of the yaw angles ($\Delta\psi_{Diff}$) is converted by means of a yaw torque controller into an additional yaw torque $M_G$ which forms the input parameter of a distribution logic unit.

The distribution logic unit itself defines the brake pressure to be applied to the individual brakes, optionally in dependence on the braking request of the driver demanding a defined brake pressure at the wheel brakes. This brake pressure shall produce an additional torque at the vehicle, in addition to the optionally desired brake effect, which supports the driving behavior of the vehicle in the direction of complying with the steering request of the driver.

If due to external conditions during driving or conditions being due to the performance of the driver, variations of the vehicle-dynamic driving performance (e.g. changes in the coefficient of friction) will occur, e.g. a change in the engine torque, e.g. due to release of the accelerator or push-down of the accelerator, or due to braking, the driving behavior of the vehicle will change because, among others, there will be a change of the axle load and, thus, of forces which is induced by the interaction of several influences such as tire influences, kinematical influences and elasto-kinematical influences.

For example, when driving through a curve and release of the accelerator occurs, the driving forces $F_a$ are active at the drive wheels prior to the release of the accelerator. Due to the lateral deformation of the tire contact area, the longitudinal driving force $F_A=2\times F_a$ will act in dependence on the lateral forces slightly outside the wheel center plane. An understeering yaw torque ($\Psi_{understeer}$) is produced due to the longitudinal driving force $F_A$ that acts asymmetrically in relation to the vehicle longitudinal axis.

After the release of the accelerator, the engine (and other resistances) slows down the vehicle, the (longitudinal) driving forces become negative. In addition, the deceleration produces an inertia force mx in the point of gravity SP, with the result that the axle load increases at the front wheels and decreases by the same amount at the rear wheels. Thus, the distribution of the transmittable lateral forces changes. The lateral force change (lateral force on the front axle rises slightly and decreases greatly at the rear axle) produces an oversteering yaw torque ($\Psi_{oversteer}$), the slip angles at the rear axle will increase and the vehicle turns into the curved track. When the engine torque is changed from driving force into brake force, the reversal of theses torques will induce a change of the driving behavior of the vehicle from an oversteering to an understeering driving behavior.

There are methods fulfilling only partial aspects of the mentioned requirement.

Thus, the function 'ABS-plus' is known for partial brake operations in the curve. This function achieves stabilization of the vehicle by pressure reduction on the inside wheels in a turn. However, ABS-plus detects the vehicle performance exclusively from the measured wheel speeds.

When the driver slows down in a curve to such an extent that ABS control is triggered, already the ABS function itself is often capable of counteracting the tendency of turning into a bend. The reason for this is that a greater vertical force and, thus, a higher potential of longitudinal force prevails on the exterior curve side than on the interior curve side. ABS safeguards the optimum utilization of the longitudinal force potential. The resulting unbalance of forces will then bring about a stabilizing yaw torque.

It is disadvantageous that these methods do not have a controller of their own but share the yaw torque controllers with the standard ESP. Their effect evolves because they take influence on the parameters of the YTC controllers (e.g. decrease of the control thresholds).

The previous methods suffer from the following disadvantages:
1. Each method acts only in one or in a few defined driving situations and is limited to one defined intervention strategy only.
2. Each method includes non-optimal partial solutions; e.g. the comfort is optimal in one method because the hydraulic pump provides its full output for pressure build-up. In the other method, the reference yaw rate is not used continuously.
3. To cover a rising number of driving situations by a simultaneous activation of an increasing rate of single methods will quickly reach limits because the ranges of influence (driving situations) of the methods can overlap each other what is not desired, or they may leave gaps, and the intervention strategies contradict each other in part.

In view of the above, an object of the invention is to provide a method and a control system for improving the driving behavior of a vehicle which influences the driving behavior of a vehicle in such a manner that it is adapted early and comfortably to the desired driving behavior depending on the driving situation. Another objective is to enhance the sensitivity of response of the control.

SUMMARY OF THE INVENTION

This object is achieved in that driving situations with almost steady-state courses of the vehicle at a steering angle velocity of lower than, or equal to, 120°/s are observed and analyzed in the driving situation detection system, and the driving situation detection system is designed as a state machine which detects at least one of the states such as straight travel with partial braking, cornering with partial braking, and/or cornering with a change of load, and activates a controller depending on the states which reflect a course deviation.

One embodiment of the driving situation detection system is connected to a reference signal model in which a YTC reference variable with an offset is corrected, with the driving situation detection system determining the time at which the offset correction is started and terminated and the offset value is superposed on the reference variable at the starting point.

The device for controlling the yaw performance of a two-axle, four-wheel vehicle is equipped with a hydraulic brake system that includes a brake for each wheel, and with at least one sensor system or models for gathering or calculating, respectively, the wheel speeds, the lateral acceleration, the yaw velocity, the steering angle, and/or the steering angle speed. It is also equipped with at least two electronic yaw torque controllers, with the first controller realizing an additional yaw torque $MG_{SESP}$ to improve the track performance of the vehicle depending on a comparison between nominal and actual yaw rates below the ESP intervention threshold and the second controller putting this torque into practice to stabilize the driving state of the vehicle above the ESP intervention threshold by a corresponding brake application.

In a first situation detection system, different driving situations such as straight travel, cornering, and the like, are distinguished and taken into consideration in the control. This control is active or inactive depending on control thresholds. Another driving situation detection system is provided in which almost steady-state shapes of the course of the vehicle with a steering angle speed of lower than, or equal to, 120°/s are observed and analyzed, and depending on expected or actually determined deviations in the steady-state range indicative of the driver's request and the vehicle state, and activates a modification of a reference value representing the desired course of the vehicle when the control by the ESP controller is inactive.

An embodiment of the driving stability control further determines the desired course of the vehicle in the ESP control and evaluates deviations from the desired course, and it determines during a desired course of driving if there is a tendency of a subsequent deviation from course due to a partial braking situation or load change situation.

The rotational performance of the vehicle is measured and evaluated as an input variable of the control system, wherein logical linking of the yaw rate with the course of the vehicle desired by the driver is used to produce control variables for changing the vehicle course, and the control variables are set inactive or active to change the vehicle course depending on control thresholds. The control thresholds are changed depending on driving situations, and with an almost steady-state shape of the course of the vehicle at a steering angle velocity of lower than, or equal to, 120°/s deviations from the desired vehicle course are observed and analyzed. With expected or actually determined deviations in the steady-state range, a reference value representing the desired course of the vehicle is modified when the control thresholds are below the ESP control thresholds.

An embodiment of the method provides that the model-based vehicle reference speed is calculated from the sensor signals of the driving stability control DSC.

Another detail of the method includes that the model-based vehicle reference speed is determined from the yaw velocity, the steering wheel angle, and/or the lateral acceleration and/or their derivatives or substitute signals, respectively.

The method SESP (Sensitive Electronic Stability Program) is applicable to slow maneuvers of turning into a bend. Such a driving situation exists when all subsequently mentioned conditions are satisfied:

1. The driver wishes steady-state driving, that, means his steering dynamics is at a relatively low rate. This may concern both straight travel and cornering.
2. The vehicle follows the driver's request at least in the beginning.
3. A deviation from the course is slowly developing during steady-state driving in the sense that the vehicle leaves the desired straight travel or turns to the inside of a bend in the desired cornering maneuver ('oversteering').
4. There is a measurable cause advanced in time for the deviation from the course.

Due to the restriction to oversteering situations, in particular such causes are at issue in this respect which result in an asymmetrical distribution of the wheel longitudinal forces (e.g. inhomogeneous roadway, asymmetrical brake wear) during straight travel, while they induce a shift of the wheel lateral force potential to the front axle (e.g. braking maneuver or change of load) during cornering.

Meanwhile, there is a demand in the automotive industry that the ESP controller (ESP (YTC)=Electronic Stability Program) assists the driver in governing such slow maneuvers of turning into a bend. As this occurs, it is desired that the correcting interventions shall be unnoticed by the driver to the greatest extent possible.

The standard AYC(YTC)-module (AYC=Active Yaw Control) of the ESP controller satisfies this demand only insufficiently because it intervenes only in the event of noticeable course deviations for reasons of robustness, and these interventions are often felt distinctly by the driver, e.g. by feedback of the pressure increases through the brake pedal and through the steering wheel.

Therefore, the AYC-module must be extended to comply with the desired purpose.

The new method SESP presents a general approach for the correction of maneuvers of turning into a bend in the sense of the requirement described hereinabove. It offers a structure which is appropriate to integrate existing methods as well as subsequent extensions. FIG. 35 shows the structure of SESP.

SESP is designed to be a supplement to the standard AYC function. This allows the SESP to use variables and mechanisms of AYC, on the one hand. On the other hand, AYC continues operating unimpeded in the background and will intervene as usual when SESP cannot stabilize the vehicle appropriately. When the standard AYC intervenes, SESP control operations are forbidden, or running SESP control operations are stopped. This stop can take place either abruptly or (what is more comfortable) by way of a moderate decrease of the correcting variables, FIG. 35.

The single elements of SESP will be described briefly in the following.

The driving situation detection system uses information about the driver's request (e.g. steering wheel angle, engine torque demand, brake pressure) and the current vehicle state (e.g. lateral acceleration, estimated curve radius, speed) in order to decide whether there is a potential turning situation. The detection is configured as a state machine. FIG. 30 shows as an example the possible states and permitted state transitions in the current SESP realization. The use of a state machine safeguards the unambiguousness of the detected driving situation. Making a distinction between several states is necessary in order to adapt the SESP controller optimally to the current driving situation. It is constantly checked in a parallel fashion (e.g. by way of the AYC state, ABS state, transversal inclination of the roadway, vehicle speed) whether SESP interventions are permitted. The state 'SESP inactive' is instantaneously assigned in the event of a negative result. Some causes of turning (e.g. change of load) naturally have an effect on the vehicle performance which is only limited in time. In these cases, the respective state in the SESP driving situation detection system is left again after a defined time. Another argument for the temporal limitation of such states is that the driver is frequently able to master slow turning maneuvers after a certain 'time of adaptation' by himself.

As has been mentioned before, the detected state of the driving situation detection system is used to activate the SESP controllers and to adapt their parameters optimally to the current driving situation (e.g. the control thresholds). In order to be able to trigger the sensitive SESP controllers as early as possible, the SESP driving situation detection system not only assesses the vehicle reaction but already the causes before the reaction. In addition to influencing the parameters of the controller, another objective of the driving situation detection system is to indicate to the reference signal formation unit when the offset for the offset correction of the reference variables shall be stored. This is likewise done already whenever a possible cause for a turning situation is detected.

SESP uses the principle of an offset correction for the reference signal formation. The driver's request is represented by the SESP reference yaw rate. Compared to the AYC reference yaw rate, the SESP reference yaw rate has an offset which is just so high that the SESP yaw rate deviation is zero at the commencement of the load change or the braking intervention.

Due to this offset, possible uncompensated offsets of the yaw rate sensor are compensated, on the one hand. This is necessary to prevent control errors of the sensitive SESP yaw rate controller. On the other hand, only the deviations from the current vehicle performance are regulated by the offset compensation.

FIG. 31 shows the formation of the SESP reference yaw rate for the case of a positive yaw rate sensor offset.

The number and type of the SESP controllers can be made dependent on the case of application. The regulating variable of the controller is the yaw rate, and an additional yaw torque is the correcting variable. However, it is also easily possible to consider e.g. the regulating variable, namely, sideslip angle velocity, or the correcting variable, namely, additional engine torque. Further possible correcting variables are (if corresponding actuators are provided): additional steering angle, change of the spring/damper characteristics, change of the engine torque distribution between front and rear axles. The purpose of the yaw torque controller is to calculate the additional yaw torque, which is necessary for the vehicle stabilization, from the deviation of the actual yaw rate from the SESP reference yaw rate.

The controller configured as a pure p-controller includes a threshold for the SESP yaw rate deviation as an activation criterion apart from the existence of a permitted driving situation. Depending on the driving situation, this threshold is maximally as high as in the case of the standard AYC yaw rate controller, see FIG. 33. Another threshold is used for the situation 'load change in the curve'.

In the SESP module 'arbitration', all equal correcting variables (e.g. additional yaw torques) of the SESP controllers are combined according to defined priority rules. The selection of these priority rules can again be made dependent on the case of application. Maximum, addition and suppressing contradicting demands are well-known examples for such rules. An additional objective of the arbitration is to coordinate the SESP correcting variables with the demands of other controllers (in particular of standard-AYC) and to ensure 'smooth' transitions if requested.

The correcting variables are put into practice in the last step. In doing so, it has to be taken into account that the driver must not feel the SESP interventions, if possible. This also involves that he/she does not receive any information about SESP interventions from the combination instrument. Standard mechanisms of the ESP controller are co-used in this step. An interface conveys the strategy desired by SESP to these mechanisms.

The application of the additional yaw torque in the current SESP realization will be explained as an example in the following, cf. FIG. 32. It is initially checked whether the driver brakes using a minimum pressure. In the affirmative, the additional yaw torque is realized by way of pressure reduction at the inside rear wheel in a turn. This type of intervention is comfortable because it manages, on the one hand, with highly reduced valve and pump activities, as compared to an active pressure buildup, and avoids a reaction through the steering system by intervention at the rear axle, on the other hand. In addition, the increase of the lateral force potential of the inside rear wheel in a turn supports the transverse stability of the vehicle. Pressure is additionally reduced at the inside front wheel in a turn, if required. When the brake pressure of the driver is below the initially mentioned minimum pressure, the additional yaw torque is realized by way of pressure increase at the outside rear wheel in a turn and, if required, at the outside front wheel in a turn in addition. To maintain the lateral force potential of the wheel concerned, the pressure is limited in an upward direction to the level of the maximum longitudinal force between wheel and road (by employing an already existing 'slip monitor'). To prevent this pressure level from being exceeded in any case, the ABS controller is moved to a sensitive mode with a view to achieving double safety. Simultaneously, the EBD controller is disabled to prevent undesirable pressure limitations. To ensure the comfort of the SESP pressure increase mode, the wheel pressure is adjusted by means of the already existing low-noise method 'EVR (Electrical Reversing Valve) control'.

To minimize the risk of a destabilization of the rear axle due to active pressure build-up when a low coefficient of friction of the roadway prevails, it is suggested to distribute the more pressure from the curve-outside rear wheel to the curve-outside front wheel, the lower the estimated coefficient of friction of the roadway is. Further, it can be favorable to choose a gradual transition instead of the 'binary' decision between pressure reduction mode and pressure increase mode in such a manner that initially the potential for pressure reduction is utilized. The part of the additional yaw torque which thereafter is possibly not yet taken into account will then be realized by a pressure increase in the manner described above within the limits of the available longitudinal force potential. This part would be left out of account in the case of a purely 'binary' decision, FIG. 32.

If the information is available in the ESP controller that the vehicle has a trailer, it is suggested to use this information for SESP to the effect that the vehicle longitudinal deceleration, which is produced by SESP interventions (such as pressure build-up), is limited to a level that does not destabilize the trailer. In the simplest case, SESP pressure build-up can e.g. be prevented when a trailer is detected.

In order to comply with correcting variables, it is to be noted that if several actuators are provided for one correcting variable, it is necessary to proportionally share the correcting variable among the actuators. E.g. comfort or efficacy is applicable as distribution criteria. The criterion reaction time can be considered e.g. according to the following principle. To begin with, the correcting variable is submitted completely to the quickest responding actuator. The component which cannot be realized by this actuator is then submitted to the second quickest actuator, etc. A minimum total reaction time is reached with this principle.

It is to be understood in addition that in order to comply with the additional yaw torque, it is initially checked whether the driver is braking with a minimum pressure of e.g. 20 bar. In the affirmative, the additional yaw torque is put into practice by a comfortable pressure reduction at the inside rear wheel in a turn (and, optionally, at the inside front wheel in a turn).

When the brake pressure of the driver is below the initially mentioned minimum pressure, the total additional yaw torque is realized by way of pressure build-up at the outside rear wheel in a turn. In order to maintain the lateral force potential of the wheel concerned, the pressure is limited in an upward direction to the level of the maximum longitudinal force between wheel and road (by employing an already existing 'wheel slip monitor'). To prevent this pressure level from being exceeded in any case, the ABS controller is set to a sensitive mode with a view to achieving double safety. Simultaneously, activation of the EBD controller is prevented to rule out undesirable pressure limitations.

To ensure the comfort of the SESP also in the pressure increase mode, the wheel pressure in this mode is adjusted by means of the already existing low-noise method 'EVR (Electrical Reversing Valve) control'.

Referring to the example of a left turn, FIG. 33 shows on which wheels SESP performs pressure reduction (−) and pressure increase (+).

Advantages of the New Method SESP

The new method SESP has the following advantages over existing methods:
1. The structure of SESP allows combining existing methods which, when looked at individually, cover only a small range of effect, in order to achieve an overall method with a larger range of action.
2. The structure of SESP is open to extensions. It is possible to add new situations, regulating variables and correcting variables, as desired. Thus, it has the potential of dealing with turning maneuvers within the limits of the available sensor system and actuator system.
3. The clear-cut isolation of the partial modules of controller and correcting variable realization from the driving situation detection system allows using the same working mechanisms for various driving situations. This fact ensures a constant control quality and facilitates the application and further development of SESP.
4. Compared to the model-based approach of the 'sideslip angle control', SESP within the limits of its range of action is not dependent on additional sensor equipment (such as individual wheel force sensors or wheel braking pressure sensors). The conventional ESP sensor equipment is sufficient.
5. The consistent evaluation of the temporally preceding causes of turning maneuvers and the only selective controller activation allows the SESP to employ relatively sensitive control thresholds. This enables SESP in contrast to standard AYC to detect the slow turning maneuvers, on the one hand, and to correct them early using relatively little correcting energy, on the other hand.
6. Using own SESP controllers allows the standard AYC controller to continue running in the background and constantly checking whether the stabilizing effect of SESP is sufficient. If this is not the case, AYC will intervene as usual.
7. The continuous use of the described offset-corrected reference variables reduces the disturbing influence of signal errors.
8. The proposed strategy for realizing the additional yaw torque offers great comfort both in the pressure reduction mode and the pressure increase mode. It is additionally designed consistently to maintain vehicle stability.

The significant improvement is achieved by the clear-cut separation between driving situation detection, control, and the realization of correcting variables. SESP integrates in this manner existing methods, optimizes them and is open to subsequent extensions. This fact enables SESP to significantly extend the range of action of the ESP controller without using additional sensor equipment or actuator equipment.

BRIEF DESCRIPTION OF THE DRAWINGS

In the drawings,
FIGS. 31a, 32a illustrate the application of additional yaw torque in the current SESP realization.

DETAILED DESCRIPTION OF THE DRAWINGS

Figure 1:
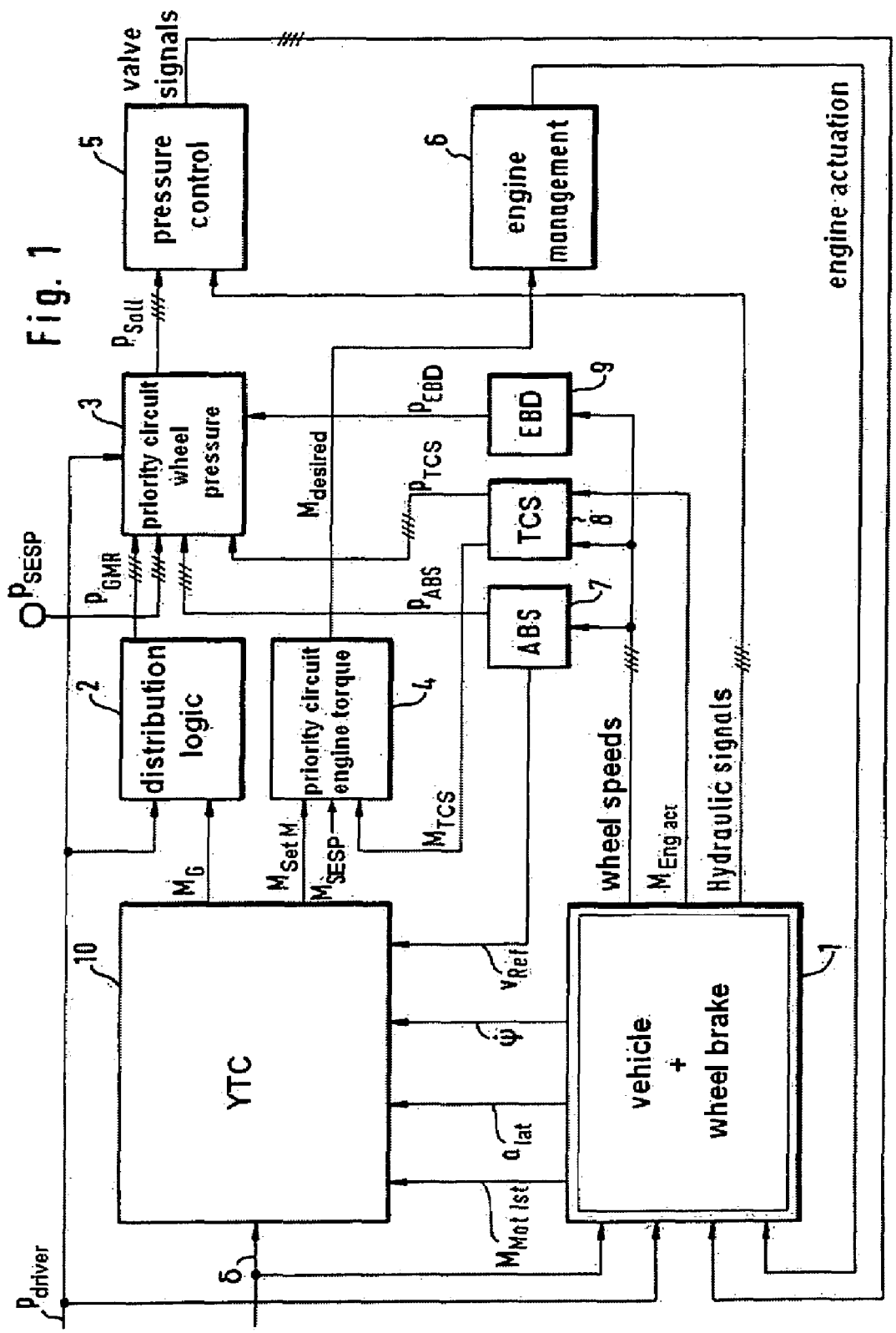
FIG. 1 is a block diagram relating to the overall structure of a system for driving stability control.

A general description of the course of a driving stability control (DSC) is shown in FIG. 1.

The vehicle 1 forms the so-called controlled system.

The variables given by the driver, namely, the driver brake pressure $p_{brake}$ or $p_{TMC}$, the accelerator pedal position, gearshift information, and the steering angle δ, act on the vehicle 1. The variables resulting from this, namely, the motor moment $M_{motor}$, the lateral acceleration $a_{lat}$, the yaw rate $\dot{\Psi}$, the wheel speeds and hydraulic signals, such as wheel brake pressures $p_{TMC}$, are measured on the vehicle, and information about gearshift is determined. To evaluate this data, the DSC system has five electronic controllers 7, 8, 9, 10 and 20, which are associated with the anti-lock system ABS, the traction slip control system TCS, the electronic brake force distribution system EBD, and the yaw torque control system YTC, respectively, and the sensitive yaw torque control SESP. The electronic controllers for ABS 7, TCS 8, EBD 9, and YTC 10 may basically correspond to the state of the art.

The wheel speeds are sent to the controllers for the anti-lock system 7, the traction slip control system 8, the electronic brake force distribution system 9, and the sensitive yaw torque control 20. The controller 8 of the traction slip control system additionally receives data on the actual engine torque, the motor moment $M_{motor}$. This information is also sent to the controller 10 for the yaw torque control YTC and the controller 20 for the sensitive yaw torque control SESP. The SESP controller additionally receives gearshift information. In addition, the controllers receive the data on the lateral acceleration $a_{lat}$ and the yaw rate $\dot{\Psi}_{meas}$ of the vehicle from the sensors. Since a vehicle reference velocity $v_{Ref}$, on the basis of which an excess brake slip of one of the wheels can be determined, is determined in the controller 7 of the ABS by way of the individual wheel speeds of the vehicle wheels, such a reference velocity does not need to be calculated in the YTC controller 10, but it is taken over from the ABS controller 7. Where the vehicle reference speed is calculated or whether a separate calculation is performed for the yaw torque control makes only a slight difference for the process of the yaw torque control YTC. This also applies, e.g., to the longitudinal acceleration $a_{long}$ of the vehicle. Accordingly, the value for this could also be determined in the ABS controller 7, and sent to the YTC controller 10. This applies to the determination of the coefficient of friction μ of the road surface with restrictions only, because a more accurate coefficient of friction determination than is determined for the anti-lock system is desirable for yaw torque control and for the sensitive yaw torque control 20.

All five electronic controllers of the DSC, i.e., the controllers for YTC 10, ABS 7, TCS 8 and EBD 9, develop brake pressure set values $P_{SESP}$, $P_{YTC}$, $P_{ABS}$, $P_{TCS}$, $P_{EBD}$ for the individual wheels simultaneously and independently from one another based on their own control strategies.

In addition, preset values $M_{TCS}$ and $M_{AdjustM}$ for the engine torque are calculated in parallel by the TCS controller 8 and the YTC controller 10 and SESP controller.

The pressure preset values $P_{YTC}$ and $P_{SESP}$ of the YTC controller 10 and the SESP controller 20 for the individual wheel brake pressures are determined as follows:

The YTC controller 10 and the SESP controller 20 first calculate an additional yaw torque $MG_{YTC}$ or $MG_{SESP}$, which leads to stabilization and improvement of the driving condition within a curve if it is generated by a corresponding brake actuation. These $MG_{YTC}$ and $MG_{SESP}$ are sent to a distribution logic unit 2 and 21, respectively, which could also be represented as part of the YTC controller 10 or SESP controller 20, respectively. In addition, the possible desire of the driver to decelerate the vehicle, which is recognized from the driver brake pressure (=$P_{TMC}$), is also sent to distribution logic unit 2 and 20. The distribution logic unit 2 and 21 calculate from the preset yaw torques $MG_{YTC}$ and $MG_{SESP}$ and from the desired driver brake pressure, yaw torque control brake pressures $P_{YTC}$ and $P_{SESP}$ for the wheel brakes, which may differ from each other very greatly for the individual wheels. These yaw torque control brake pressures $P_{YTC}$ and $P_{SESP}$ are sent to a priority circuit 3 for the wheel brake pressures, for function optimization along with the pressure preset values calculated by the other controllers 7, 8 and 9 for ABS, TCS and EBD. This priority circuit 3 determines desired wheel pressures $p_{Desired}$ for optimal driving stability and optimal driving behavior, taking into account the driver's desire. These desired pressures may either correspond to the pressure preset values of one of these four controllers, or represent a superimposition.

The procedure followed in the case of the engine torque is similar to the procedure with the wheel brake pressures. While ABS and EBD act only on the wheel brakes, intervention with the engine torque is also provided in the case of SESP, YTC and TCS. The preset values $M_{SESP}$, $M_{AdjustM}$ and $M_{TCS}$ calculated separately for the engine torque in the ESP controller 20, the YTC controller 10 and in the TCS controller 8 are again evaluated in a priority circuit 4 and superimposed to a desired torque. However, this desired torque $M_{Desired}$ may also just as well correspond only to the calculated preset value of one of the three controllers.

Driving stability control by intervention and/or improvement of the driving behavior by way of the brake and engine intervention can now be performed based on the calculated desired preset values for the wheel brake pressure $P_{Desired}$ and for the engine torque $M_{Desired}$. Hydraulic signals or values, which reflect the actual wheel brake pressure, are also sent for this purpose to the pressure control unit 5. From this, the pressure control unit 5 generates valve signals, which are sent to the control valves of the individual wheel brakes in the vehicle 1. The engine management 6 controls the drive motor of the vehicle according to $M_{Desired}$, as a result of which a changed motor moment is again generated. This will then again lead to new input variables for the five electronic controllers 7, 8, 9, 10 and 20 of the DSC system.

2. Structure of the Yaw Torque Controller (YTC) Including the Sensitive Yaw Torque Controller (SESP)

Figure 2:
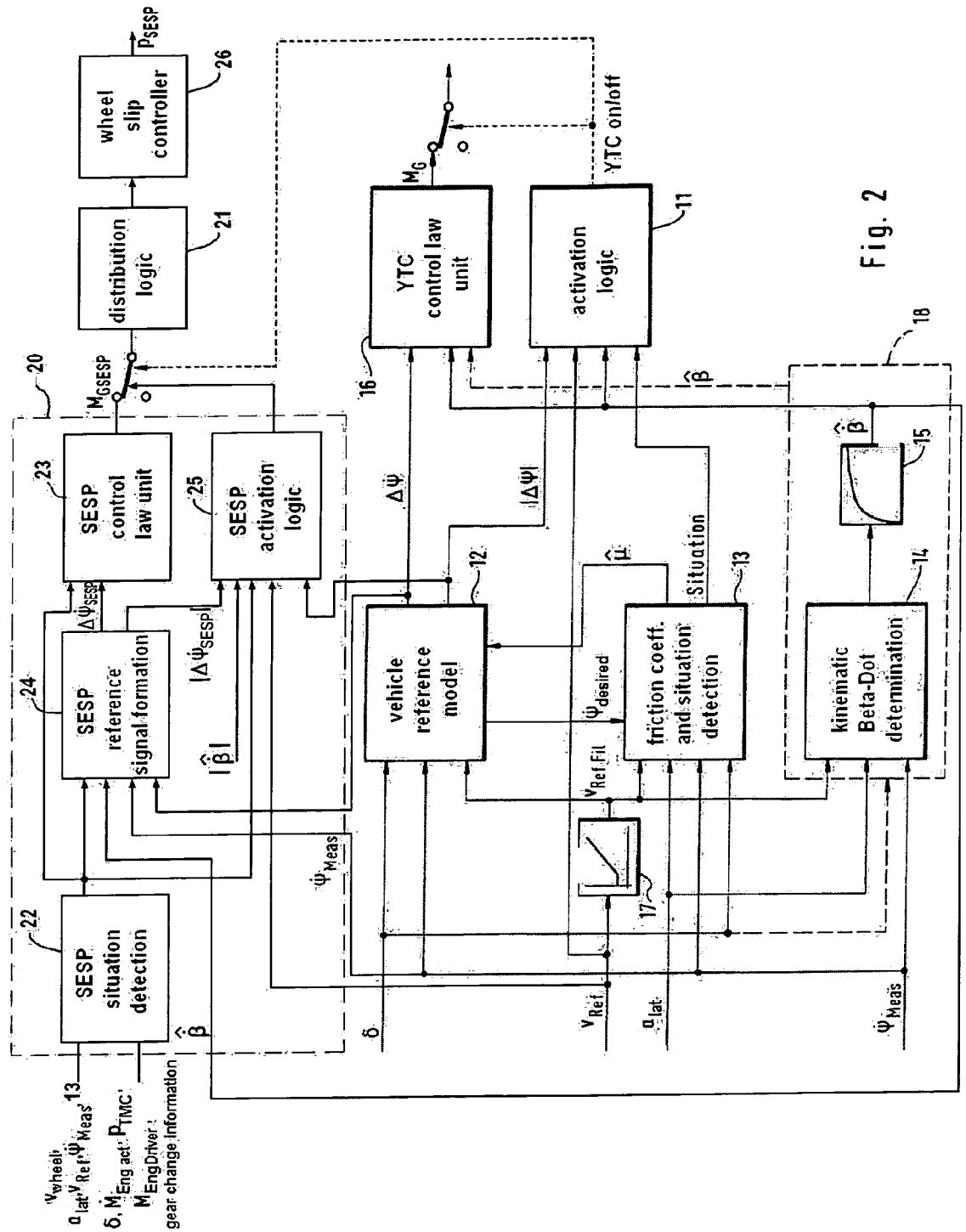
FIG. 2 is a block diagram relating to the structure of the yaw torque controllers.

FIG. 2 shows in a block diagram how the additional yaw torques $M_G$ and $MG_{SESP}$ are determined within the YTC controller 10 and the sensitive yaw torque controller 20 for the distribution logic units 2 and 21. The steering angle δ, the vehicle reference velocity $V_{Ref}$ from the ABS controller 7, the measured lateral acceleration $a_{lat}$, and the measured yaw rate $\dot{\Psi}_{Meas}$ are entered for this purpose as input variables. The vehicle reference velocity $V_{Ref}$ passes through a filter 17, which sets a constant value above zero at low velocities, so that the denominator of a fraction will not become equal to zero during the further calculations. The filtered value of $V_{Ref}$ is sent to an SESP situation detection system 22 and an activation logic unit 25, while the unfiltered value is sent to an activation logic unit 11, which recognizes the standstill of the vehicle.

This direct determination of the vehicle reference velocity $V_{Ref}$ by the activation logic unit 11 may also be omitted if standstill of the vehicle is assumed when the filtered vehicle reference velocity $V_{RefFil}$ assumes its constant minimum.

A vehicle reference model 12, which calculates a preset value for a change in the yaw rate $\Delta\dot{\Psi}$ on the basis of the steering angle δ, the filtered vehicle reference velocity $V_{RefFil}$ as well as the measured yaw rate $\dot{\Psi}_{Meas}$, is stored in the YTC controller.

To keep the preset values within the physically possible range, the coefficient of friction μ of the road surface, which is calculated as an estimated value $\hat{\mu}$ in a coefficient-of-friction and situation detection system 13, is also needed for these calculations. If the coefficient of friction determined within the framework of the anti-lock control has sufficient accuracy, this coefficient of friction may be used as well, or the coefficient of friction calculated in the YTC controller 10 may be taken over in the ABS controller 7.

The coefficient-of-friction and situation detection system 13 uses for its calculations the filtered reference velocity $V_{RefFil}$, the measurement vehicle lateral acceleration $a_{lat}$, the measured yaw rate $\dot{\Psi}_{Meas}$ and the steering angle δ. The situation detection system 13 distinguishes different cases, such as straight travel, travel in curves, reverse travel and standstill of the vehicle. Standstill of the vehicle is assumed when the filtered vehicle reference velocity $V_{RefFil}$ assumes its constant minimum. Instead of the unfiltered vehicle reference velocity, this information may also be sent to the activation logic unit 11 to recognize standstill of the vehicle. The fact that at a given steering angle δ, the orientation of the measurement yaw rate $\dot{\Psi}$ is opposite that during forward travel is utilized to recognize reverse travel. The measured yaw rate $\dot{\Psi}_{Meas}$ is compared for this purpose with the desired yaw rate $\dot{\Psi}_{desired}$ preset by the vehicle reference model 12. If the signs are always opposite, and this also applies to the time derivatives of the two curves, the vehicle is traveling in reverse, because $\dot{\Psi}_{desired}$ is always calculated for forward travel, since the usual speed sensors do not detect information on the direction of rotation of the wheels.

The output signals of the coefficient-of-friction and situation detection system 13 are sent to the SESP situation detection system 22 which determines on the basis of the detected driving situations of the YTC controller 10 and further information about the driver's request (δ, $M_{Motor}$, $P_{TMC}$, gearshift information) and the present driving state ($v_{wheel}$, $a_{lat}$, $v_{ref}$, $\dot{\Psi}_{Meas}$, 13) whether there is a potential deviation from the course desired by the driver (rotary condition of the vehicle about its vertical axis, in particular turning situation). At least the steering angle δ, the motor moment demand $M_{Motor}$, and the driver brake pressure $P_{TMC}$ are included in the detection of the driver's request, while the vehicle state is determined from at least $\dot{\Psi}_{Meas}$, $v_{wheel}$, $a_{lat}$, $v_{ref}$. The separate SESP situation detection system 22 safeguards the unambiguousness of the detected driving situation. Making a distinction between at least the states such as cornering with a load change 31, cornering with partial braking 32, straight travel with partial braking 33, and straight travel with load change 34 is necessary in order to adapt the program 23 for realizing the SESP yaw torque control law optimally to the current driving situation. Simultaneously, it is constantly checked by way of conditions such as the YTC state, ABS state, transversal roadway inclination, and vehicle speed whether SESP interventions are permitted. The state 35 (FIG. 30) 'SESP inactive' is instantaneously assigned in the event of a negative result. Some causes of turning of the vehicle, such as change of load, naturally have an effect on the vehicle performance which is only limited in time. In these cases, the respective state in the SESP driving situation detection system is left again after a defined time. The temporal limitation of such states permits the driver to correct slow turning maneuvers after a certain 'time of adaptation' by himself.

The state detected in the driving situation detection system 22 triggers the activation of the SESP control law unit 23 and induces an optimal adaptation of the parameters (e.g. the control thresholds) to the current driving situation. The driving situation detection system 22 evaluates to this end any causes preceding the vehicle reaction such as $P_{TMC}$, gearshift information, motor moment information so that the sensitive SESP control law unit 23 is activated at an early time. Apart from influencing the SESP controller parameters, the driving situation detection system 22 has the additional objective of indicating to the reference signal formation unit 24 at what moment the offset for the offset correction of the reference variables shall be stored. This is also done already upon detection of any potential cause for a turning situation of the vehicle 1.

Finally, a kinematic velocity of the sideslip angle determination, referred to as kinematic determination 14 for short, is performed in the YTC controller 10 on the basis of the filtered vehicle reference velocity $V_{RefFil}$, the measured vehicle lateral acceleration $a_{lat}$, and the measured yaw rate $\dot{\Psi}_{Meas}$.

To cut off peaks in the case of great variations in the sideslip angles, the calculated value of velocity of the sideslip angle passes through a first-order low-pass filter 15, which sends an estimated value $\dot{\beta}$ for the velocity of the sideslip angle to the activation logic unit 11 and optionally to the SESP activation logic unit 25, to a program 16 for putting the yaw torque control law into practice, and to the SESP reference signal formation unit 24. Program 16 and SESP reference signal formation unit 24 also use the preset values for changing $\Delta\dot{\Psi}$ for the yaw rate, which is the difference of the measured yaw rate $\dot{\Psi}_{Meas}$ and the desired yaw rate $\dot{\Psi}_{desired}$ calculated on the basis of the vehicle reference model 12. The additional yaw torque $M_G$ for the vehicle, which is to be conveyed by way of the brake pressures, is calculated from this.

The program 16 and the SESP controller 20 operate permanently to keep ready current control variables all of the time. However, whether these controlling torques are transmitted to the distribution logic units 2, 21 shown in FIGS. 1 and 2 depends on the activation logic units 11, 25.

The activation logic unit 11 of the YTC controller 10 receives not only the value of the unfiltered vehicle reference velocity $v_{Ref}$ and, as was described, the velocities of the sideslip angles $\dot{\beta}$, but also the amount of the deviation $|\Delta\dot{\Psi}|$ of the desired yaw rate $\dot{\Psi}_{desired}$ from the measured yaw rate $\dot{\Psi}_{Meas}$, and information from the situation detection system 13 during reverse travel.

If the vehicle is traveling in reverse, the transmission of $M_G$ is interrupted. This also happens when standstill of the vehicle is recognized or when neither the estimated velocity of the sideslip angle $\dot{\beta}$ nor the preset value for the change in the yaw rate, $\Delta\dot{\Psi}$, reaches a value that would make control necessary. The logic circuit for calculating the engine controlling torque $M_{AdjustM}$ is not shown.

The activation logic 25 of the SESP controller 20 not only receives the value of the SESP reference signal formation unit 24 and the activation logic unit 11, but also the deviation $|\dot{\beta}|$ and/or $|\Delta\dot{\Psi}_{SESP}|$ of the desired yaw rate $\dot{\Psi}_{Desired}$ from the measured yaw rate $\dot{\Psi}_{Meas}$, but also receives information from the SESP situation detection system 22 when one of the SESP states such as a cornering maneuver with load change, a cornering maneuver with partial braking, straight travel with partial braking, and straight travel with load change prevails or is expected.

If the vehicle has not assumed any one of the determined states, or if states of the YTC controller 10 or the ABS controller 7, the TCS controller 8 are superposed on these states while defined conditions are complied with, the transfer of $MG_{SESP}$ is interrupted. The same applies if a standstill of the vehicle is detected or if neither the estimated sideslip angle velocity $\dot{\beta}$, nor the specification for the yaw rate change $\Delta\dot{\Psi}_{SESP}$ reach a value which necessitates a control operation. The logic circuit for calculating the engine controlling torque $M_{SESPadjustM}$ is not shown.

2.1 Coefficient-of-Friction and Situation Detection System of the YTC Controller 10

Figure 3:
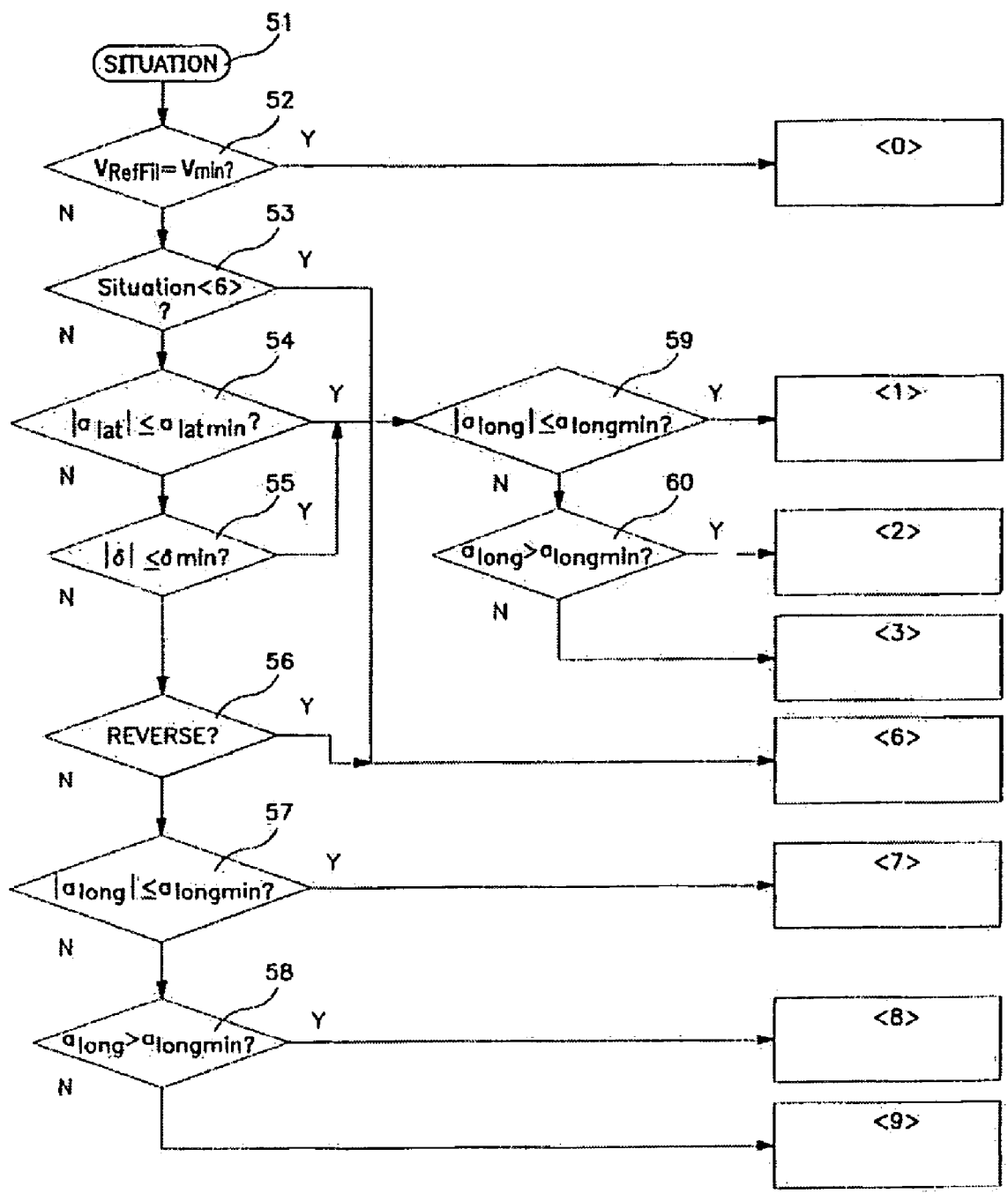
FIG. 3 is a flow chart relating to the detection of a driving situation such as a cornering maneuver.
Figure 4:
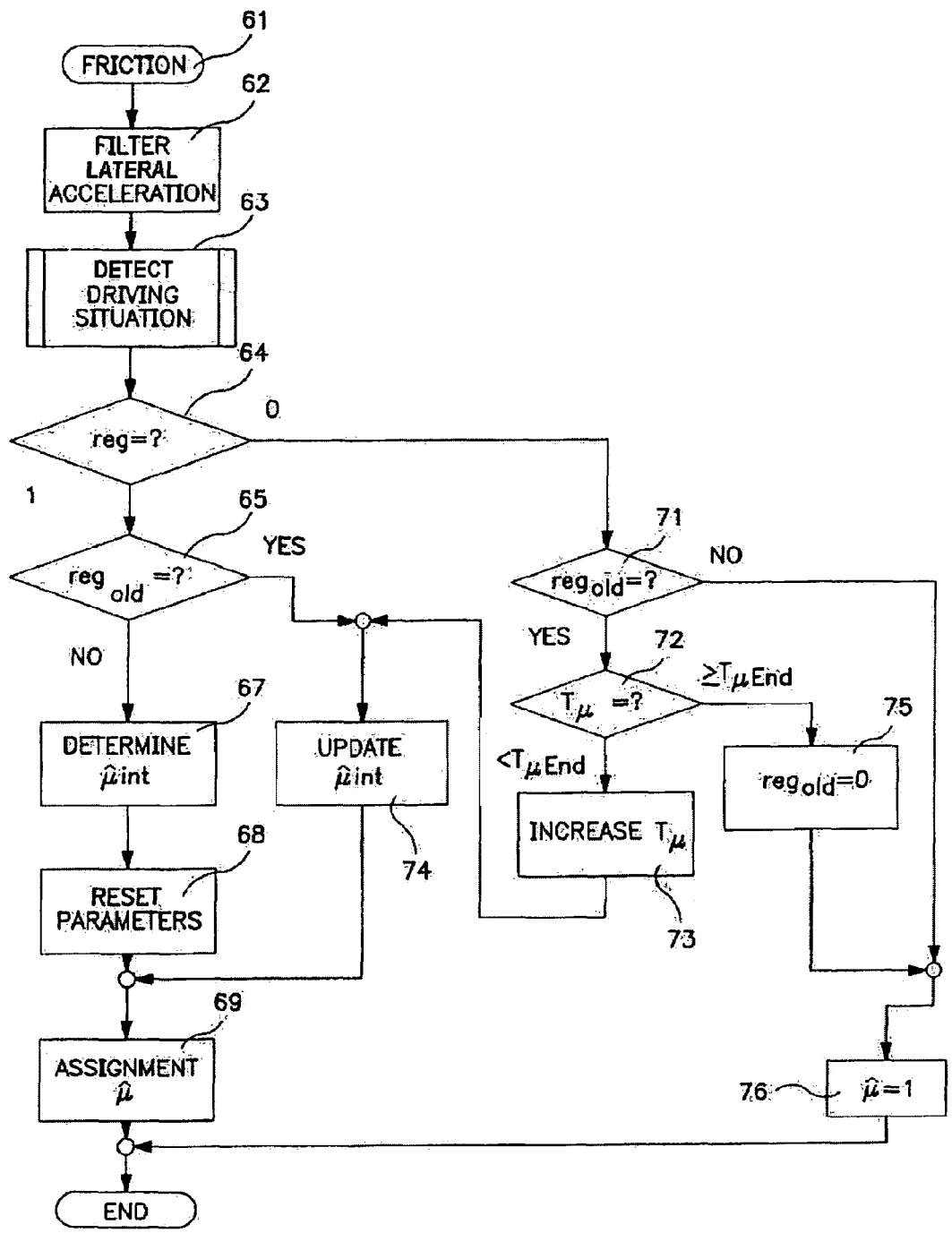
FIGS. 4 and 5 show in each case a flow chart relating to the determination of the coefficient of friction of the roadway, and FIG. 5 should be inserted into FIG. 4.
Figure 5:
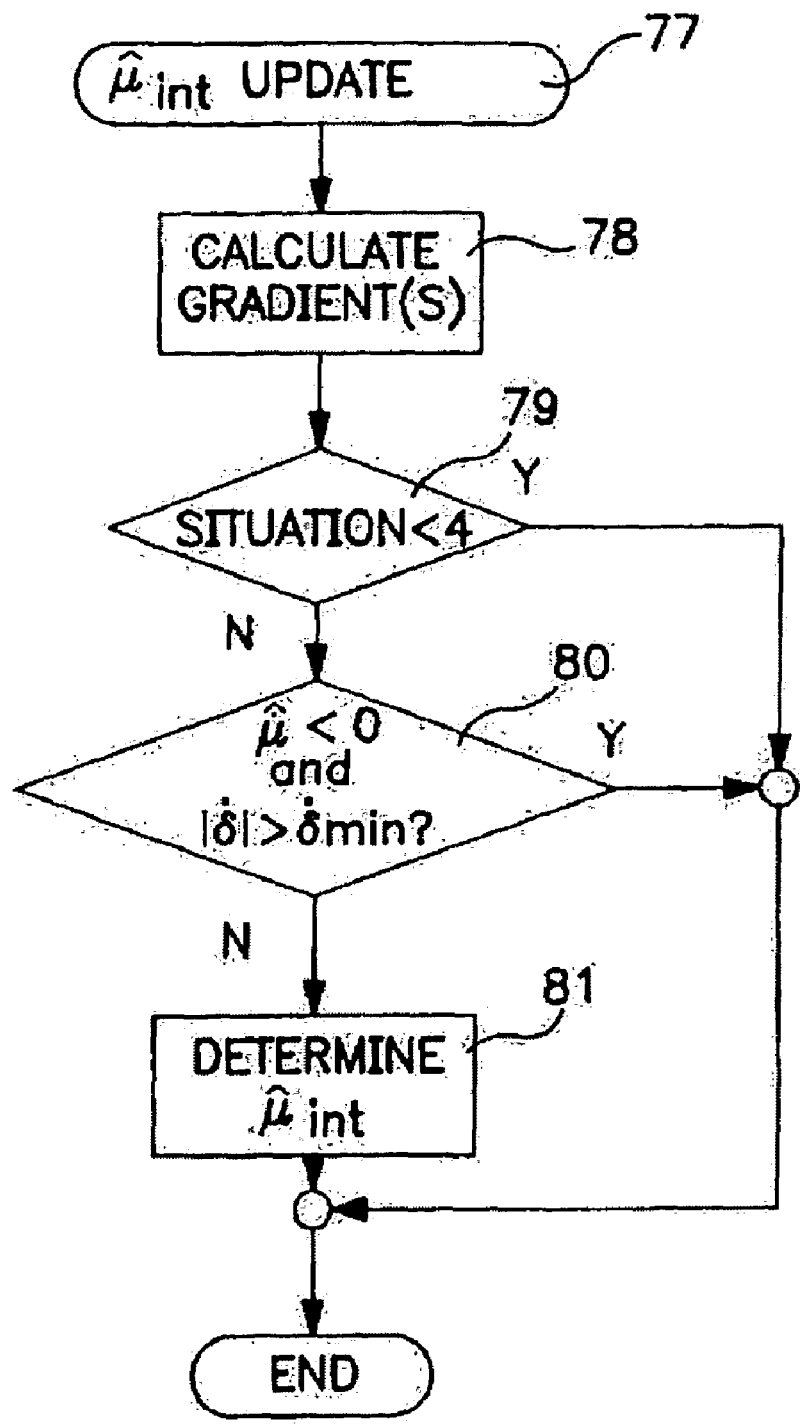

The logic processes taking place in the coefficient-of-friction and situation detection system 13 are shown in the form of flow charts in FIGS. 3, 4 and 5.

FIG. 3 pertains to the situation detection. Eight different driving situations can be distinguished with the process shown:

<0> Standstill of the vehicle
<1> Constant straight travel
<2> Accelerated straight travel
<3> Decelerated straight travel
<6> Reverse travel
<7> Constant travel in curve
<8> Accelerated travel in curve
<9> Decelerated travel in curve.

Logic branches are represented as blocks in the flow chart.

Based on a given situation 51 to be determined, it is first determined in block 52 whether or not the vehicle is at a standstill. If the filtered vehicle reference velocity $V_{RefFil}$ assumes its minimum $v_{min}$, standstill of the vehicle, i.e., situation <0>, is assumed. If $V_{RefFil}$ is grater than $v_{min}$, the result of the preceding run of situation detection is polled in block 53.

If the situation last determined was recognized as reverse travel, i.e., situation <6>, reverse travel continues to be present, because standstill of the vehicle did not occur in the meantime, because situation <0> would have otherwise been recognized in block 52 in the meantime.

If the preceding run of the situation detection recognized a situation other than <6>, the value of the lateral acceleration $a_{lat}$ is polled in block 54. If this is lower than a defined threshold value $a_{trans\ min}$, it is assumed that the vehicle is traveling straight, i.e., that one of the situations <1> through <3> prevails.

This is also true when the value of the measured lateral acceleration $a_{lat}$ is above the threshold value $a_{latmin}$, but it is recognized in block 55 in the next step that the value of the steering angle $\delta$ is lower than a threshold value $\delta_{min}$. In this case, the measured lateral acceleration $a_{lat}$ is an error of measurement that results from the fact that lateral accelerometers are usually securely mounted in the transverse axis of the vehicle and are tilted with the vehicle in the case of an inclination of the road surface, so that a lateral acceleration that does not actually occur is indicated.

Consequently, if the vehicle is traveling straight, the value of the longitudinal acceleration $a_{long}$ is examined in block 59. If this value is lower than a threshold value $a_{longmin}$, constant straight travel is assumed. However, if the value of the longitudinal acceleration $a_{long}$ is greater than this threshold value, block 60 makes a distinction between positive and negative longitudinal acceleration. If the value of $a_{long}$ is above the threshold value $a_{longmin}$, the vehicle is in an accelerated straight travel, i.e., in situation <2>. If the value of $a_{long}$ is below the threshold value $a_{longmin}$, this means nothing else but negative longitudinal acceleration, e.g., decelerated straight travel, namely, situation <3>.

If none of the situations <0> through <3> occurs and a steering angle value $\delta$ that is greater than the threshold value $\delta_{min}$ is recognized in block 55, a polling is performed in block 56 to determine whether the vehicle is currently traveling in reverse. The detection of reverse travel is necessary only at this point, because the yaw rate $\Psi$ hardly differs from zero during straight travel anyway, and no control intervention is therefore performed. Reverse travel must be ruled out with certainty only when travel in a curve is recognized, in which the yaw torque control itself becomes active. This is not possible based solely on the signals of the wheel speed sensors, because such sensors only transmit the value of the speed, without making it possible to infer the direction of travel from it.

As was described above, situation <6> is determined by comparing the measured yaw rate $\dot{\Psi}_{Meas}$ with the desired yaw rate $\dot{\Psi}_{desired}$ determined in the vehicle reference model 12. If the signs are opposite, and if this is also true of the time derivatives of the two variables, namely, the yaw accelerations $\ddot{\Psi}_{Meas}$ and $\ddot{\Psi}_{desired}$, the vehicle is in a curve, traveling in reverse. The signs of the yaw accelerations are therefore compared, to rule out that the opposite signs of the yaw rates originate not only from a phase shift, which is due to the time-delayed calculation of the desired values.

If the conditions for reverse travel are not satisfied, there is travel in a curve in the forward direction. Whether or not this travel in the curve takes place at constant velocity is investigated in block 57. As was done before in blocks 59 and 60 in the case of straight travel, the value of the longitudinal acceleration $a_{long}$ is first examined in block 57. If it is lower than the threshold value $a_{longmin}$, there is constant travel in a curve, i.e., situation <7>. In the case of longitudinal acceleration $a_{long}$ whose value is greater than the threshold value $a_{longmin}$, it is further examined in block 58 whether the longitudinal acceleration $a_{long}$ is positive or negative. The vehicle is in an accelerated travel in a curve, i.e., in situation <8>, in the case of positive longitudinal acceleration $a_{long}$, while a decelerated travel in a curve, corresponding to situation <9>, is recognized in the case of negative longitudinal acceleration $a_{long}$.

The longitudinal acceleration $a_{long}$ can be recognized in different ways. It can be determined, e.g., from the reference velocity $v_{Ref}$ provided by the ABS controller 7, in which case it should be borne in mind that such a reference velocity $v_{Ref}$ may deviate from the actual vehicle velocity during an ABS intervention. Consequently, a correction of $v_{Ref}$ is justified in an ABS case. However, the longitudinal acceleration $a_{long}$ can also be taken over under certain circumstances directly from the ABS controller if such calculation is performed there.

The situation detection according to FIG. 3 is continually run through again, and the situation last determined remains stored and available in block 53.

A possible process for determining the coefficient of friction of the road surface is shown in FIGS. 4 and 5. According to this process, the coefficient of friction is determined only when the yaw torque controller enters the control. However, since no estimated coefficient of friction is available at the time of entry into the control, the coefficient of friction $\mu=1$ is set at the beginning of the control.

If the yaw torque control system responds on the basis of an instantaneous driving situation, it can be assumed that the vehicle is at least in the vicinity of the borderline range to unstable driving situations. The instantaneous coefficient of friction of the road surface can therefore be inferred from an examination of the current measured variables of the vehicle. The coefficient of friction then determined at the time of entry into the control will subsequently serve as the basis for limiting the desired yaw rate $\dot{\Psi}_{desired}$ and consequently also for the control deviation for the yaw rate $\Delta\dot{\Psi}$, which is transmitted to the YTC control law unit 16. The coefficient of friction is determined for the first time at the time of entry into the control, associated with a subsequent phase of updating for the limitation of the desired yaw rate to physically meaningful values. Based on the originally preset coefficient of friction $\mu=1$, a maximum coefficient of friction $\hat{\mu}$ is determined at the time of entry into the control, and the calculation of the additional yaw torque $M_G$ will then be based on this value.

An internal coefficient of friction $\hat{\mu}_{int}$ is first calculated for this purpose from the measured lateral acceleration $a_{lat}$ and a calculated value for the longitudinal acceleration $a_{long}$, which value corresponds to the instantaneous coefficient of friction if complete utilization of the frictional connection is assumed.

However, since it must be assumed that the maximum frictional connection is not yet reached at the time of entry into the control, a higher coefficient of friction $\hat{\mu}$ is associated with the internal coefficient of friction $\hat{\mu}_{int}$ by means of a table, a characteristic curve or a constant factor. This coefficient of friction $\hat{\mu}$ is then sent to the control system. It is thus possible to calculate with a desired yaw rate $\dot{\Psi}_{desired}$ adjusted to the coefficient of friction of the road surface in the next step of the calculation and to improve the control. While the yaw torque control system acts on the vehicle, the estimated coefficient of friction $\hat{\mu}$ must be further updated, because a change in the coefficient of friction might take place during the control. If the control system is not activated based on the adjustment of the coefficient of friction in the vehicle reference model due to the resulting changed control deviation of the yaw rate $\Delta\dot{\Psi}$, the coefficient of friction $\hat{\mu}$ is further updated in $T\mu_{End}$ number of steps. If the yaw torque control system is not activated even during this phase of updating, the estimated coefficient of friction $\hat{\mu}$ is reset to 1.

The adjustment or updating of the estimated coefficient of friction $\hat{\mu}$ may also be omitted in certain situations. Such situations are, e.g., straight travel, travel in reverse or standstill of the vehicle, i.e., situations <0> through <4>. These are situations in which no yaw torque control is performed anyway, so that an estimation of the coefficient of friction may be omitted if the time derivative of the coefficient of friction $\hat{\mu}$, i.e., $\dot{\hat{\mu}}$, is negative and the value of the time derivative of the steering angle δ, i.e. |δ̇|, exceeds a predetermined threshold. It can be assumed in the latter case that a change in the lateral acceleration $a_{lat}$ is based on a change in the steering angle δ, rather than on a change in the coefficient of friction.

It is generally true of the coefficient of friction calculated in this manner that it is a mean coefficient of friction for all four wheels of the vehicle. The coefficient of friction cannot be determined in this manner for the individual wheels.

The process of the coefficient-of-friction determination will now be explained on the basis of FIG. 4. The behavior of the vehicle is affected by the prevailing coefficient of friction of the road surface according to field 61 in each driving situation. To determine the corresponding coefficient of friction of the road surface, the measured lateral acceleration $a_{lat}$ is first filtered according to step 62, i.e., either the measured values are smoothed, or the curve passes through a low-pass filter, so that no extreme peaks appear. Step 63 comprises the situation detection according to FIG. 3. The driving situation recognized is later significant for the phase of updating in step 74. Polling is performed in block 64 to determine whether a control intervention is necessary. Such a calculation is first based on the initial coefficient of friction μ=1. If control is considered to be necessary, polling is performed in block 65 to determine whether this was also the condition at the end of the preceding run of the coefficient-of-friction determination. If an entry into control is involved here, control was not recognized before, so that an internal coefficient of friction $\hat{\mu}_{int}$ is determined for the first time in step 67. It is calculated from the following equation:

$$\hat{\mu}_{int} = \frac{\sqrt{a_{trans}^2 + a_{long}^2}}{g} \qquad F\ 2.1$$

Here, g is the gravitation constant g=9.81 m/sec².

The parameter $reg_{old}$ for step 65 is set at 1 in step 68. In addition, the counting parameter Tμ is set at 1, corresponding to the fact that the first determination of the internal coefficient of friction $\hat{\mu}_{int}$ has been performed. An estimated coefficient of friction $\hat{\mu}$ is associated with the calculated internal coefficient of friction $\hat{\mu}_{int}$ in step 69. This is done under the assumption that the existing acceleration components are not based on a complete utilization of the frictional connection, either. The estimated coefficient of friction $\hat{\mu}$ is consequently usually between the internal coefficient of friction $\hat{\mu}_{int}$ thus determined and 1. The determination of the coefficient of friction is thus concluded.

Consequently, assuming an unchanged driving situation, $reg_{old}$=1 is decided in block 65 during the next run of this coefficient-of-friction determination. A value $\hat{\mu}_{int}$, which replaces $\hat{\mu}_{int}$ determined in the preceding run, is later determined here as well. The parameters determined in field 68 are not updated, because the updating of $\hat{\mu}_{int}$ was performed during a control. $reg_{old}$ had been set at 1 already in the run before that, and it remains unchanged. The number Tμ of runs performed continues to be 1, because counting is continued only if no control takes place. As was described above, an estimated coefficient of friction $\hat{\mu}$ is also associated with the updated value of $\hat{\mu}_{int}$ by means of a table, a nonlinear relationship, or a constant factor.

If it is determined in one run in block 64 that control is not necessary, a polling is then performed in block 71 to determine whether the parameter $reg_{old}$ for the control was last set at 0 or 1. If it was set at 1 in the last run, the number Tμ of runs is polled in block 72. This Tμ equals 1 if control was performed in the last run. If control was performed only in the run before last, Tμ=2, etc. If Tμ has not yet reached a certain TμEnd in step 72, it is increased by 1 in step 73, and a repeated updating of the internal coefficient of friction $\hat{\mu}_{int}$ is performed in step 74. If the number TμEnd is then reached in one of the next runs without control having taken place, the parameter $reg_{old}$ is again reset to 0 for the control. The estimated coefficient of friction $\hat{\mu}$ is equated with the initial coefficient of friction μ=1. The phase of updating for the coefficient of friction $\hat{\mu}$ is thus terminated.

If it is then again recognized in the next run in block 64 that no control is necessary, the initial coefficient of friction μ=1 is retained in field 76 in block 71 with $reg_{old}$=0. A coefficient-of-friction determination is again performed only if the necessity of a control intervention is recognized in block 64.

The criteria for updating the internal coefficient of friction $\hat{\mu}_{int}$ after step 74 are shown in FIG. 5. Based on the instruction in field 77 that the internal coefficient of friction $\hat{\mu}_{int}$ is to be updated, the time derivatives of the estimated coefficients of friction $\hat{\mu}$ or $\hat{\mu}_{int}$ formed before, as well as of the steering angle δ are formed in step 78.

When it is then recognized in block 79 that the vehicle is neither at a standstill nor is it traveling straight, i.e., that one of the situations <6> through <9> occurs, the results from step 78 are evaluated in step 80. A coefficient of friction determination is performed, as was explained above, only if a decreasing coefficient of friction cannot be attributed to a steering maneuver. No updating of the coefficient of friction is performed if the vehicle is traveling straight, forward or in reverse, or if it is at a standstill, or if a reduction in the estimated coefficient of friction $\hat{\mu}$ can be attributed to a steering maneuver.

2.1.1 SESP Situation Detection System

Figure 30:
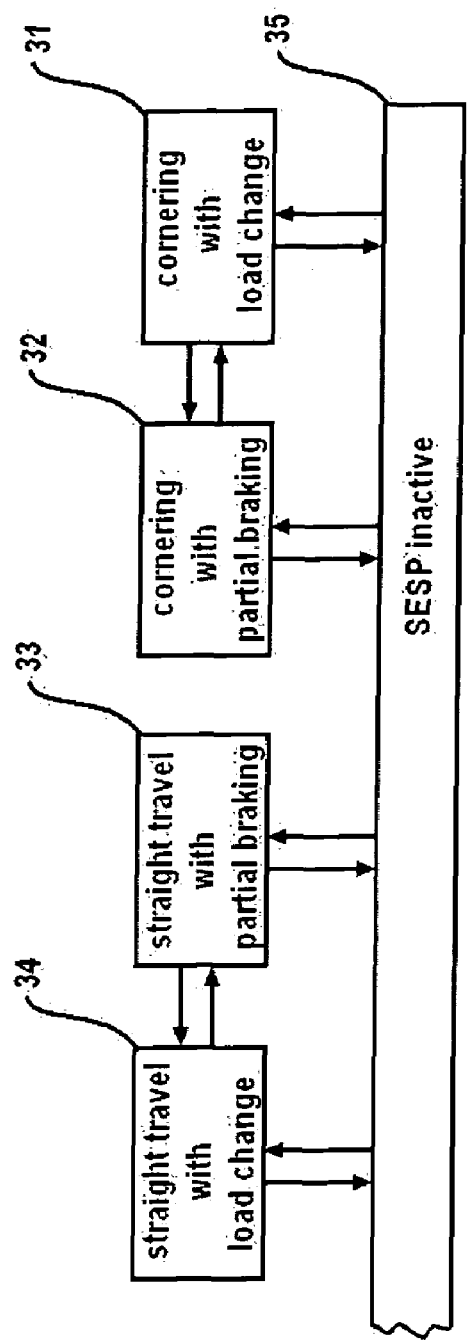
FIG. 30 is a basic block diagram of the driving situation detection system.

The SESP situation detection system 22 is designed as a state machine. The state machine detects the state (the driving situations) of the vehicle by way of the quantity of the attribute values (input signals). State diagrams indicate at which event the vehicle passes over from a defined state into a neighboring state. A subsequent state depends on the initial state and on the event that occurred. FIG. 30 shows as an example the possible states, namely, cornering maneuver with load change 31, cornering maneuver with partial braking 32, straight travel with partial braking 33, and straight travel with load change 34, and the permitted state transitions in the SESP situation detection system 22. The use of a state machine safeguards the unambiguousness of the detected driving situation. Making a distinction between several states is necessary in order to adapt the programs 23 for realizing the SESP yaw torque control law optimally to the current driving situation. All driving situations are determined in the SESP situation detection system 22 which are relevant for the calculation of the SESP driving situations states 31 to 34. To this end, the situation detection system 22 determines the following driving situations which can then be used as input information in the state machine 22.1.

Steady-State Straight Ahead Driving Maneuver

The SESP situation detection system 22 detects if the driver wants to drive straight ahead and uses the driving situation <1>, <2> and <3> detected by the coefficient-of-friction and situation detection system 13 and the steering angle $\delta$, i.e. the driver's steering input. The result is memorized in flag Sesp_straight_ahead.

Flag Sesp_straight_ahead is set to True if all of the following conditions are fulfilled:
i. The driving situation from 13 is <1>, <2> or <3>
ii. The amount of the steering angle $|\delta|$<threshold value k1
iii. The amount of the steering angle velocity $|\dot{\delta}|$<threshold value k2

Otherwise flag Sesp_straight_ahead is set to False.

Steady-State Curve Driving

The SESP situation detection system 22 detects if the driver wants to drive a steady curve, using the driving situation <7>, <8> and <9> detected by the coefficient-of-friction and situation detection system 13, the lateral acceleration, the driver's steering input $\delta$ and the roadway radius estimated from $a_{lat}$ and $v_{ref}$ in the coefficient-of-friction and situation detection system 13 or in the YTC controller 10, respectively. The result is stored in the flag.

Flag Sesp_steady_curve is set to True if all of the following conditions are fulfilled for a predetermined duration (counter):
iv. The driving situation from 13 is <7>, <8> or <9>
v. The estimated curve radius (from 10, 13)>threshold value k3
vi. The amount of the steering angle velocity $|\dot{\delta}|$<threshold value k4

If any one of the conditions is not fulfilled, flag Sesp_steady_curve is set to False; the counter is reset to 0.

Application of the Brakes Possible

The SESP situation detection system 22 detects if the driver is braking in a specific manner, involving the risk that 'brake pull (deviation from the desired track)' of the vehicle occurs because the driver is braking, and the information whether the driver is braking in a specific manner is determined using the master cylinder pressure $P_{TMC}$ and its gradient. The result is stored in flag Sesp_brake_pull_possible.

Flag Sesp_brake_pull_possible is set to True if all of the following conditions are fulfilled:
vii. The YTC controller 10 detects braking by the driver
viii. The driver brake pressure $P_{TMC}$>threshold value k5

Otherwise flag Sesp_brake_pull_possible is set to False.

Turning Possible because the Driver is Braking

The SESP situation detection system 22 detects if there is an oversteering tendency (turning tendency) in curves because the driver is braking in a specific manner, which can cause turning of the vehicle into the bend, and the information whether the driver is braking in this specific manner is determined using the master cylinder pressure $P_{TMC}$ and its gradient. The result is stored in flag Sesp_brake_ov_possible.

Flag Sesp_brake_ov_possible is set to True if all of the following conditions are fulfilled:
ix. The YTC controller 10 detects braking by the driver
x. The gradient of $P_{driver}$>threshold value k6; the condition x. is maintained within a predetermined time window (period) because after detecting a turning maneuver by the driver, it is still possible during a defined period that the vehicle turns into the bend.
xi. The driver brake pressure $P_{TMC}$>threshold value k7

Otherwise flag Sesp_brake_ov_possible is set to False.

Oversteering due to Engine Drag Torque Possible

The SESP situation detection system 22 detects, if an engine drag torque or engine brake torque exists, respectively, which can cause turning of the vehicle into a bend. The result is stored in flag Sesp_drag_ov_possible.

Flag Sesp_drag_ov_possible is set to True if the following conditions are fulfilled:
xii. $M_{motor}$<threshold value k8
and simultaneously one of the following conditions:
xiii. Sum of the wheel speeds vwheel of the non-driven axle–sum of the wheel speeds vwheel of the driven axle<threshold value k9; the signal of the speed difference of the wheel speeds is filtered in a low-pass filter of first order. The speed difference of the wheels indicates a load change;
or
xiv. gradient of the engine torque $M_{motor}$<negative threshold value k10; the condition xiv. must be satisfied within a predetermined time window (period) in retrospect, if the condition xii. is currently determined;
or
xv. a gear shift takes place or has taken place, respectively.

Otherwise flag Sesp_drag_ov_possible is set to False after a predetermined period. The flag is reset with delay because the detected load changes will still have consequences on the driving performance of the vehicle during a defined period after their detection, and may cause turning of the vehicle into a bend.

Detection of a Turning Tendency

The SESP situation detection system 22 detects if the vehicle tends to turning into a bend during straight driving or cornering, with the yaw rate and its acceleration being used. The result is stored in flag Sesp_oversteer_tendency.

Flag Sesp_oversteer_tendency is set to True, if all of the following conditions are fulfilled:
xvi. $\ddot{\psi}_{meas}$ (=derivative of $\dot{\psi}_{Meas}$)>threshold value k11
xvii. Sign of $\ddot{\psi}_{Meas}$=the sign of $\dot{\psi}_{Meas}$ Otherwise flag Sesp_oversteer_tendency is set to False.

These conditions are sufficient for the SESP because SESP is limited to situations in which the driver desires a yaw rate that remains almost constant. SESP reference values are not used in this case because they are not always available.

ABS active at Rear Axle

The SESP situation detection system 22 detects, if at least one wheel of the rear axle is ABS-controlled. The result is stored in flag Sesp_abs_active_at_ra.

Flag Sesp_abs_active_at_ra is set to True, if one of the following conditions is fulfilled:
xviii. Right rear-wheel is ABS-controlled
or
xix. Left rear wheel is ABS-controlled Otherwise flag Sesp_abs_active_at_ra is set to False.

SESP Driving State

The SESP situation detection system 22 calculates the SESP driving situation state SESP_DRIVE_STATE. This is done in the state machine 22.1 (FIG. 30) using the results of the individual above-mentioned SESP detections of the driving situations and of the SESP deactivation control system as input. SESP_DRIVE_STATE is used in order to adapt the SESP control to the driving situation.

The following state transitions are fixed in connection with FIG. 30 for SESP_DRIVE_STATE:

---

Transition from state 35 to state 33.
Sesp_straight_braked:
        Sesp_straight_ahead == True
  AND  Sesp_brake_pull_possible == True
  AND  Abs_cycle == False
  AND  Sesp_forbidden == False
Transition from state 35 to state 32
Sesp_curve_braked:
        Sesp_steady_curve == True
  AND  Sesp_brake_ov_possible == True
  AND  Sesp_oversteer_tendency == True
  AND  Sesp_abs_active_at_ra == False
  AND  Sesp_forbidden == False
Transition from state 35 to state 31
Sesp_curve_drag_tq:
        Sesp_steady_curve( ) == True
  AND  Sesp_drag_ov_possible( ) == True
  AND  Sesp_oversteer_tendency( ) == True
  AND  Ayc_driver_braking( ) == False
  AND  Sesp_forbidden( ) == False
Transition from state 35 to state 34
Transition from state 33 to state 35
Sesp_straight_braked
Sesp_drive_idle:
        Sesp_straight_ahead == False
  OR   Abs_cycle == True
  OR   Sesp_forbidden == True
  OR   Sesp_in_cycle == False
  AND  (Sesp_brake_pull_possible == False)
Transition from state 32 to state 31
Sesp_curve_braked
Sesp_curve_drag_tq:
        Sesp_in_cycle == True
  AND  Sesp_steady_curve == True
  AND  Sesp_drag_ov_possible == True
  AND  Sesp_brake_ov_possible == False
  AND  Ayc_driver_braking == False
  AND  Sesp_forbidden == False
Transition from state 32 to state 35
Sesp_drive_idle:
        Sesp_steady_curve == False
  OR   Sesp_brake_ov_possible == False
  OR   Sesp_abs_active_at_ra == True
  OR   Sesp_forbidden == True
  OR   Sesp_in_cycle == False
  AND  Sesp_oversteer_tendency == False
Transition from state 31 to state 32
Sesp_curve_drag_tq
Sesp_curve_braked:
        Sesp_in_cycle == True
  AND  Sesp_steady_curve == True
  AND  Sesp_brake_ov_possible == True
  AND  Sesp_abs_active_at_ra == False
  AND  Sesp_forbidden == False
Transition from state 31 to state 35
Sesp_drive_idle:
        Sesp_steady_curve( ) == False
  OR   Sesp_drag_ov_possible == False
  OR   Sesp_forbidden == True
  OR   (Sesp_in_cycle == False
  AND  (Ayc_driver_braking == True
  OR   Sesp_oversteer_tendency == False))

---

Outside SESP control, a transition always passes over the state Sesp_drive_idle 35. Within SESP control, the transitions pass e.g. between the two states Sesp_curve_braked 32 and Sesp_curve_drag_tq 31 (or between the states 34 and 33), yet do not pass the state Sesp_drive_idle 35, if the control shall be continued in the new state. This is to avoid a reset of the SESP reference yaw rate 24.

If the conditions for the states Sesp_curve_braked 32 and Sesp_drag_tq 31 are fulfilled at the same time, the state with the partial braking, e.g. Sesp_curve_braked 32, always has the higher priority compared to the state with a load change.

2.1.1.1 Common Inputs for all SESP Controllers 20, 23

The calculation of signals is performed by the YTC controller 10 and can be commonly used by the SESP controllers as input.

Minimum Friction:

Estimates the road friction, using the longitudinal acceleration of the vehicle 1 and the friction signal that is calculated by the coefficient-of-friction and situation detection system 13. The result is stored in SESP_MY_MIN.

In the majority of situations being relevant for SESP control, the vehicle does not fully use the available road friction. Therefore, SESP_MY_MIN represents only that part of the road friction which is normally utilized by vehicle 1.

2.2. Determination of $\beta$ and $\dot{\beta}$

The prevailing sideslip angle $\beta$ as well as its time derivative, the velocity of the sideslip angle $\dot{\beta}$, are an indicator of the stability of a driving condition. The determination of these values will be explained below.

2.2.1 Kinematic Determination of $\dot{\beta}$

The kinematic determination of $\dot{\beta}$, 14, is nothing else but the determination of the velocity of the sideslip angle $\dot{\beta}$, separated from any vehicle models, from measured variables or from variables calculated on the basis of measured values, according to purely physical considerations:

The acceleration $a_{trans}$ of the center of gravity of the vehicle at right angles to its longitudinal axis in the plane of movement is measured. The center of gravity of the vehicle moves with the velocity vector $\underline{v}$ relative to an inertial system:

$$\underline{v} = v \begin{bmatrix} \cos(\Psi + \beta) \\ \sin(\Psi + \beta) \end{bmatrix} \qquad \text{F 2.2}$$

The yaw angle is designated by $\Psi$ and the sideslip angle by $\beta$. The acceleration vector $\underline{a}$ is obtained as a derivative over time t as:

$$\underline{a} = \frac{d}{dt}\underline{v} = \dot{v} \begin{bmatrix} \cos(\Psi + \beta) \\ \sin(\Psi + \beta) \end{bmatrix} + v(\dot{\Psi} + \dot{\beta}) \begin{bmatrix} -\sin(\Psi + \beta) \\ \cos(\Psi + \beta) \end{bmatrix} \qquad \text{F 2.3}$$

The acceleration sensor measures the projection of the acceleration vector to the transverse axis of the vehicle:

$$a_{trans} = \underline{a}^T \begin{bmatrix} -\sin\Psi \\ \cos\Psi \end{bmatrix} \qquad \text{F 2.4}$$

$$a_{trans} = \dot{v}\sin\beta + v \cdot (\dot{\Psi} + \dot{\beta})\cos\beta \qquad \text{F 2.5}$$

After linearization of the trigonometric functions ($\sin \beta = \beta$; $\cos \beta = 1$), the equation can be rewritten as $$\dot{\beta} = \frac{a_{trans}}{v} - \dot{\Psi} - \frac{\dot{v}}{v}\beta \qquad \text{F 2.6}$$

The velocity of the sideslip angle $\dot{\beta}$ can now be calculated corresponding to the above differential equation. Besides the lateral acceleration $a_{lat}$, the yaw rate $\dot{\Psi}$, the scalar velocity of the vehicle v and its time derivative $\dot{v}$ are included as measured variables. To determine $\beta$, $\dot{\beta}$ from the previous calculation can be numerically integrated, and $\dot{v}=0$ is assumed for the first determination of $\dot{\beta}$. A simplification is obtained if the last term is generally ignored, so that no $\beta$ needs to be determined.

The proposed procedure offers the advantage that the velocity of the sideslip angle $\dot{\beta}$ is directly derived from the sensor signals, and thus it can also be determined in the nonlinear range of the transverse dynamics. The disadvantages are the sensitivity of the procedure to measurement noise and the cumulative integration of errors of measurement, as a result of which the determination of the sideslip angle may become highly inaccurate.

Figure 6:
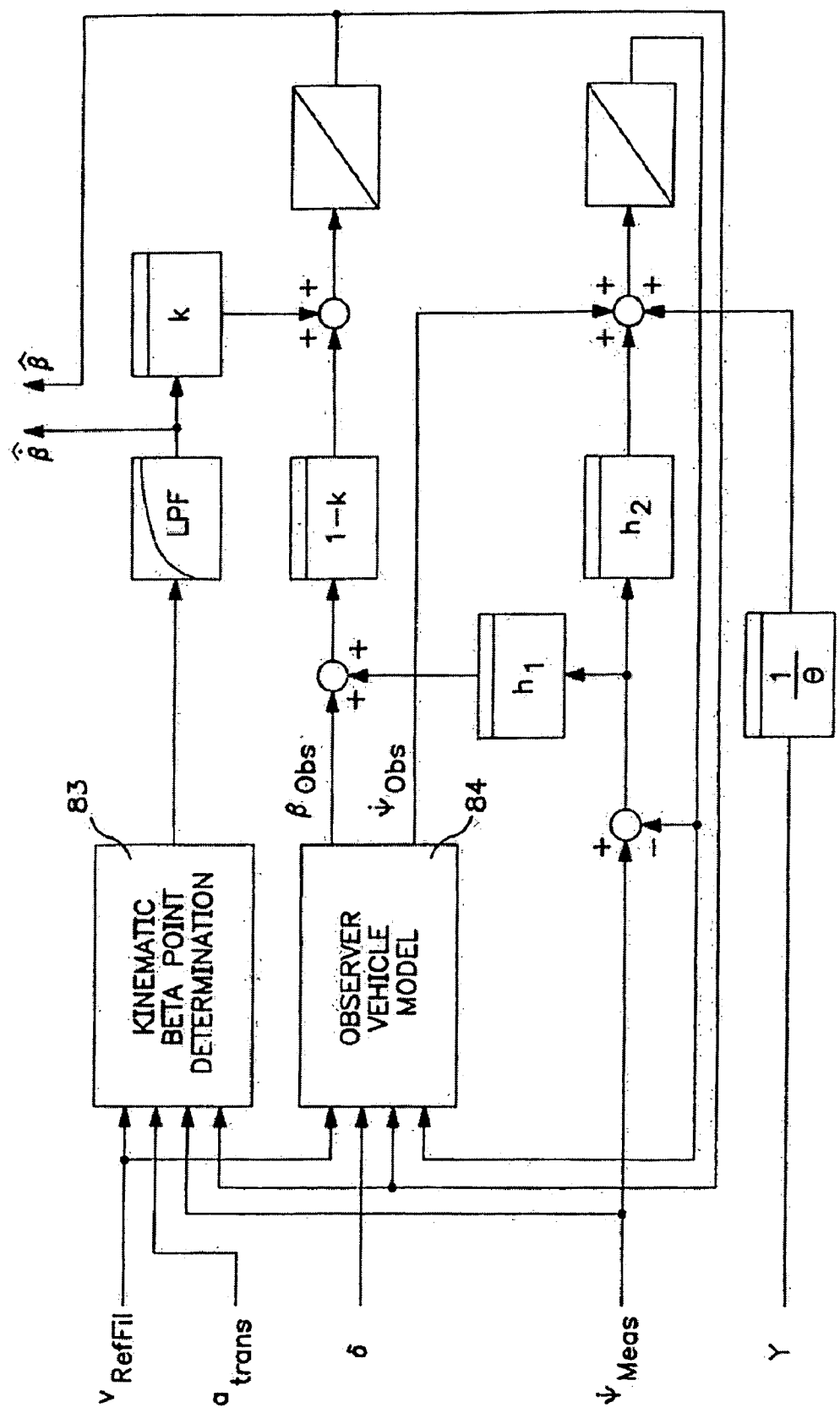
FIGS. 6 and 8 show block diagrams relating to a combined method to determine the current values of the sideslip angle velocity and of the sideslip angle in different types of representation.

These disadvantages are circumvented by the combination with a model-supported procedure. FIG. 6, which can be inserted in place of the block 18 drawn in broken line in FIG. 2, shows such a combination of the kinematic determination with the observer model-supported determination of the velocity of the sideslip angle $\dot{\beta}$. The steering angle $\delta$, which is indicated by an arrow drawn in broken line, is also included as an additional input variable in such a model-supported procedure. The mutual influences and correction of the combined methods of determination of the velocity of the sideslip angle $\dot{\beta}$ also make it possible to calculate the sideslip angle $\beta$ itself with less error, so that it can then also be made available to the control as $\hat{\beta}$. This is also indicated by an arrow drawn in broken line.

2.2.2. Combination of the Kinematic Determination of $\dot{\beta}$ with an Observer Vehicle Model The area 18 bordered in broken lines in FIG. 2 can also be replaced with the representation according to FIG. 6. It will thus become possible to determine not only the existing velocity of the sideslip angle $\dot{\beta}$, but also the prevailing sideslip angle $\beta$.

Contrary to a purely kinematic calculation of the velocity of the sideslip angle $\dot{\beta}$, an observer vehicle model 84 is used here to determine the driving condition, in addition to the kinematic determination of $\dot{\beta}$, i.e. 83. Just like the vehicle reference model 12 for determining the yaw rate, the observer vehicle model 84 receives the steering angle $\delta$ as the input variable. The filtered vehicle reference velocity $v_{RefFil}$ is included as a parameter. The measurable output variables, namely, the lateral acceleration $a_{lat}$ and the yaw rate $\dot{\Psi}_{Meas}$, are needed for the kinematic determination of $\dot{\beta}$, 83, but not for the observer vehicle model 84, which creates these variables, in principle, itself. Another term Y, which is identical in the simplest case to the additional yaw torque calculated by the yaw torque control law unit, represents the changes in the vehicle behavior, which are caused by a control intervention. Y is hence used to expose the observer's simulated vehicle to the same conditions as the real vehicle.

Besides a velocity of the sideslip angle $\dot{\beta}_{Obs}$, the observer vehicle model also gives a value for the yaw acceleration $\ddot{\Psi}_{Obs}$. The variable for the velocity of the sideslip angle $\dot{\beta}$, which originates from the kinematic determination of $\dot{\beta}$, is multiplied by a weighting factor k after passing through the low-pass filter, while the variable for the velocity of the sideslip angle $\dot{\beta}_{Obs}$ Y after addition with a correction factor from the measured yaw angle velocity, is multiplied by a factor h determining the degree of the correction, i.e. a weighting factor (1−k). The value of k is always between 0 and 1. We would have k=1 without the observer vehicle model. After adding the two velocities of the sideslip angles, the sum is integrated into an estimated sideslip angle $\hat{\beta}$. Besides the kinematic velocity of the sideslip angle $\dot{\beta}$, this is also made available to the control. In addition, the sideslip angle $\hat{\beta}$ is transmitted to both the kinematic determination of $\beta$, 83, and the observer vehicle model 84. A similar correcting variable is the yaw acceleration $\ddot{\Psi}$Obs calculated by the observer vehicle model 84.

This is first integrated to a yaw rate and returns to the observer vehicle model 84, on the one hand, and is subtracted from the measured yaw rate $\dot{\Psi}$meas, on the other hand. This difference is multiplied by a factor $h_2$ that determines the value of the next control steps in the correction of the observer vehicle model 84 and is provided with the dimension 1/s. The yaw rate multiplied by this factor $h_2$ has consequently the same dimension as the yaw acceleration $\ddot{\Psi}$, so that the two variables can be added up and form a returning correcting variable for the yaw rate after further integration. In the course of a yaw torque control, the term Y assumes values different from zero, corresponding to the additional yaw torque $M_G$ applied. By being divided by the moment of inertia in yaw $\theta$ of the vehicle, the term Y also acquires the dimension of yaw acceleration and is added to the sum of the yaw accelerations, so that the integrated correction variable also takes into account the control effects or influences.

If an observer vehicle model 84 according to FIG. 6 prevails, which makes possible a more reliable determination of the sideslip angle $\beta$ than would be possible with a purely kinematic determination of the velocity of the sideslip angle $\dot{\beta}$ and integration, the sideslip angle $\hat{\beta}$ thus determined can also be transmitted to the actual yaw torque controller 10.

Figure 7:
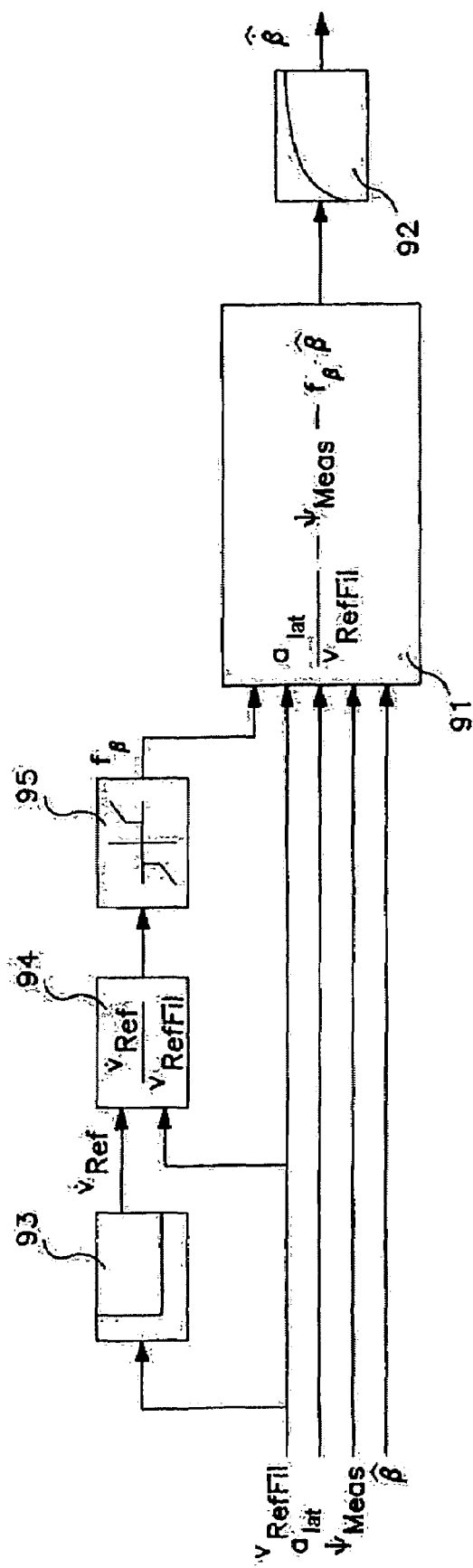
FIG. 7 is a block diagram for the direct determination of the sideslip angle velocity from kinematical considerations as a part of the combined method of FIG. 6.

The kinematic determination of $\dot{\beta}$, which takes place in combination with an observer vehicle model, is shown in FIG. 7. As is apparent already from FIG. 6, the lateral acceleration $a_{lat}$ and the yaw rate $\dot{\Psi}_{Meas}$ are included in the calculation 91 according to Equation F 2.6 as measured output variables.

The filtered vehicle reference velocity $V_{RefFil}$ is differentiated in field 93 to provide the vehicle reference velocity $\dot{v}_{Ref}$, which is divided in field 94 by the filtered vehicle reference velocity $V_{RefFil}$, which leads to a factor f$\beta$ after nonlinear multiplication 95. This nonlinear multiplication 95 leads to the factor f$\beta$ being set to equal zero at low quotients of $\dot{v}_{Ref}$ and $v_{RefFil}$ so that this factor, which precedes the sideslip angle $\hat{\beta}$, can be ignored. The sideslip angle $\hat{\beta}$ is taken into account in the kinematic determination of $\dot{\beta}$ only when the vehicle acceleration $\dot{v}_{Ref}$ reaches a significant value. The $\hat{\beta}$ used here is the combined $\hat{\beta}$, which is used both as a variable for the control and for feedback according to FIG. 6. After calculation 91, the value determined for the velocity of the sideslip angle passes through a low-pass filter 92, as was described above, and it yields the estimated velocity of the sideslip angle $\dot{\beta}$.

The filtered vehicle reference velocity $v_{RefFil}$ is differentiated in field 93 to provide the vehicle reference velocity $\dot{v}_{Ref}$, which is divided in field 94 by the filtered vehicle reference velocity $v_{RefFil}$, which leads to a factor f$\beta$ after nonlinear multiplication 95. This nonlinear multiplication 95 leads to the factor f$\beta$ being set to equal zero at low quotients of $\dot{v}_{Ref}$ and $v_{RefFil}$ so that this factor, which precedes the sideslip angle $\hat{\beta}$, can be ignored. The sideslip angle $\hat{\beta}$ is taken into account in the kinematic determination of $\hat{\beta}$ only when the vehicle acceleration $\dot{v}_{Ref}$ reaches a significant value. The $\hat{\beta}$ used herein is the combined $\hat{\beta}$, which is used both as a variable for the control and for feedback according to FIG. 6. After calculation 91, the value determined for the velocity of the sideslip angle passes through a low-pass filter 92, as was described above, and it yields the estimated velocity of the sideslip angle $\dot{\hat{\beta}}$.

Figure 8:
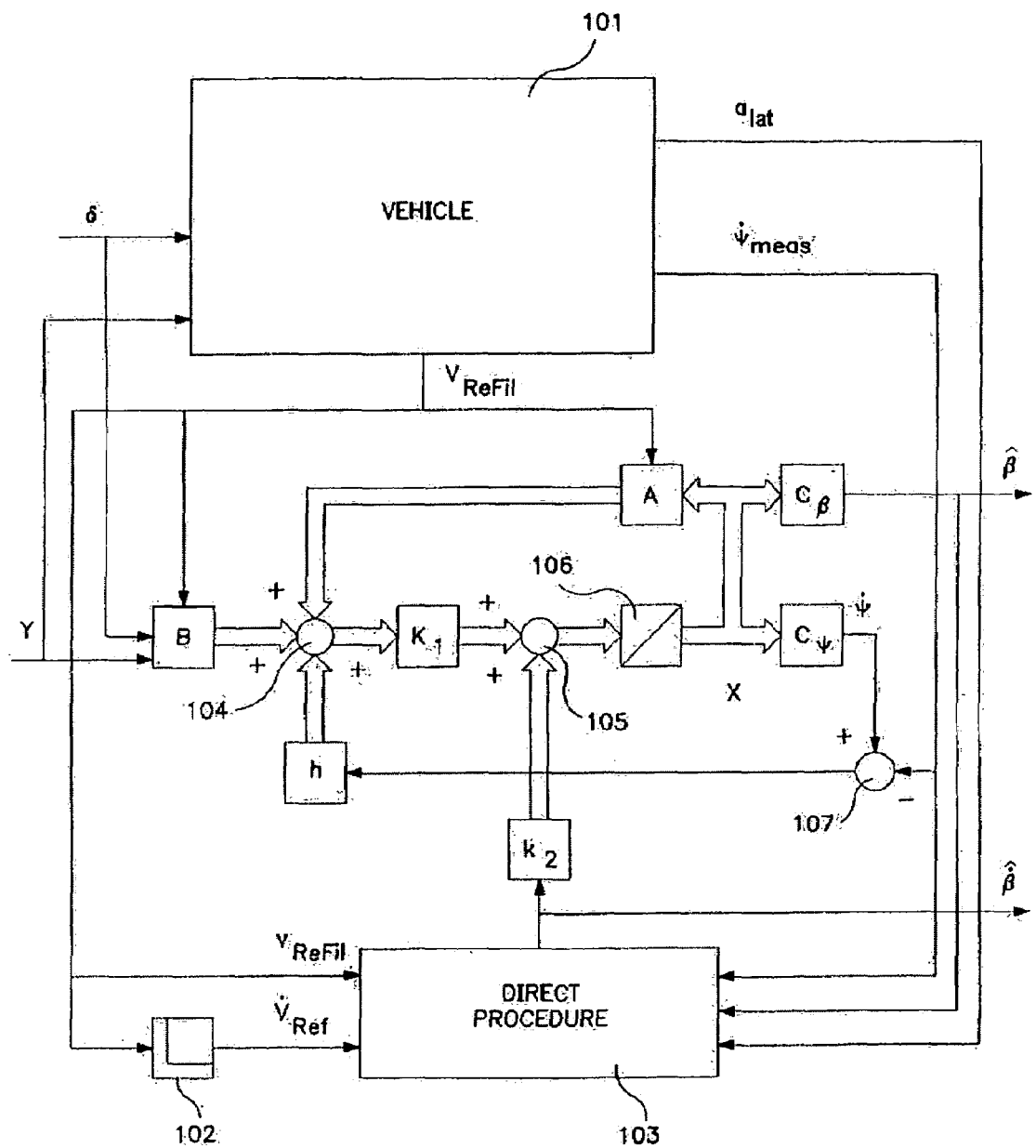

FIG. 8 shows how the observer vehicle model 84 from FIG. 6 operates. A matrix representation was selected, in which "→" are scalar and "⇒" multidimensional formations.

The matrix representation is based on Equations F 1.1 through F 1.3 The phase variables $\beta$ and $\dot{\Psi}$ are combined into a phase vector $\underline{x}(t)$, so that the following set of equations is obtained:

$$\underline{\dot{x}}(t) = \underline{A}(v(t))\underline{x}(t) + \underline{B}(v(t))\underline{u}(t) \qquad \text{F 2.7}$$

with the system matrix $\underline{A}(v(t))$, the input matrix $B(v(t))$, the phase vector $\underline{x}(t)$ and the input vector $\underline{u}(t)$:

$$\underline{A}(v(t)) = \begin{bmatrix} -\dfrac{c_h + c_v}{mv(t)} & -1 + \dfrac{c_h l_h - c_v l_v}{mv^2(t)} \\ \dfrac{c_h l_h - c_v l_v}{\Theta} & -\dfrac{c_h l_h^2 + c_v l_v^2}{\Theta v(t)} \end{bmatrix} \qquad \text{F 2.8}$$

$$\underline{B}(v(t)) = \begin{bmatrix} \dfrac{c_v}{mv(t)} & 0 \\ \dfrac{c_v l_v}{\Theta} & \dfrac{1}{\Theta} \end{bmatrix}; \underline{x}(t) = \begin{bmatrix} \beta(t) \\ \dot{\Psi}(t) \end{bmatrix}; \underline{u}(t) = \begin{bmatrix} \delta \\ Y \end{bmatrix}$$

The input vector $\underline{u}(t)$ contains as the input variables the steering angle $\delta$ and the term Y, which is the additional yaw torque generated by the yaw torque control system.

Instead of weighting factors, a weighting matrix $\underline{K}_1$ and a weighting vector $\underline{k}_2$ are used for the weighted addition of the variables determined.

$$K_1 = \begin{bmatrix} 1-k & 0 \\ 0 & 1 \end{bmatrix}; \underline{k}_2 = \begin{bmatrix} k \\ 0 \end{bmatrix}; 0 \le k \le 1 \qquad \text{F 2.9}$$

To eliminate the process variables, two vectors, $\underline{c}\beta$ and $c\dot{\Psi}$, are introduced, with cancel one component of phase vector $x(t)$ each:

$$c_\beta = [1,0]; c\dot{\Psi} = [0,1] \qquad \text{F 2.10}$$

The dynamics of the observer vehicle model, i.e., the value of the correction steps, is determined by a vector $\underline{h}$, whose first component, $h_1$, is dimensionless, and whose second component, $h_2$, has the dimension (1/s):

$$\underline{h} = \begin{bmatrix} h_1 \\ h_2 \end{bmatrix} \qquad \text{F 2.11}$$

Based on the vehicle model in the description of the phase space (F 1.1 and F 1.2), the structure described below is then obtained for determining the sideslip angle $\beta$ by means of an observer according to FIG. 8.

The vehicle 101 is shown in FIG. 8 only to distinguish between input variables and output variables. It is not a part of the combined procedure for determining the velocity of the sideslip angle $\dot{\hat{\beta}}$.

The system equations according to F 2.7 are formed in the adder 104. To do so, the system matrix $\underline{A}$ is multiplied by the phase vector $\underline{x}$, and the input matrix $\underline{B}$ is multiplied by the input variables $\delta$ and y, i.e., with the input vector $\underline{u}$.

The current vehicle reference velocity $v_{RefFil}$ is included as the only variable parameter in both the system matrix $\underline{A}$ and the input matrix $\underline{B}$. The time derivative $\underline{\dot{x}}$ of the phase vector $\underline{x}$, formed in the adder 104 by addition, is now multiplied by the weighting matrix $$\frac{K_1}{i}$$

according to F 2.9 and is sent to another adder 105.

Simultaneously to these processes, a velocity of the sideslip angle $\dot{\hat{\beta}}$ is estimated in the direct procedure 103. The filtered vehicle reference velocity $v_{RefFil}$, as well as its time derivative $\dot{v}_{Ref}$, determined in the differentiator 102 (identified by 93 in FIG. 7), the measured lateral acceleration $a_{lat}$, as well as the measured yaw rate $\dot{\Psi}_{Meas}$ according to Equation F 2.6 are used for this. The last term of the equation is ignored in the first step, because no value of the sideslip angle $\beta$ is available as yet. After the velocity of the sideslip angle is determined, it still passes through the low-pass filter 92, as was shown in FIG. 7, after which the resulting estimated velocity of the sideslip angle $\dot{\hat{\beta}}$ is made available for the further calculation. This $\dot{\hat{\beta}}$ corresponds to the $\dot{\hat{\beta}}$ which is output from the shaded field in FIG. 2. The scalar $\dot{\hat{\beta}}$ is multiplied by the weighting factor $\underline{k}_2$, so that a vector is obtained from this, whose first component has the dimension of an angular velocity, and whose second component equals zero. This vector is also sent to the adder 105. The vector resulting from the sum of the time derivative $\underline{\dot{x}}$ of the phase vector $\underline{x}$ formed according to Equation F 2.7 and of the vector obtained from the multiplication with $\underline{k}_2$ is integrated in the integrator 106 into the phase vector $\underline{x}$. One of the components $\beta$ and $\dot{\Psi}$ is eliminated from the phase vector by scalar multiplication with $\dot{\Psi}$ and is further processed. While the estimated $\dot{\hat{\beta}}$ is sent to the YTC control law unit 16, on the one hand, and to the direct process 103, on the other hand, the calculated $\dot{\Psi}$ is used within the combined process only as a state variable within the observer and for determining the error of estimation. The difference between the yaw rate $\dot{\Psi}$ determined from the observer vehicle model and the measured yaw rate $\dot{\Psi}_{Meas}$ is formed for this purpose in the adder 107. This difference is multiplied by a vector $\underline{h}$, whose first component is dimensionless and sets the value of the correction steps for the velocity of the sideslip angle $\dot{\beta}$, and whose second component has the dimension $s^{-1}$ and determines the value of the control steps during the correction of the yaw rate $\dot{\Psi}$.

The sideslip angle $\dot{\hat{\beta}}$ is also returned as a correcting variable; specifically, it is fed back into the direct procedure of the kinematic determination of $\hat{\beta}$ according to FIG. 7, so that the last term of Equation F 2.6 can also be assigned a value in the subsequent control step.

A substantially more accurate determination of the sideslip angle $\dot{\hat{\beta}}$ is possible due to the mutual correction of the two calculation procedures, i.e., the calculation on the basis of a vehicle model and the calculation on the basis of kinematic considerations, so that this sideslip angle can also be sent as a controlled variable to the YTC control law unit 16.

2.3 Vehicle Reference Models

The vehicle reference model will be explained below on the basis of FIGS. 9 through 15.

Figure 9:
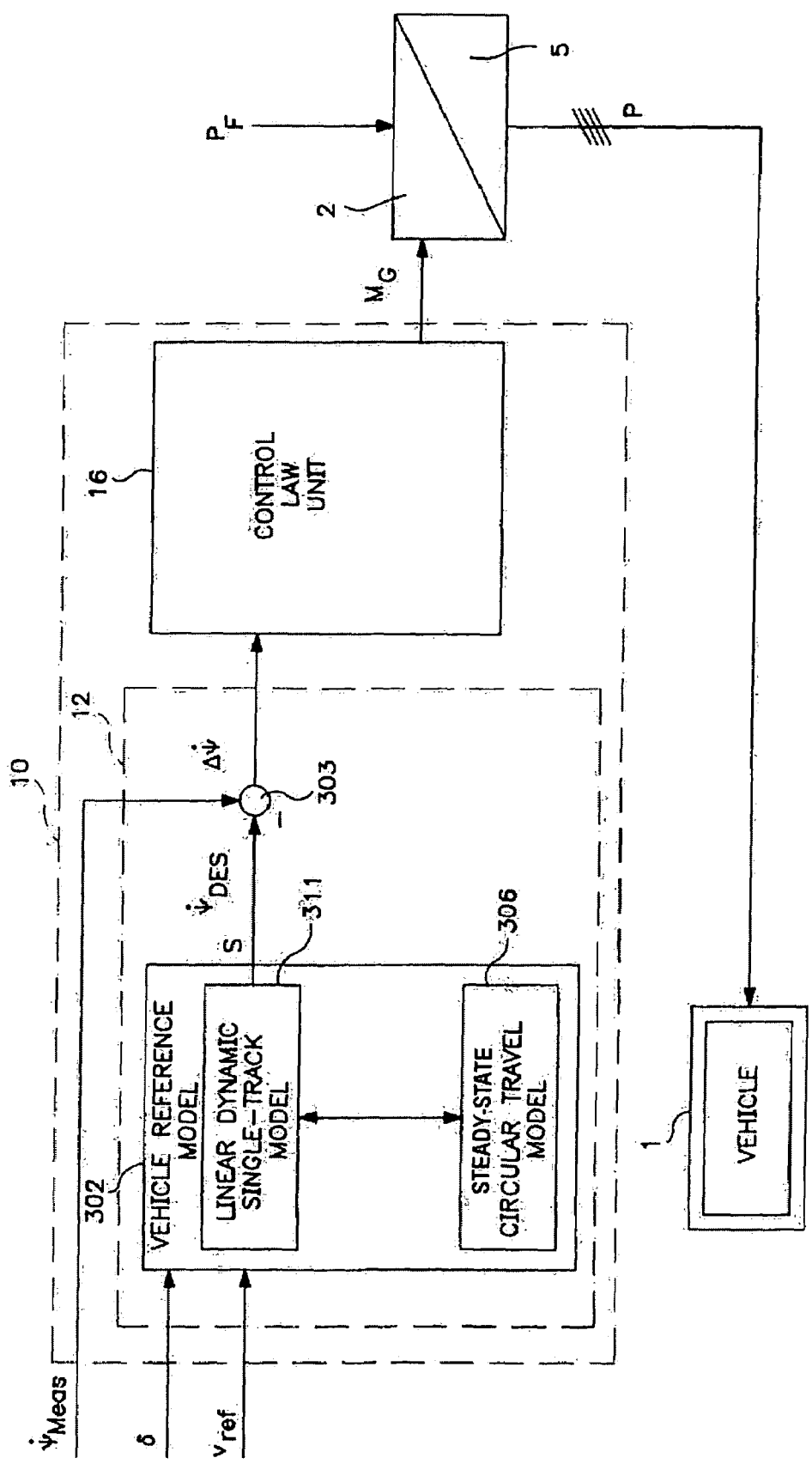
FIG. 9 is a control circuit for driving stability control with a driving-speed-responsive change of the computing model for the vehicle.
Figure 10:
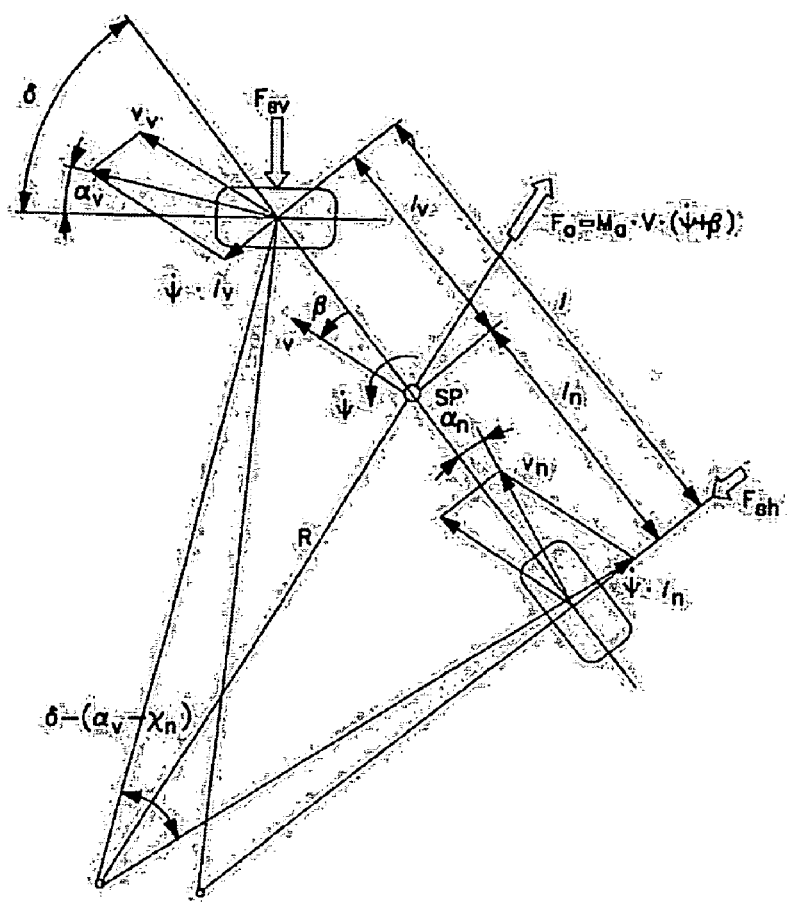
FIGS. 10 and 11 show diagrams exhibiting the dependency of the slip angle difference of a vehicle on the sideslip angle and the speed vector of the individual wheels.
Figure 11A:
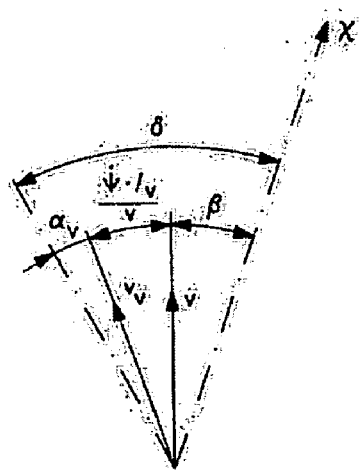
Figure 11B:
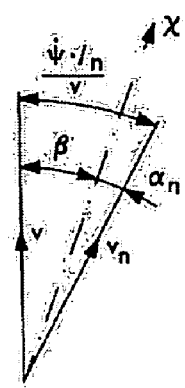

FIG. 9 shows an even more simplified version of the control circuit according to FIG. 1 and FIG. 2 for controlling the driving stability of a vehicle. The controllers 7 through 9 in FIG. 1, the associated priority circuit 3 and the motor management 6 are omitted, and the distribution logic unit 2 is shown combined with the pressure control unit 5. An additional yaw torque $M_G$ around the vertical axis is calculated and set within the control circuit, so that the curve path desired by the driver is maintained. The additional yaw torque $M_G$ is generated by specific braking processes on the individual wheels, and the course of the braking processes and the selection of the wheels to be braked are set by the distribution logic unit 2. The desired direction of travel is set by the driver by selecting a corresponding angular position of the steering wheel. The steering wheel is coupled with the steered wheels in a fixed transmission ratio (steering ratio). A defined steering angle $\delta$ of the wheels is thus set.

2.3.1. Dynamic Single-Track Model

A so-called vehicle reference model 12 (FIG. 2)=302 (FIG. 9), which is supplied with input data (velocity v, represented by $v_{Ref}$, steering angle $\delta$), is provided in the YTC controller 10. The size of the change in the yaw angle (yaw rate $\dot{\Psi}_{Desired}$) per time unit is calculated in the vehicle reference model 302 on the basis of the input data. The desired value of the yaw rate $\dot{\Psi}_{Desired}$ is compared with the measured actual value of the yaw rate $\dot{\Psi}_{Meas}$ in a downstream comparison unit 303. The comparison unit 303 sends as an output value an output variable $\Delta\dot{\Psi}$, which corresponds to the difference between $\dot{\Psi}_{Desired}$ and $\dot{\Psi}_{Meas}$. The difference value thus determined is sent to a control law unit 16 for controlling the yaw torque. On the basis of $\Delta\dot{\Psi}$, the control law unit calculates an additional yaw torque $M_G$, which is sent to the distribution logic unit 2. Based on the additional yaw torque $M_G$ and possibly the driver's desire to build up pressure in the brakes, $p_{Brake}$, the distribution logic unit 2 sets output variables. These may be brake pressure values or valve switching times.

Optimal mode of operation of the vehicle reference model 302 is also important in the range of low velocities. To ensure this, the vehicle reference model 302 may also be provided with a steady-state circular travel model 306, in addition to the above-described linear dynamic single-track model 311.

For the steady-state circular travel:

$$\dot{\Psi}_{desired} = \delta * \frac{v}{l_v + l_h} * \frac{l}{1 + \frac{v^2}{v_{ch}^2}} + \dot{\Psi}_{korr} \qquad \text{F 2.12}$$

$$\beta = \delta * \frac{1 - \frac{l_v}{l_v + l_h} * \left(1 + \frac{m * v^2}{c_h * (l_v + l_h)}\right)}{1 + \frac{v^2}{v_{ch}^2}} + \beta_{korr} \qquad \text{F 2.13}$$

in which $$v_{ch}^2 = \frac{c_v * c_h * (l_h + l_v)^2}{m * (c_h * l_h - c_v * l_v)} \qquad \text{F 2.14}$$

Here, v=front; h=rear; m=weight; l=distance between the axle and the center of gravity; $\dot{\Psi}_{korr}$, $\beta\dot{\Psi}_{korr}$=correction terms for, $\dot{\Psi}$, $\beta$ respectively.

The system equations F 1.1 and F 1.2 are valid for the linear dynamic single-track model.

The switching over between the calculation models 306 and 311 is performed automatically by a change-over switch (not shown in the drawing) in the vehicle reference model 302 as a function of the velocity of the vehicle. A hysteresis of a few km/h is provided for switch-over processes from one model to the other. Below the switching threshold, the desired yaw rate $\dot{\Psi}_{Desired}$ is calculated according to the model of steady-state circular travel. If the velocity, increasing from a lower value, exceeds the threshold that applies to this direction, the calculation of the desired value of the yaw rate $\dot{\Psi}_{Desired}$ is performed by means of the dynamic single-track model 311. The dynamic processes that are particularly important for control at higher velocities are thus incorporated in the model.

The desired values calculated by the circular travel model, such as $\dot{\Psi}_{Desired}$ and $\beta$, are used as the starting values for the single-track model when switching over from the circular travel model 306 to the single-track model 311. As a result, transient effects during switch-over are avoided. Further calculation is performed by means of the single-track model 311 until the velocity drops below the velocity threshold, which is lower for decreasing velocity. To minimize transient effects here as well, the correction factors $\dot{\Psi}_{korr}$ and $\beta_{korr}$ necessary for the circular travel model are calculated with the values for $\dot{\Psi}_{Desired}$ and $\beta$, which were calculated before in the single-track model, as well as with the velocity $v_{Ref}$ and the steering angle $\delta$ as the input variables.

The correction values are as follows:

$$\dot{\Psi}_{korr} = \dot{\Psi}_{desired} - \delta * \frac{v}{l_v + l_h} * \frac{1}{1 + \frac{v^2}{v_{ch}^2}} \qquad \text{F 2.15}$$

$$\beta_{korr} = \beta - \delta * \frac{1 - \frac{l_v}{l_v + l_h} * \left(1 + \frac{m * v^2}{c_h * (l_v + l_h)}\right)}{1 + \frac{v^2}{v_{ch}^2}} \qquad \text{F 2.16}$$

The effect of these correction factors decreases exponentially over time according to the equation:

$$korr(n+1) = korr(n) * \lambda \qquad \text{F 2.17}$$

in which $\lambda$ may assume values between 0 and less than 1. The calculation runs are counted with n and n+1.

Sudden changes are avoided as a result, because the two calculation methods yield different results in the steady-state case. Thus, the changeover between calculation models offers the possibility of determining the desired values for the control system at a rather high accuracy to velocities of v=0 km/h.

It was explained in connection with FIG. 9 that different models can be considered for use as vehicle calculation models. The steady-state circular travel may be a preferred model. The yaw rate $\dot{\Psi}_{Desired}$ can be calculated according to this model from the above formula. If such a vehicle calculation model is to be represented, it is possible to send the measured values $\lambda$ and $v_{Ref}$ to a calculation circuit and to subsequently poll the desired value of the yaw rate $\dot{\Psi}_{Desired}$ as an output value.

2.3.3. Simplified Model

An extremely simple model for determining a desired yaw rate will be described below. It shall be an alternative to the above-described combination model. It is characterized in that an acceptable result is obtained with a small amount of calculations.

The desired yaw rate $\dot{\Psi}_{Desired}$ is calculated according to this model as follows:

$$\dot{\Psi}_{desired} = \frac{\delta * v}{l} \qquad \text{F 2.18}$$

This equation is obtained from F 2.12, with equations F 2.14 and F 2.15 if the rigidities $c_r$ and $c_l$ are assumed to be very high.

This hypothesis is based on the following considerations.

In the vehicle reference model described above, the desired yaw rate $\dot{\Psi}_{Desired}$ is calculated either by means of a dynamic vehicle model (e.g., a single-track model) or by a static model (called steady-state circular travel value) and is compared with the measured yaw rate $\dot{\Psi}_{Meas}$. However, the preset value (and consequently also the control intervention) depend directly on the quality of the vehicle model in each of these hypotheses. Since these are linear equivalent models, the model markedly differs in some cases from the actual behavior of the vehicle.

If the real behavior of the vehicle additionally changes due to, e.g., load or wear of individual components, the model describes the vehicle only insufficiently. Consequently, adaptation of the model should be performed by means of a continuous parameter estimation, in connection with which the following problems arise:

An excitation must be present for the estimation, i.e., the driver should sufficiently excite the vehicle by means of a steering instruction in the linear range (<0.4 g). This hardly applies to normal driving.

Furthermore, it is not possible to directly estimate all parameters of the linear single-track model. Thus, certain parameters should be pre-selected as fixed parameters.

Consequently, control on the basis of model hypotheses can always offer a satisfactory solution only regarding the model preset values. It may therefore be sufficient in many cases to proceed according to a simpler control principle.

One important goal of driving stability control is to coordinate the driving behavior such that the response of the vehicle to steering, braking and gas pedal inputs of the driver is always predictable and readily controllable. Consequently, understeering and oversteering operating conditions of the vehicle must be recognized and corrected to neutral behavior by a corresponding braking or engine management intervention.

The idea of simplified control principle is that a direct indicator of the understeering/oversteering behavior is used as a controlled variable. According to a definition of the steering behavior of a motor vehicle, the mean slip angles of the front axle and rear axle ($\alpha_v$, $\alpha_H$) are compared for this purpose. In the case of greater slip angles of the front axle, the vehicle thus exhibits an understeering behavior, and, in the opposite case, an oversteering behavior. According to the definition, neutral behavior is present if the slip angles front and rear are equal. Thus, >0: understeering $\alpha_v - \alpha_h = 0$: neutral <0: oversteering applies. F 2.19

Based on the difference of the slip angles, it is consequently possible to directly determine the instantaneous driving condition of the vehicle. If the single-track vehicle model (FIG. 10) is used as a hypothesis, the slip angles can be derived from this as a function of the steering angle $\delta$, the sideslip angle $\beta$, the yaw rate $\dot{\Psi}$ and the velocity of the vehicle v, as follows:

$$a_v = \delta\beta \frac{\dot{\Psi} * l_v}{v} \qquad \text{F 2.20a}$$

$$a_h = \beta + \frac{\dot{\Psi} * l_h}{v} \qquad \text{F 2.20b}$$

Since the sideslip angle cannot be directly measured or calculated in a simple manner, an explicit calculation of the individual slip angles must be performed. However, if their difference is formed, it is possible to calculate this variable on the basis of the existing measured variables (steering angle, yaw rate), of the vehicle reference velocity $v_{Ref}$ known from the ABS controller and from the constant wheel base 1.

$$a_v - a_h = \delta - \frac{l * \dot{\Psi}}{v} \qquad \text{F 2.21}$$

Thus, a variable that can be used as an indicator of understeering/oversteering is available.

If the known relationship between the instantaneous curve radius R of the curve path of the center of gravity of the vehicle and the difference of the slip angles is also considered $$R = \frac{1}{\delta - (a_v - a_h)} \qquad \text{F 2.22}$$

It can be recognized that if a neutral state of the vehicle (F 2.19) is assumed $$a_v - a_h = 0 \qquad \text{F 2.23}$$

the curve radius R can be determined only by the steering angle, namely, $$R = \frac{1}{\delta} \qquad \text{F 2.24}$$

A control that directly uses the calculated slip angle difference as the controlled variable is therefore possible. The instruction for this control is to keep the value of this controlled variable as small as possible in order thus to achieve an approximately neutral behavior. It may be meaningful to assume this tolerance threshold to be asymmetric, so that the tolerance can be selected to be smaller in the direction of oversteering behavior.

The desired yaw rate $\dot{\Psi}_{Desired}$ can be calculated according to these considerations (F 2.18). This yaw rate $\dot{\Psi}_{Desired}$ is then compared with $\dot{\Psi}_{Meas}$ and is used as the basis of the control according to FIG. 1.

2.3.5 Desired Value Limitation in the YTC Controller

Controlling the driving behavior of the vehicle makes sense only as long as the adhesion of the wheels of the vehicle on the road surface permits the calculated additional torque to act on the vehicle.

It is undesirable, e.g., for the control to always force the vehicle to the curve path predetermined by the steering angle δ when the steering wheel was turned in excessively or too rapidly in relation to the existing velocity of the vehicle.

$\dot{\Psi}_{Desired}$ should therefore be prevented from always being selected as the preset value under all circumstances, according to the vehicle reference model selected, because if the reference model alone is followed, it may happen under unfortunate circumstances that if the steering wheel angle is accidentally set at an excessively high value, and the velocity is also high at the same time, the actual yaw rate $\dot{\Psi}$ will be changed so much, due to the fact that $\dot{\Psi}_{Desired}$ is also too high in this case, that the vehicle will rotate around its own axis in the extreme case, while its center of gravity is moving in an essentially straight line at the same time. This condition is even much more unfavorable for the driver than the condition in which the vehicle is unable to obey the driver's desire due to the poor friction conditions and pushes out in a strongly understeering manner. This is true because the vehicle will at most only travel straight in this case, without also rotating around its own axis. To avoid these consequences, which are disadvantageous in special cases, calculation algorithms, which make it possible to set the maximum yaw rate $\dot{\Psi}_{Desired\,max}$ valid for the velocity just measured by way of the coefficient of friction $\hat{\mu}$, are additionally provided in the vehicle reference model. $\hat{\mu}$ is determined in the coefficient-of-friction detection system 13. The calculation algorithms are based on the theory of steady-state circular travel, for which $$\dot{\Psi} = a_{trans}/v \qquad (F\ 2.18).$$

The maximum allowable lateral acceleration $a_{latlim}$ can be determined essentially as a function of the coefficient of friction, the velocity v, the longitudinal acceleration $a_{long}$, and possibly other parameters. Thus, $$a_{q\ lim} = f(\mu, v, a_{long}, \dots) \qquad F\ 2.25$$

The maximum yaw rate can be calculated as:

$$\dot{\Psi}_{Desiredmax} = \frac{a_{qlim}}{v} \qquad F\ 2.26$$

It is therefore possible to set a limit value for the yaw rate, which does not take the driver's wish directly into account any longer, but it contributes to preventing the vehicle from additionally rotating around its vertical axis when it swings out.

Details of the suitable determination of μ will be described under 2.1.

Provisions can also be made to permit a control intervention only under certain prevailing conditions. One possibility for this may be, e.g., for the activation logic unit 11 in FIG. 2 to not transmit any current $M_G$ to the distribution logic unit 2 when an excessively large sideslip angle $\hat{\beta}$ is determined, which can happen depending on the just occurring velocity.

2.4 Control Law Unit of the YTC Controller

The program structure of the control law unit 16 of the yaw torque controller 10 will be described below. From four input variables, the program calculates the additional yaw torque $M_G$ around the vertical axis of the vehicle that is necessary to obtain a stable vehicle behavior especially during travel in a curve. The yaw torque $M_G$ calculated is the basis for the calculations of the pressures to be applied to the wheel brakes.

The following input variables are available for the control law unit (see FIG. 17):
At input 500: $\Delta\dot{\Psi}$
at input 501: $\Delta\ddot{\Psi}$
at input 502: $\hat{\beta}$
at input 503: $\hat{\beta}$ If the slip angle difference is used as a basis, $\Delta\dot{\Psi}$ is present at the input 500 and $\Delta\ddot{\Psi}$ is present at the input 501.

Input 503 is facultative. It is available especially when a so-called observer vehicle model 84 is provided in the overall calculation system.

The value at input 500 is obtained as the difference between the measured yaw rate $\dot{\Psi}_{Meas}$ and the desired yaw rate $\dot{\Psi}_{Desired}$ calculated by means of a vehicle reference model 12.

The value at input 501 is obtained either as a change in the variable at input 500 over time from one calculation loop to the next, divided by the loop time $T_0$, or as a difference between the time derivative of the measured yaw rate and the time derivative of the calculated desired yaw rate.

A calculation loop is defined as a calculation run through the DSC driving stability controller according to FIG. 1. Due to its structure, such a loop requires a certain amount of real time, the loop time $T_0$. This must be kept sufficiently short for an effective control.

The values at the inputs 500 and 501, namely, $\Delta\dot{\Psi}$ and $\Delta\ddot{\Psi}$, are first sent to a respective low-pass filter 510 and 511.

Figure 18:
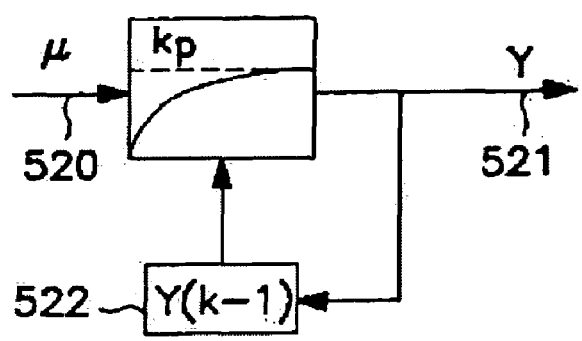
FIG. 18 is a block diagram for describing a low-pass filter.

The two low-pass filters are, in principle, of the same design, and have the structure shown in FIG. 18.

The input variable 520 of the low-pass filter according to FIG. 18 is designated by u, and the output variable 521 is designated by y. The output variable 521 is sent to a register 522 and is available as a previous value y(k−1) at the time of the next calculation. The output value 521 for the calculation loop can then be calculated according to the formula $$y(k) = \lambda * y(k-1) + (1-\lambda) * u * k_p \qquad F\ 2.27$$

in which λ may assume values between 0 and 1. λ describes the quality of the low-pass filter. The recursion function is eliminated at the limit value λ=0: The previous values y(k−1) are of no significance for the calculation of the new output value 521. The more closely λ approaches the value of 1, the stronger will be the effect of the previous values, so that the current input value 520 becomes established as an output value 521 only slowly.

$k_p$ is a linear rating factor.

The low-pass filtration just described is performed for both input values 500 and 501, and it leads to filtered values 515, 516.

An identical low-pass filtration 512 is performed for the input variable 502, namely, $\hat{\beta}$. The filtered value 517 is sent, just as the unfiltered value 503, to nonlinear filters 523, 524. These filters 523, 524 have the task of setting the output value to 0 for low input values and of transmitting an input value reduced by the limit value for input values that are above a certain limit value. The limitation is performed in the negative and positive ranges alike. The limit values βth and βth may be fixed values implemented in the program, but they may also be variables that depend on other parameters, e.g., the coefficient of friction between the tires and the road surface. The limit values are calculated separately as a linear function of the coefficient of friction in this case.

All four variables, namely, 515, 516, 517 and 518, are weighted with a linear factor each in a next step 530, 531, 532 and 533, respectively.

These factors are implemented as fixed values in the calculation system. They can be calculated, in terms of their order of magnitude, from corresponding vehicle models, but they need, in general, a fine adjustment by driving tests. A corresponding set of linear factors is thus set for each vehicle or for each model of vehicle. The input variables 500, 501, 502, 503 thus weighted are added up, and (addition member 540) the additional yaw torque $M_G$ is obtained, which is used as the basis for the further calculation process of the program.

However, it was found in practice that modifications of the calculated yaw torque are still necessary.

Two approaches can be made to this end:
1. The input variables, especially $\Delta\dot{\Psi}$, are modified.
2. The calculated yaw torque $M_G$ is subjected to filtration.

Attempts are made with both approaches to perform the control not only in consideration of the yaw rate, but also in consideration of the sideslip angle.

2.4.1 Modification of the Input Variables

As explained, a desired value is calculated for the yaw rate by means of a vehicle reference model. Since the vehicle reference model cannot completely agree with the actual conditions, it is usually necessary to correct the result of the model calculation once again. The values which are provided by a yaw rate sensor, as well as a steering angle sensor, are essentially evaluated in the reference model. Correction of the calculated desired yaw rate can be performed by additionally taking into account the values provided by a lateral acceleration sensor.

The evaluation may be performed in various manners. One way is proposed below, according to which the measured lateral acceleration is first converted into a velocity of the sideslip angle $\dot{\beta}$. A correction of the desired value for the yaw rate is performed with this value.

The calculation of $\dot{\beta}$ is performed, e.g., by the kinematic determination of $\beta$ 14, 15 (FIG. 2).

Figure 19:
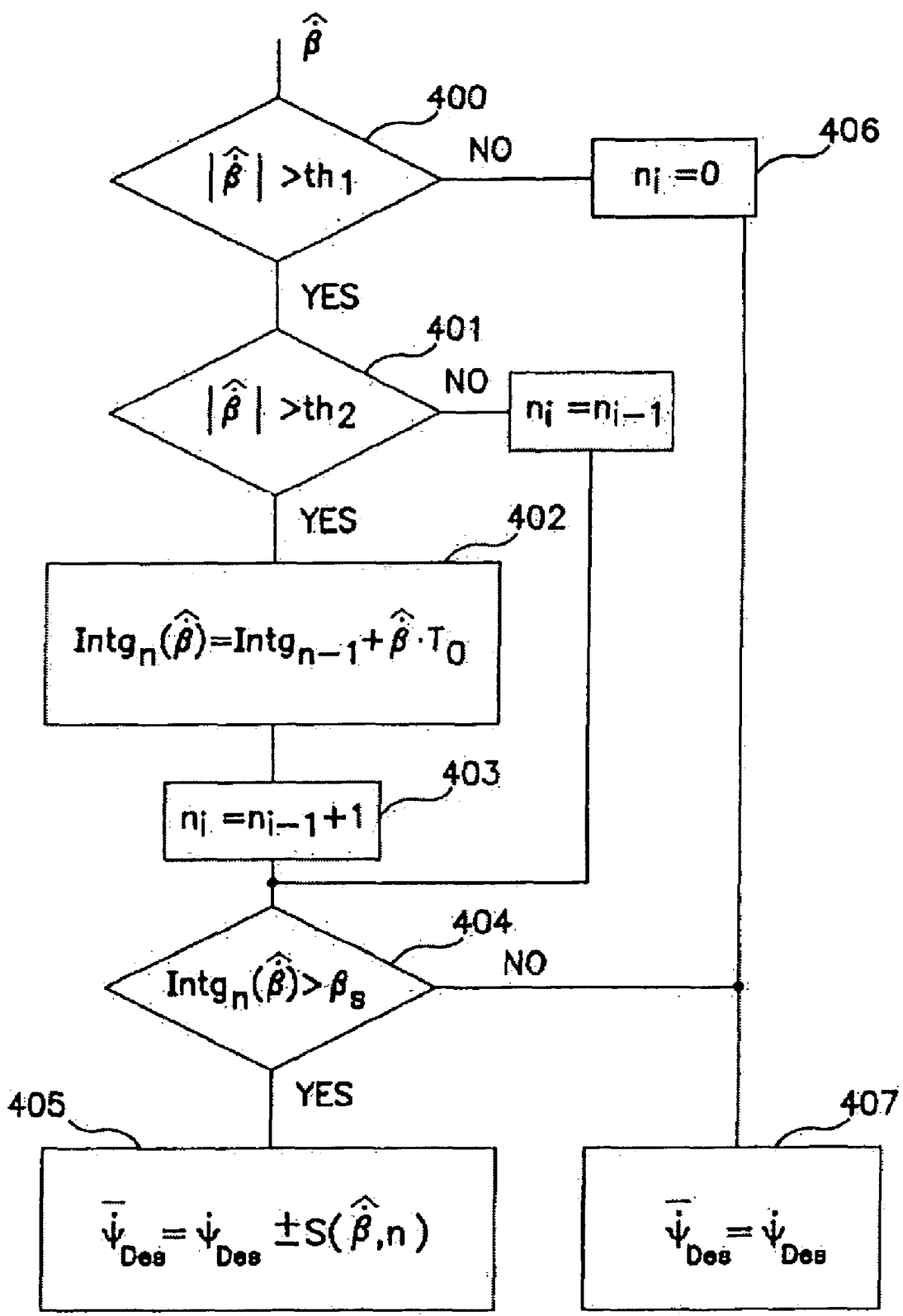
FIG. 19 is a flow chart for calculating a corrected nominal yaw velocity.

The procedure is carried out according to the scheme shown in FIG. 19. The estimated value of the velocity of the sideslip angle $\dot{\beta}$ is compared with a first threshold value $th_1$ (block 400), if desired, after a low-pass filtration. The meaning of this comparison will appear only after a correction of the desired value of yaw rate $\dot{\Psi}_{Desired}$, and it is therefore explained in greater detail below.

If $\dot{\beta} > th_1$, the value of $\dot{\beta}$ is compared with a second threshold value $th_2$ (block 401), and the second threshold value is higher than the first threshold value $th_1$. If this threshold value is also exceeded, integration 402 of the velocity of the sideslip angle $\dot{\beta}$ over time is first performed. To do so, the velocity of the sideslip angle $\dot{\beta}$ is multiplied by the loop time $T_0$ and added to the previous integration result $Intg_{i-1}$. The integration steps are counted with n, so that the number n is increased by 1 after the integration (step 403). The integration time is thus represented by the number n of integration steps performed. The integration result $Intg_n$ ($\dot{\beta}$) is compared with a threshold value $\beta s$ (block 404). The amount of the threshold value represents a maximum allowable deviation from a sideslip angle that is theoretically to be maintained. The threshold value $\beta s$ is in the order of magnitude of approximately 5°.

If this threshold value is exceeded, the desired yaw rate $\dot{\Psi}_{Desired}$ is newly evaluated by an additive constant S (step 405), which depends on the instantaneous velocity of the sideslip angle $\dot{\beta}$ and the number n of integration steps. This means that the desired yaw rate is further reduced with each new loop in which the threshold value $\beta s$ is exceeded. The additive constant S is either added or subtracted, depending on the sign of $\dot{\Psi}_{Desired}$, so that the value of the desired yaw rate is reduced at any rate. If $Intg_n$ does not reach the threshold value $\beta s$, $\dot{\Psi}$ is not limited (step 407).

The estimated velocity of the sideslip angle is checked again in a repeated loop to determine whether its value is lower than the threshold $th_1$. If so, this is interpreted as meaning that the vehicle has again stabilized. The consequence of this is that n in step 406 is again set at 0 and that the further calculation in step 407 is based on a desired yaw rate that is not corrected, i.e., it is identical to the value obtained as the result of the vehicle reference model. In addition, the start value $Intg_{n-1}$ of the integration is set to equal zero.

If the value of a velocity of the sideslip angle exceeds $th_1$, but not $th_2$, the old value $Intg_n$ remains unchanged, i.e., the integration is omitted for one loop. The previous limitation is preserved. Should the threshold value $th_2$ be exceeded again, the integration is continued.

2.4.2 Correction of $M_G$

Another possibility is to manipulate the yaw torque $M_G$, which is calculated by the control law unit 16. To do so, the difference between the previous value $M_1(k-1)$ and the current value $M_1(k)$ is formed. The subscript 1 indicates that these values are the direct result of the yaw torque controller, i.e., they were not yet calculated on the basis of the next correction. This difference is related to the loop time $T_0$ and yields $\Delta M_1$. A correction gradient, which is obtained from $\dot{\beta}$ multiplied by a correction factor, is added to this gradient $\Delta M_1$. The gradient thus corrected is multiplied by the loop time $T_0$ and is added to the yaw torque $M_1(k-1)$ of the preceding calculation. This leads to the current moment $M_G(k)$, which is used as the basis for the further calculation.

Figure 20:
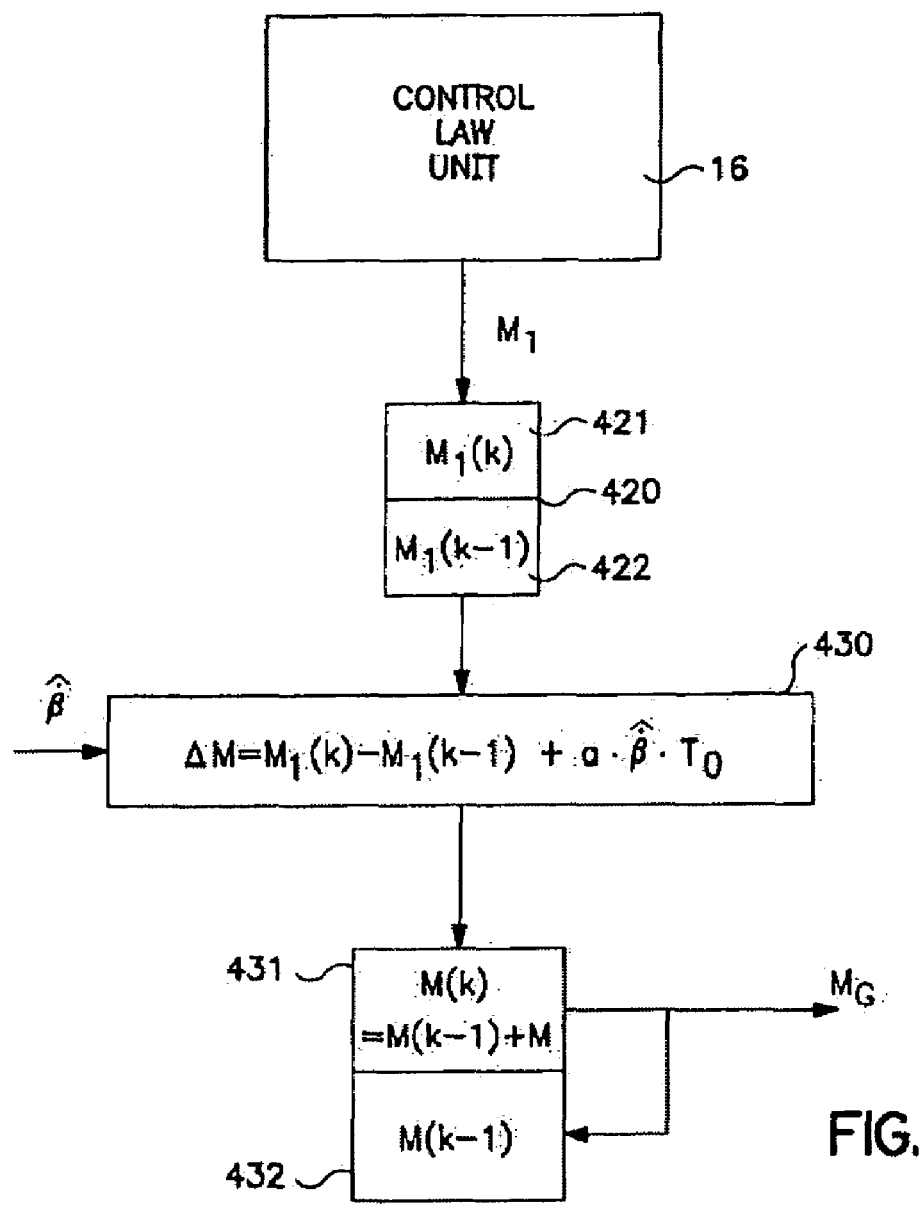
FIG. 20 is a block diagram for calculating a corrected additional yaw torque.

This calculation is performed by a logic unit as is shown in FIG. 20. The calculated moments, which are obtained from the "control law unit 16" subprogram, are sent into a shift register 420. The current value $M_1(k)$ stands in the first place 421 of the shift register 420; the previous value $M_1(k-1)$ stands in the second place 422 of the shift register 420. As soon as a new value $M_1$ is available, the value is shifted from register 421 into register 422, and the value in register 421 is replaced with the new value. The values in the registers 421 and 422 are sent to a calculation logic unit 430, which calculates a $\Delta M$ according to the following formula:

$$\Delta M = M_1(k) - M_1(k-1) + a * \dot{\beta} * T_0 \qquad \text{F 2.28}$$

In addition, the estimated velocity of the sideslip angle $\dot{\beta}$ is sent to the calculation logic unit 430 from the kinematic determination of $\dot{\beta}$. Furthermore, a value for a correction factor a, with which the velocity of the sideslip angle is converted into a change in moment, is set in a memory. The new moment $M(k)$ is calculated according to the formula $$M(k) = M(k-1) + \Delta M \qquad \text{F 2.29}$$

The current value of the corrected moment is stored in register 431, and the value from the previous calculation is stored in register 432. The value in register 431 is used as the basis for the further calculation.

2.5 SESP Yaw Rate Control Law Unit

Figure 35:
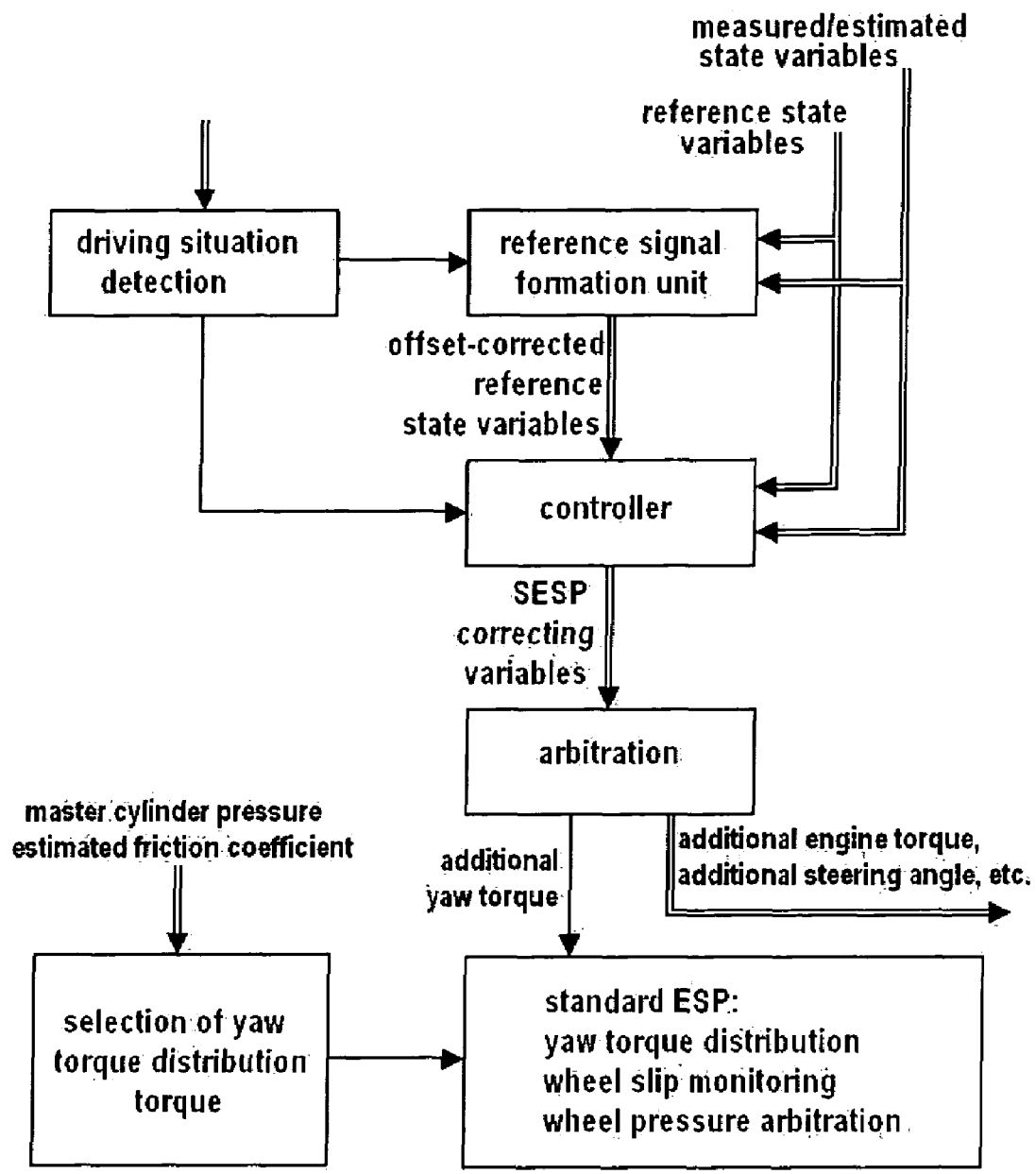
FIG. 35 shows the structure of SESP.

The structure of the SESP system is schematically shown in FIG. 35.

The program of the SESP yaw rate control law unit 23 compares the measured yaw rate with a specific SESP reference yaw rate. When a deviation exists, the controller demands an additional yaw torque $MG_{SESP}$ for the correction of the deviation.

2.5.1 SESP Reference Signal Formation Unit

The SESP reference signal formation unit 24 calculates the SESP reference yaw rate which is the yaw rate of the vehicle intended by the driver. The result is stored in sesp_psip_ref.

The SESP yaw rate controller is more sensitive than the YTC yaw rate controller 10. For this reason, it requires a special mechanism to avoid erroneous interventions due to sensor and model errors. The SESP reference yaw rate contains an offset SESP_DPSIP_STORED compensating these errors for a limited time.

If a turning situation is not suspected, the offset SESP_DPSIP_STORED represents the deviation between the measured or estimated yaw rate $\dot{\psi}$Meas and the reference yaw rate $\dot{\psi}_{Desired}$ calculated in the vehicle model 12.

However, as soon as there is a suspected turning situation, the offset is kept constant. A turning situation is suspected when the following condition is fulfilled:

xx. SESP state 31 to 34 prevails (unlike 35)

or xxi. a possible previous cause i to xviiii for the turning maneuver has been detected.

Now the SESP reference yaw rate $\dot{\psi}_{SESP(ref)}$ is calculated. The SESP reference yaw rate represents the driver's request. For the calculation, the offset is added to the reference yaw rate of the YTC (=AYC) reference yaw rate:

$$\dot{\psi}YTC_{ref} + \text{Offset} = \dot{\psi}_{SESP(ref)}$$

The offset is the difference between $\dot{\psi}_{Desired} - \dot{\psi}_{Meas}$ in the event of e.g. a load change.

Compared to the YTC (=AYC) reference yaw rate, the SESP reference yaw rate comprises an offset which is just so great that the SESP yaw rate deviation at the beginning of the load change or the initial phase of braking is zero.

This offset is used to compensate possible uncompensated offsets of the yaw rate sensor, on the one hand. This is necessary to avoid control errors of the sensitive SESP yaw rate controller. On the other hand, the offset compensation only allows adjusting the deviations from the current vehicle performance.

Figure 31:
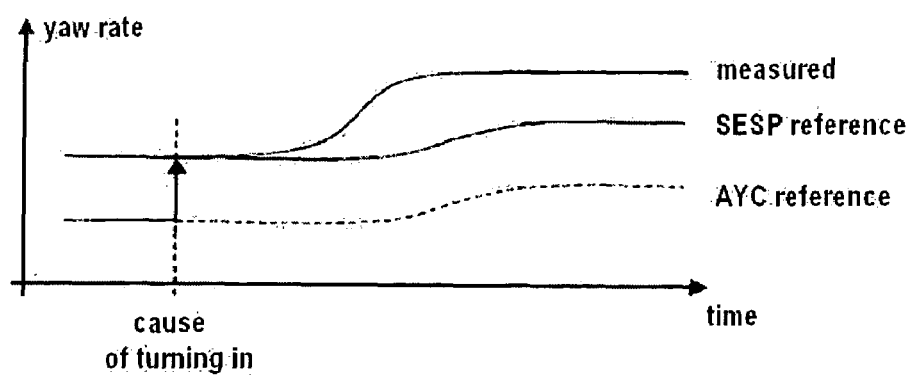
Figure 32:
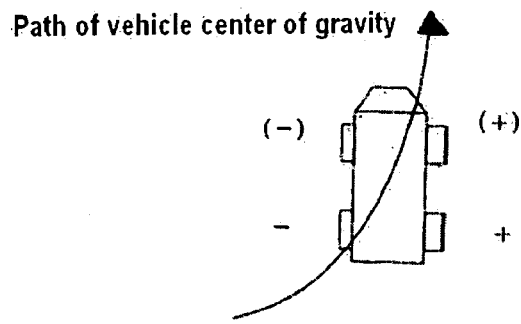
Figure 31:
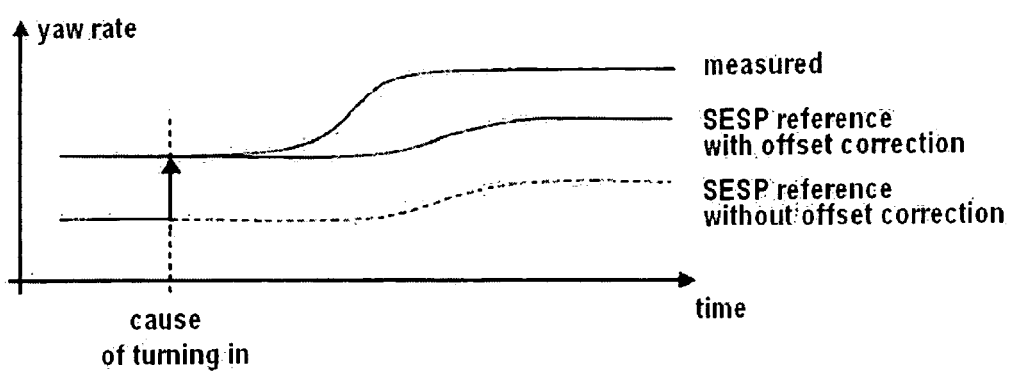
Figure 33:
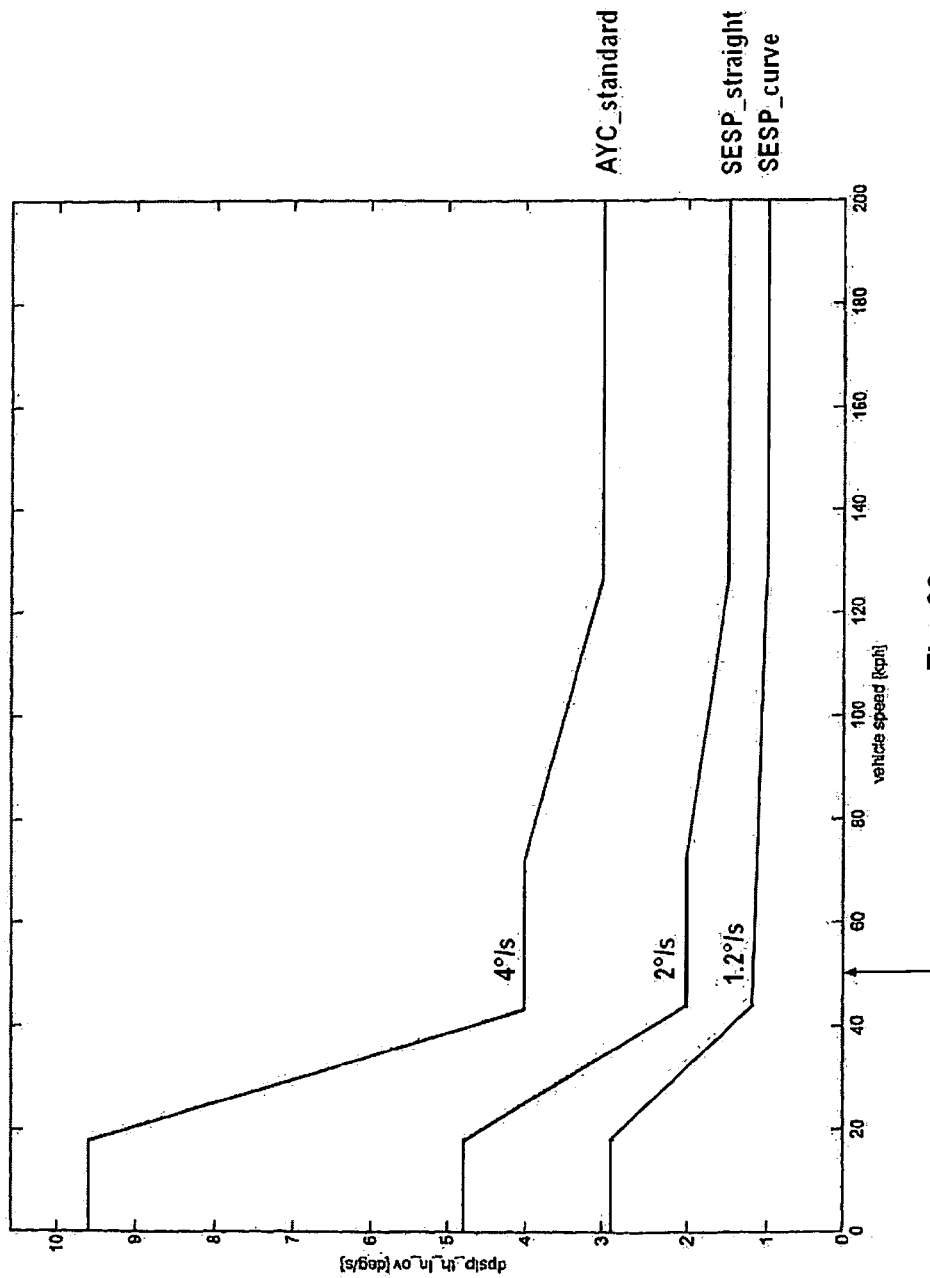
FIG. 33 shows on which wheels SESP performs pressure reduction (−) and pressure increase (+), referring to the example of a left turn.

FIG. 31 shows the formation of the SESP reference yaw rate for the case of a positive yaw rate sensor offset.

SESP reference signal formation unit 24 calculates the yaw rate deviation $\Delta\dot{\psi}_{SESP}$ being used as an input for the SESP yaw rate controller. Further, FIG. 2 shows that this input $\Delta\dot{\psi}_{SESP}$ is also made available to the SESP activation logic unit 25.

The SESP yaw rate deviation is calculated as the difference between the measured yaw rate $\dot{\psi}_{Meas}$ and the SESP reference yaw rate.

Further refinement is envisaged when producing the offset correction for defined applications.

A state machine is provided for this purpose which makes a distinction between the following situations:

Sesp_refcomp_idle: SESP reference variables are not required

Sesp_refcomp_straight: SESP reference variables can be determined, they are valid for straight travel Sesp_refcomp_curve: SESP reference variables can be determined, they are valid for cornering maneuvers Sesp_refcomp_uncertain: SESP reference variables are required, but cannot be exactly determined due to the dynamic driving situation.

The (additional) state machine is so designed that a change-over to a more appropriate state may be performed even during a current reference offset correction. If required, a new determination of the offset is triggered in this case.

The SESP reference variables are now produced depending on the current situation as will be described in the following:

Sesp_refcomp_idle: is not produced (as a substitute SESP-reference=actual quantity)

Sesp_refcomp_straight: SESP reference=AYC reference+offset, with the offset being determined as described and e.g. illustrated in FIG. 31

Sesp_refcomp_curve: if understeering prevails upon entry into this situation: SESP reference=AYC-reference; otherwise: SESP reference=AYC reference+offset.

The risk of SESP control errors is reduced due to this distinction of cases. This can be illustrated in FIG. 34 by an extension, and Sesp_refcomp_uncertain: SESP reference=AYC reference (="best guess").

applies.

Due to the inaccurately defined SESP reference, the activation thresholds of the SESP controllers are slightly raised in this case.

2.5.2 SESP Activation Logic Unit

The SESP yaw rate control law unit 23 includes time delays in order to avoid very short activations or interruptions of the control. The delay for the controller input is stored as sesp_dpsip_in_delay. The delay for the controller output is stored as sesp_dpsip_out_delay.

The short initial delay sesp_dpsip_out_delay=Sesp_dpsip_in_delay_tab[0] is chosen if there is a tendency to a greater oversteering; that means if all of the following conditions are satisfied:

a. $|\Delta\dot{\psi}_{SESP}|$>threshold value k20; the threshold value k20 is situation-responsive, e.g. responsive to the vehicle speed (states 31, 32 more sensitive than 33, 34), of the transversal inclination of the roadway and the like, b. $|\dot{\psi}_{SES\ Pref}|>|\dot{\psi}_{Mess}|$, wherein the signs of $|\dot{\psi}_{SES\ Pref}|$ and $|\dot{\psi}_{Meas}|$ must be identical; the condition indicates that there is a driving situation with an oversteering behavior; is only applicable to the states 31 or 32; the entry time is responsive to the situation, e.g. to $\dot{\psi}_{Meas}$.

Figure 34:
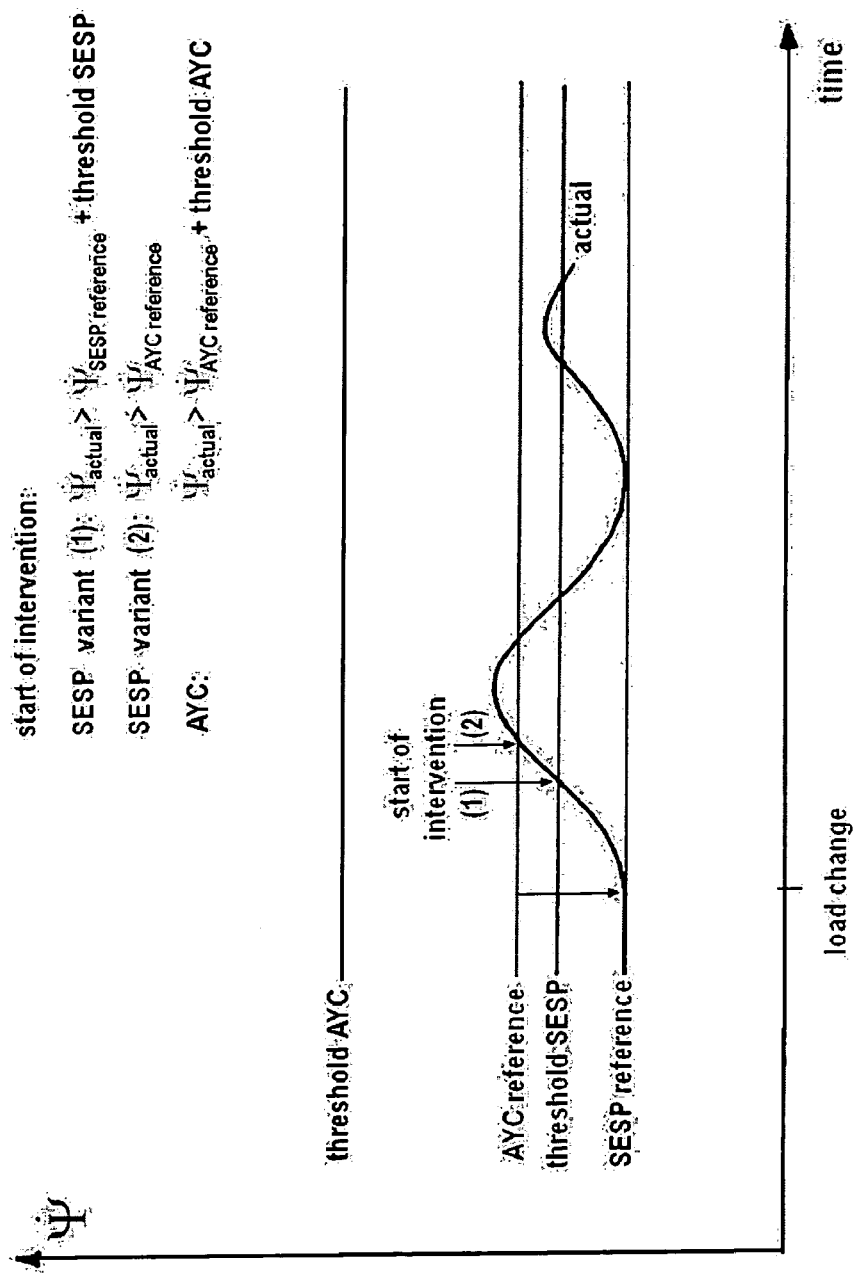
FIG. 34 illustrates how the risk of SESP control errors is reduced.

The oversteering situation is only used as a precondition for the controller activation. Consequently, the first activity of the SESP yaw rate controller will always be an oversteering intervention. But the following activities can also be understeering interventions in order to prevent understeering reactions of the vehicle. The oversteering flag for the standard GTC(AYC) reference yaw rate can also be used as a precondition for the controller activation to ensure that no SESP oversteering interventions can be started during an actual understeering situation. This option is shown in FIG. 34 as variant (2).

c. The state machine 22.1 adopts a state unlike 35

It applies for the conditions a. to c. that they must be fulfilled for a defined duration.

The deactivation depends on the following conditions:

d. $|\dot{\psi}_{SES\ Pref}|$<threshold value k21; threshold value k21 is situation-responsive, it is lower than the entry threshold k20;

or e. state machine 22.1 adopts state 35; as this occurs, the state 'SESP inactive' must prevail for a defined period before the deactivation takes place. The exit delay is responsive to the situation, it is zero if state 35 prevails, otherwise it depends on $\dot{\psi}_{Meas}$.

2.5.3 SESP Control Law Unit

The SESP control law unit 23 calculates the additional yaw torque which must be demanded from the SESP yaw rate controller in order to correct the SESP yaw rate deviation. The result is stored in the value sesp_dpsip_req_yaw_tq.

((Initially, the SESP yaw rate deviation $\Delta\dot{\psi}_{SESP}$))* is calculated by the exit threshold k21 and limited downwards to the minimum value zero. The quantity calculated there is the input value for a P-controller.

The amplification factor depends on the estimated coefficient of friction of the road. As the coefficient of friction of the coefficient-of-friction estimation unit 13 is not active for the SESP-relevant driving situations, a substitute value is used which is determined from the measured $a_{lat}$ and depending on vref from the vehicle longitudinal acceleration. This coefficient of friction represents the currently utilized coefficient of friction. The amplification factor of the P-controller depends on this coefficient of friction. The additional yaw torque $MG_{SESP}$ prevails at the output of the control law unit 23.

2.5.4 SESP Distribution Logic Unit

The SESP distribution logic unit distributes the additional yaw torque request $MG_{SESP}$ from SESP to the wheel brake pressures. There are different variants depending on the brake pressure of the driver. The present yaw torque distribution state of the SESP is stored in SESP_TQDIS_STATE.

SESP influences the brake pressure of at least one wheel. The following variants are defined for this intervention:

Pressure reduction mode: The wheel brake pressure at the inside rear wheel in a turn and, if required, also additionally at the inside front wheel in a turn is reduced up to an envisaged pressure bottom limit ayc_pdec_sec_pressure_limit. If the potential by pressure reduction is not sufficient to realize $MG_{SESP}$, pressure increase is not performed at this time for comfort reasons. Pressure increase is, however, also possible according to a strategy in conformity with comfort aspects.

Pressure increase mode: The wheel brake pressure at the outside rear wheel in a turn is increased until the upper limit of pressure is reached which is defined by the maximum possible force in a longitudinal direction. The upper limit of pressure is ensured by the wheel slip controller 26 with the brake slip monitoring function in a combination with suppression of the EBD function. The pressure is increased for comfort reasons by way of the function ETR (=change-over valve/separating valve control).

Distribution of the additional yaw torque from SESP to the wheels is arranged for defined applications.

In the case of SESP pressure increase, it is now possible to build up pressure also on the outside front wheel in a turn.

How much percent of the pressure of the rear wheel is built up at the front wheel in addition can be adjusted by way of a characteristic curve depending on the estimated minimum coefficient of friction SESP_MY_MIN.

The following dependency has proven suitable for a brake system with hydraulic brake force boosting: 50% on ice, 100% on medium coefficients of friction, 0% on high coefficients of friction.

A value of 0% on high coefficients of friction is appropriate because the driver considers pressure increase at the front axle as uncomfortable in this case. On the other hand, a sole pressure increase at the rear axle is almost sufficient herein for stabilization because more longitudinal force can be built up on high coefficients of friction.

The possibility of pressure increase at the front axle is illustrated in FIG. 32a.

When SESP pressure increase is terminated, the pressure at the rear wheel is no longer decreased abruptly but slowly. This fact increases driving comfort.

Slow pressure reduction is also employed if SESP must be discontinued due to AYC control beginning.

Figure 32:
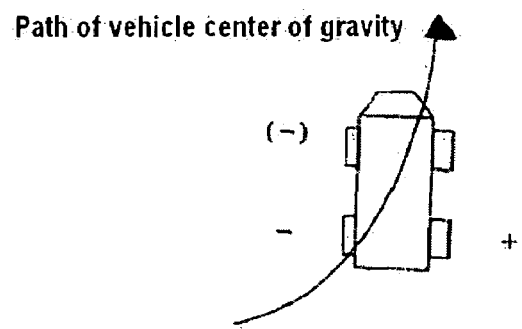
FIGS. 31, 32 show the formation of the SESP reference yaw rate for the case of a positive yaw rate sensor offset.

However, pressure is decreased abruptly as soon as the sign of the AYC additional yaw torque changes compared to the previous SESP intervention. The option of an additional pressure reduction on the front axle, which has been mentioned before regarding the SESP pressure reduction case (page 17) and in FIG. 32, is preferred in particular for vehicles equipped with a brake system with vacuum brake booster and additional hydraulic brake force boosting, e.g. by way of the hydraulic return pump of the brake system.

The decision whether pressure reduction or pressure increase shall be executed depends on the following conditions:

Pressure Reduction
f. YTC controller 10 has detected braking by driver $P_{TMC}$ and
g. $P_{TMC}$>threshold value k30

In the absence of these conditions, pressure increase takes place.

If the pressure increase mode is active, $MG_{SESP}$ is reduced depending on vref. It is thereby taken into account that the additional yaw torque $MG_{SESP}$ can be realized more effectively during pressure increase than during pressure reduction.

The decision whether the brake intervenes on the vehicle side which is on the left or the right in a turn is taken according to the same rules as in the YTC yaw torque distribution logic unit 2. Of course, it is also possible to include the SESP distribution logic unit 21 in the process of reaching a decision.

Individual wheel pressure demands of SESP can be taken from the distribution logic unit 21 in consideration of the boundaries of the wheel slip controller 26. In addition, it is indicated to the other controllers 7, 8, 9 by way of a flag that the SESP control is active.

This is favorable because the YTC controller 10 adds the offset to the input signal $|\Delta\dot{\psi}|$ of the activation logic unit 11 in order to make it possible for the SESP to stabilize the vehicle to a certain degree also above its control thresholds. This possibility allows SESP control in a transition range in borderline situations, with almost unstable driving situations, however, only if SESP has become active before. The offset is variable and can be reduced until zero.

3. Distribution Logic Unit of the YTC Controller

3.1 Additional Yaw Torque by the Application of Brake Forces

To achieve stable travel of the vehicle even in a curve, it is first necessary to determine the steering angle. The steering angle represents the curved path of the vehicle desired by the driver. In the case of stable, steady-state travel in a curve, the vehicle shall travel through the curve at an approximately constant sideslip angle and constant yaw rate. Deviations from this sideslip angle or from this yaw rate must be compensated by the driver by steering in the opposite direction. However, this is not always possible when the driver travels through the curve at the limit velocity for the curve. It is necessary in such situations to specifically brake the vehicle and to apply additional moments around the vertical axis to the vehicle, which are to bring about an adjustment of the actual yaw rate to the desired yaw rate. Control algorithms which describe these relationships have been described before, so that they need not be explained in greater detail herein.

However, there remains the problem that an additional yaw torque $M_G$ calculated by the control algorithm must be put into practice in an appropriate manner by specifically applying brake forces.

In the chase of hydraulic brakes, the task is therefore practically to set a brake pressure for every individual wheel brake. The moment to be obtained around the vertical axis shall be obtained with the lowest possible pressures in the individual brakes. It is therefore proposed that a coefficient be determined for each wheel and that the brake pressures be calculated from the vehicle yaw torque to be generated and the actual weighted coefficient.

As explained above, it is favorable, especially in vehicle brake systems operating hydraulically, to determine the coefficients such that the brake pressure for the individual wheel brakes can be directly determined. The weighting of the coefficients is performed by dividing every individual coefficient by the sum of the squares of all coefficients.

Each coefficient determines the relationship between the wheel brake pressure and the individual wheel brake forces thus generated as a percentage of the yaw torque of the vehicle. Parameters which change during the travel of a vehicle are included as variables in the determination of the individual coefficients. They are, in particular, the steering angle $\delta$ the coefficient of friction $\mu$ between the tire and the road surface, the vehicle mass m, and the axle load distribution $N_z$.

Variables which are included in the calculation of the coefficients and are vehicle-specific or brake-specific are, e.g., the following, for a disc brake system:

the area A of the brake pistons, the number n of pistons per wheel brake, the coefficient of friction $\mu_R$ between the disc and the brake lining, the ratio s of the effective friction radius to the dynamic tire radius, and the efficiency $\eta$ of the brake.

The method of calculation proposed has the advantage that the corresponding brake pressures can be calculated very rapidly from a predetermined additional yaw torque. Should the above-described parameters change during travel, this is taken into account by way of a change in the coefficients in the calculation of the brake pressure.

While some influencing variables are used linearly in the calculation of the coefficients, especially the dependency of the coefficients on the steering angle $\delta$ is nonlinear.

However, it was found that a linearized estimation of the dependency between the individual coefficients and the steering angle yields sufficiently good results.

Figure 21:
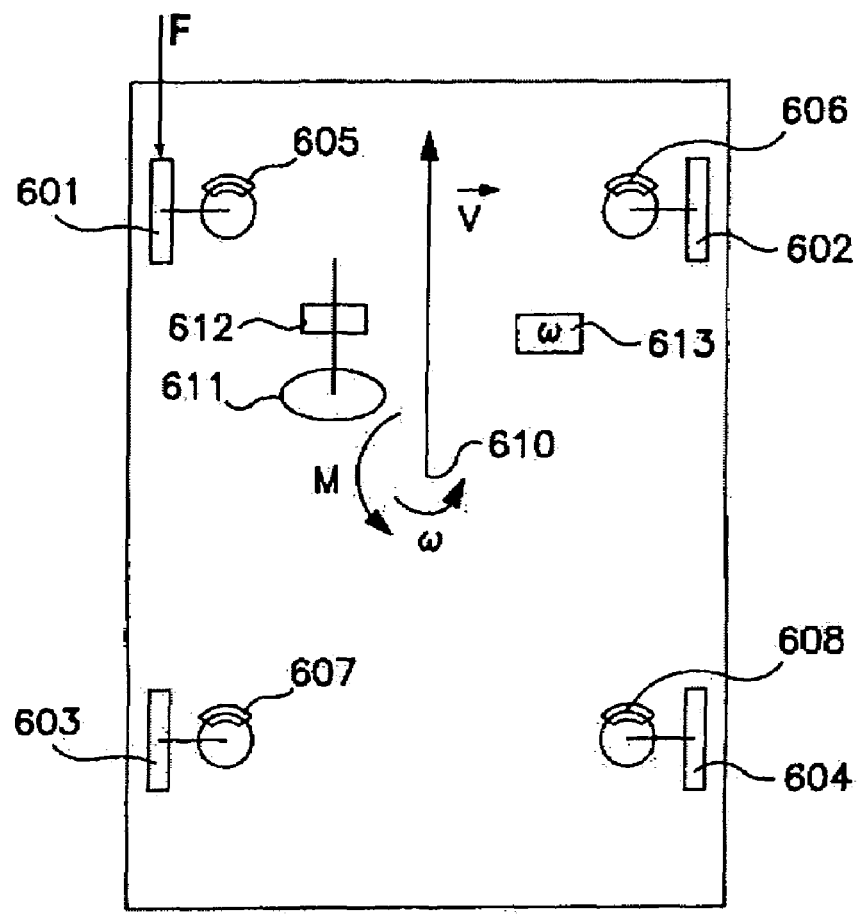
FIG. 21 is a schematic view of a motor vehicle.

FIG. 21 schematically shows a vehicle during straight travel with four wheels 601, 602, 603, 604. A wheel brake 605, 606, 607, 608 is associated with each of the wheels. These can be actuated independently from one another, and brake forces are generated by the wheel braking moments exerted by the wheel brakes on the contact surfaces of the tires on the road surface. For example, a braking force F, which in turn generates a moment M (positive in the example) around the vertical axis, is generated on wheel 601 when the wheel brake 605 is actuated.

Such moments around the vertical axis of the vehicle can be used specifically to keep a vehicle stable on a path desired by the driver.

Furthermore, sensors are provided in the vehicle. They include wheel sensors, which detect the angular velocity of the wheels 601, 602, 603, 604. In addition, the steering wheel angle is detected with a steering sensor 612. In addition, a sensor 613 for the yaw rate is provided.

A yaw torque, which, when applied, is able to make the yaw rate of the vehicle as well as its sideslip angle agree with the driver's desire, can be calculated with these sensors, which detect the driver's desire, on the one hand, and the behavior of the vehicle, on the other hand. The wheel brakes 605, 606, 607, 608 are actuated independently from one another for this purpose, using a control device which is part of a complex program for controlling the driving stability.

Figure 22:
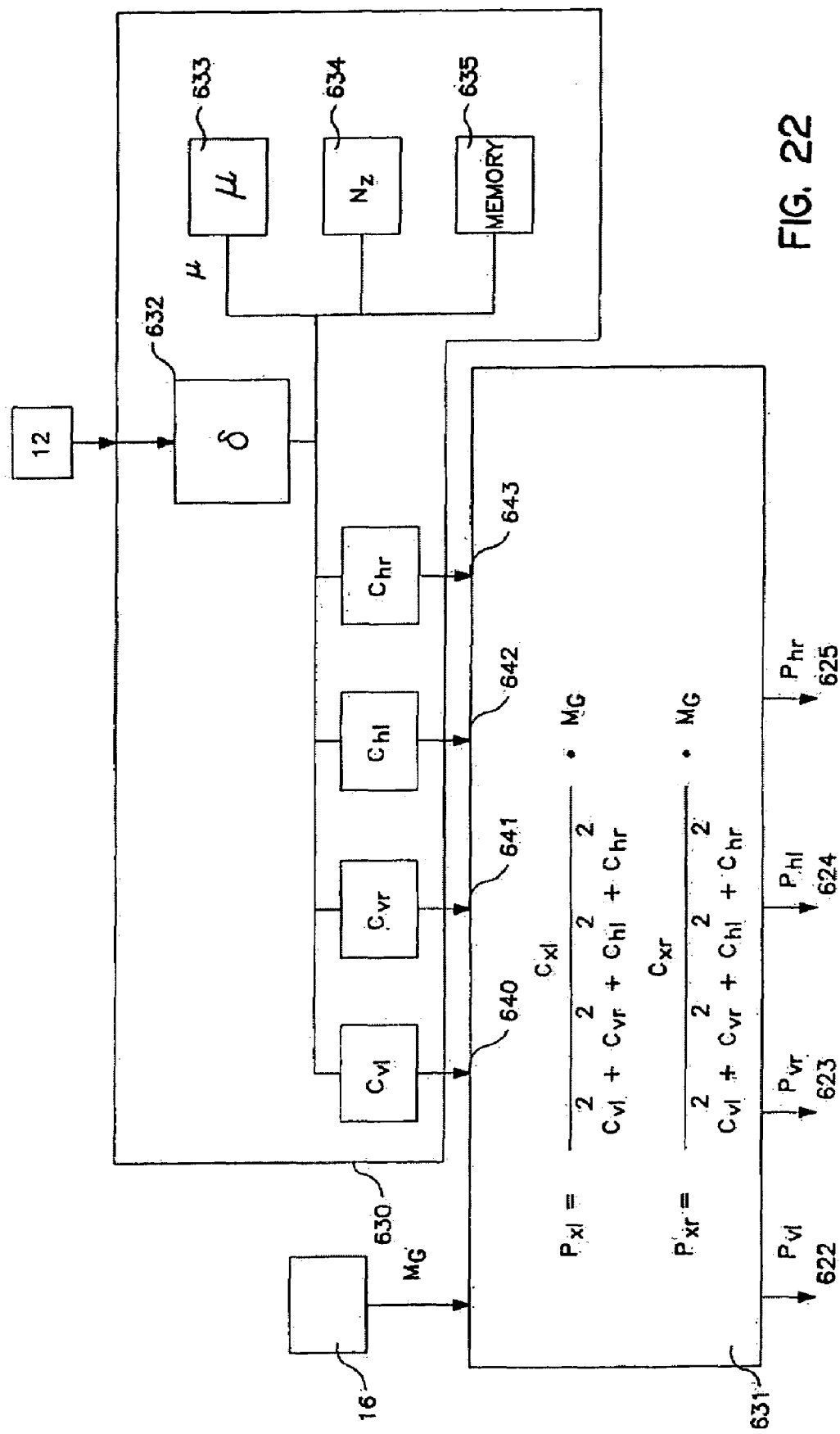
FIG. 22 is a block diagram for describing the distribution logic unit.

The general situation is shown in FIG. 22. A program module, which calculates the yaw torque $M_G$, is designated by reference numeral 16. FIG. 22 shows a control device, which calculates the pressures $p_{xx}$ that are to be introduced into the individual wheel brakes 605, 606, 607, 608. The pressure values 622, 623, 624, 625 determined can be subjected to further evaluation and can be converted into corresponding control signals for the wheel brakes 605, 606, 607, 608.

The control device itself consists of two parts, namely, a first part 630, in which coefficients $c_{xx}$ for the individual wheels are calculated. The coefficients $c_{xx}$ establish a linear relationship between the pressure in the wheel brake and the proportionate yaw torque, which is brought about by the brake force on the corresponding wheel. The individual pressure values $p_{xx}$ 622, 623, 624, 625 are calculated in the second part 631 by weighting the individual coefficients and taking into account the yaw torque $M_G$ to be applied.

The pressure values as well as the coefficients are designated with subscripts:

V: front h: rear l: left r: right

X: either v/l or h/r

The first calculation part 630 takes into account the steering angle, which is made available to the calculation process by way of an evaluation 632 of the steering sensor 612. To calculate the coefficient, the coefficient of friction $\mu$, which is derived from the wheel rotation behavior in an evaluation unit 633 (cf. Section 2.1), is taken into account. The wheel rotation behavior is in turn determined by a signal of the wheel sensors at the individual wheels. The mass of the vehicle as well as the load distribution $N_Z$, which are determined in an evaluation unit 634, in which the behavior of the vehicle is analyzed in different situations, are included as well. The first program part 630 has access to a memory 635, which contains the above-mentioned vehicle-specific and wheel brake-specific values.

A coefficient $c_{xx}$ is calculated from the above-mentioned values for each wheel; the values 640, 641, 642, 643 may be calculated simultaneously or consecutively. The calculation is performed according to a function implemented in the program. The known relationships between the brake pressure and the brake force are taken into account in this function. The relationship is usually linear. Only the steering angle $\delta$ must be taken into account separately. How the steering angle can be taken into account in a suitable manner will be described below.

The pressure values for the individual wheel brakes are determined in the second calculation step 631 either simultaneously or consecutively from the individual coefficients 640, 641, 642, 643 according to the following formula:

$$p_{xl} = \frac{c_{xl}}{c_{vl}^2 + c_{vr}^2 + c_{hl}^2 + c_{hr}^2} * M_G \qquad \text{F 3.1a}$$

$$p_{xr} = \frac{c_{xr}}{c_{vl}^2 + c_{vr}^2 + c_{hl}^2 + c_{hr}^2} * M_G \qquad \text{F 3.1b}$$

Calculating the individual pressures according to this formula offers the advantage that only relatively low pressures must be introduced into the wheel brakes to reach the calculated braking moment. Furthermore, the brake pressure control is able to respond very sensitively and rapidly to changes especially in the steering angle and in the coefficients of friction.

Figure 23:
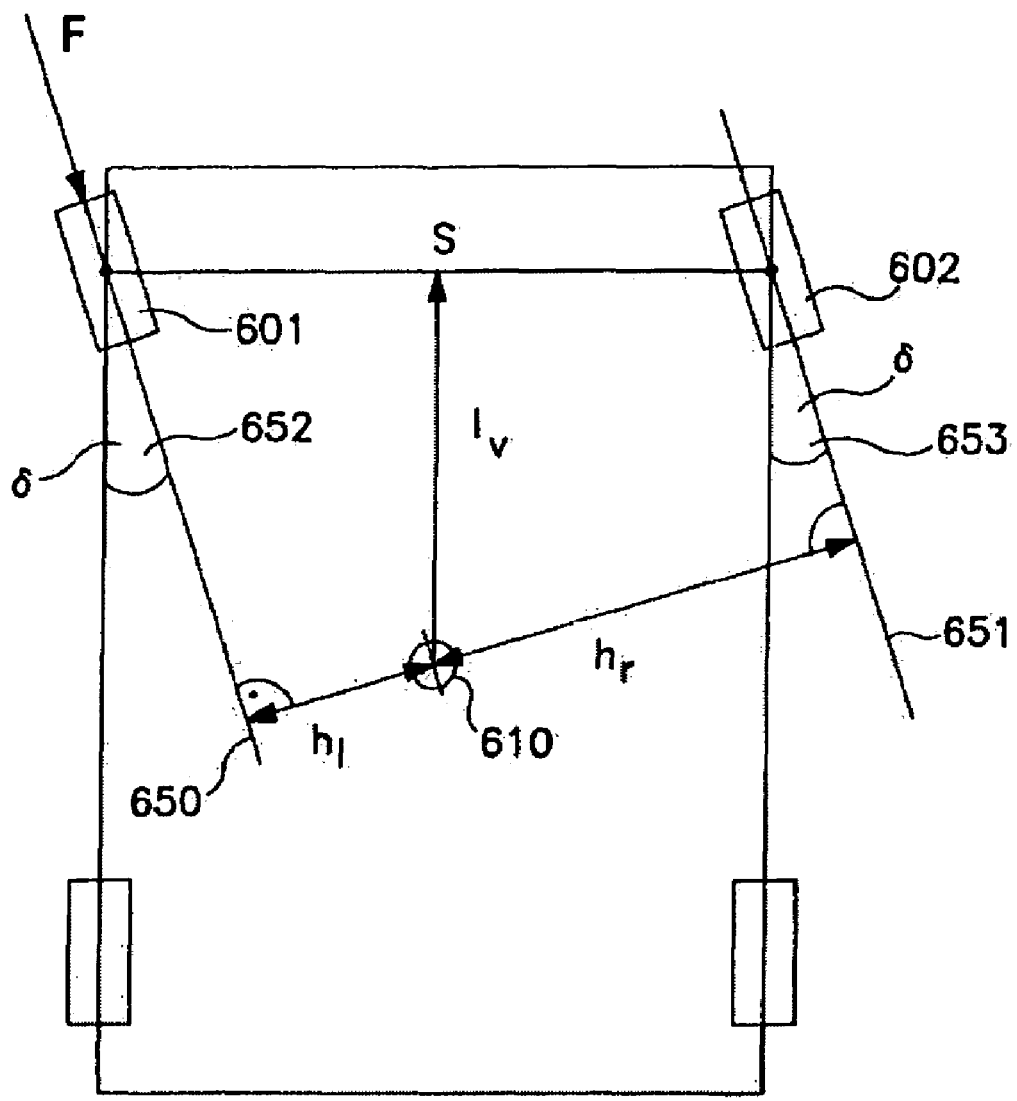
FIG. 23 is a schematic view of a motor vehicle and the acting forces when the steering wheel is turned.

The steering angle δ is taken into account in the calculation of the coefficients as follows: FIG. 23 shows for this a schematic representation of a vehicle, in which the front wheels 601 and 602 are shown turned in. The distance between the front wheels is designated by S, and the distance between the center of gravity 610 and the front axle is designated by $l_v$.

The wheel planes 650, 651 form steering angles 652, 653 with the longitudinal axis of the vehicle. The steering angles δ 652, 653 are assumed to be equal for simplicity's sake. The effective lever arm $h_l$ or $h_r$ relative to the brake force F, which acts in the wheel plane 650, 651, is calculated from approximation considerations for small steering angles as follows.

$$h_r = \frac{s}{2} + \delta * l_v \qquad \text{F 3.2a}$$

$$h_l = \frac{s}{2} - \delta * l_v \qquad \text{F 3.2b}$$

Since the "small steering angle" approximation is not always satisfied, it was found to be favorable to calculate with the following formula, if applicable.

$$h_r = \frac{s}{2} + \delta * \sqrt{\frac{s^2}{4} + l_v^2} \qquad \text{F 3.3.a}$$

$$h_l = \frac{s}{2} - \delta * \sqrt{\frac{s^2}{4} + l_v^2} \qquad \text{F 3.3b}$$

Should the calculated lever arms become smaller than zero, they are set equal to zero.

The wheel coefficients $c_{xx}$ can be calculated as follows:

$$c_{xx} = c_{hydxx} * h_{l,r} \qquad \text{F 3.4}$$

and all parameters except for the steering angle δ are taken into account in $c_{hydxx}$.

The coefficients can thus be represented as the product of two terms, in which one term determines the effective lever arm, and the other term is independent from the steering angle.

3.2 Additional Yaw Torque by Reducing Lateral Forces

One method of applying brake forces acting on one side is to actuate the wheel brakes such that the wheels will be braked with different intensity. One procedure that brings this about was described in the preceding section.

This procedure reaches a limit when driving stability control is to be performed during pedal braking, i.e., when a certain brake pressure has already been set in the wheel brakes because of braking by the driver. The above-described procedure can be applied, in principle, to this case as well. Instead of absolute pressures, changes in the brake pressures already set are determined.

However, the following problems arise. If a very high pressure has already been introduced into a wheel brake, so that very high brake forces are reached, an increase in the brake pressure would not necessarily lead to an increase in the brake force, because the limit of adhesion between the tire and the road surface has been reached. The linear relationship between the brake pressure and the brake force, which was assumed in the above-mentioned model, is no longer present in this case.

The limit of the brake force on one side of the vehicle, which is not to be exceeded, can be compensated in terms of a yaw torque control by reducing the braking force on the other side of the vehicle.

However, this has the disadvantage that the deceleration of the vehicle is also reduced with the reduction in the brake force. This is not always acceptable, because the vehicle is to be stopped over the shortest possible distance when a braking process is initiated by the driver. Therefore, an excessive reduction in the actual deceleration of the vehicle compared with the driver's desire cannot generally be accepted. The following approach is taken to solve this problem.

The wheel brakes of at least one wheel are actuated such that the longitudinal slip 2 of the wheel is set such that it is greater than the longitudinal slip at which the maximum frictional connection is reached. This procedure is based on the fact that the brake force transmitted, i.e., the longitudinal force on the tire, reaches its maximum at a longitudinal slip of approximately 20% (0%=freely rolling wheel; 100%=locked wheel), and the brake force that can be transmitted decreases only slightly at values above 20%, so that there is no appreciable loss during the deceleration of the vehicle at wheel slips between 20% and 100%.

However, if the lateral force that can be transmitted, i.e., the force that acts at right angles to the wheel plane, is also taken into account at the same time, a strong dependence on wheel slip is seen, which is manifested in that the lateral force that can be transmitted greatly decreases with increasing slip. In the slip range above 50%, the wheel exhibits a behavior similar to that of a locked wheel, i.e., hardly any lateral forces are applied.

Controlled skidding of the vehicle can be provoked by judiciously selecting the wheels on which a high longitudinal slip is set, and the change in the yaw angle brought about by the skidding shall correspond to the desired change. Since the longitudinal forces are essentially preserved in this procedure, but the lateral forces are markedly reduced, the yaw rate can be controlled without excessively reducing the deceleration of the vehicle.

The wheel that is driven, at least briefly, with an increased longitudinal slip is selected according to the following rules. Let us examine travel in a curve to the right, which is intended by the driver. Corresponding "mirror-image" rules apply to traveling in a curve to the left. The case may occur in which the vehicle will not turn into the curve as sharply as expected. In other words, the vehicle is understeered. The rear wheel that is the inner wheel in the curve is operated with increased slip values in this case. However, if the vehicle turns too sharply into the curve—this case is called oversteering—the front wheel that is the other wheel in the curve is operated with high slip values.

In addition, the pressure can be prevented from decreasing on one front wheel. This is done according to the following rules. In a driving situation in which the vehicle exhibits understeering behavior, the brake pressure is prevented from decreasing on the front wheel that is the outer wheel in the curve. The pressure is prevented from decreasing on the front wheel that is the inner wheel in the curve in a situation in which the vehicle exhibits oversteering behavior.

The actual control of the brake pressure may be performed as follows. As was explained before, the brake pressure in the individual wheel brakes is determined individually as a function of the yaw torque to be reached and the weighted wheel coefficients.

A factor which is independent from the brake slip can be introduced in the calculation of the coefficients; this factor is adjusted such that the above-described desired brake slip will become established. The reduction in pressure on a wheel can be limited by setting a lower threshold for the corresponding coefficient.

The procedure implemented in the control program of the brake system will be explained in greater detail below.

Based on weighted coefficients, the control program calculates the brake pressure that must be produced in every individual wheel brake. The calculation becomes more problematic when the vehicle is braked, especially when it is being decelerated while utilizing the limit of frictional connection between the tire and the road surface. It is quite possible in such cases that an anti-lock control will first begin before a superimposed driving stability control becomes necessary.

The basic considerations for an unbraked vehicle cannot be taken over in such cases, because, e.g., the corresponding brake force does not increase linearly upon the increase in pressure in a wheel brake, since the limit of frictional connection has been reached. An increase in the pressure in this wheel brake would not consequently produce any additional brake force and consequently any additional moment.

Even though the same effect of generating an additional yaw torque can be produced by reducing the wheel brake pressure of the other wheel of the axle, this would cause, on the whole, a reduction in the braking force, which in turn conflicts with the requirement that the vehicle is to be stopped over the shortest possible distance.

Figure 24:
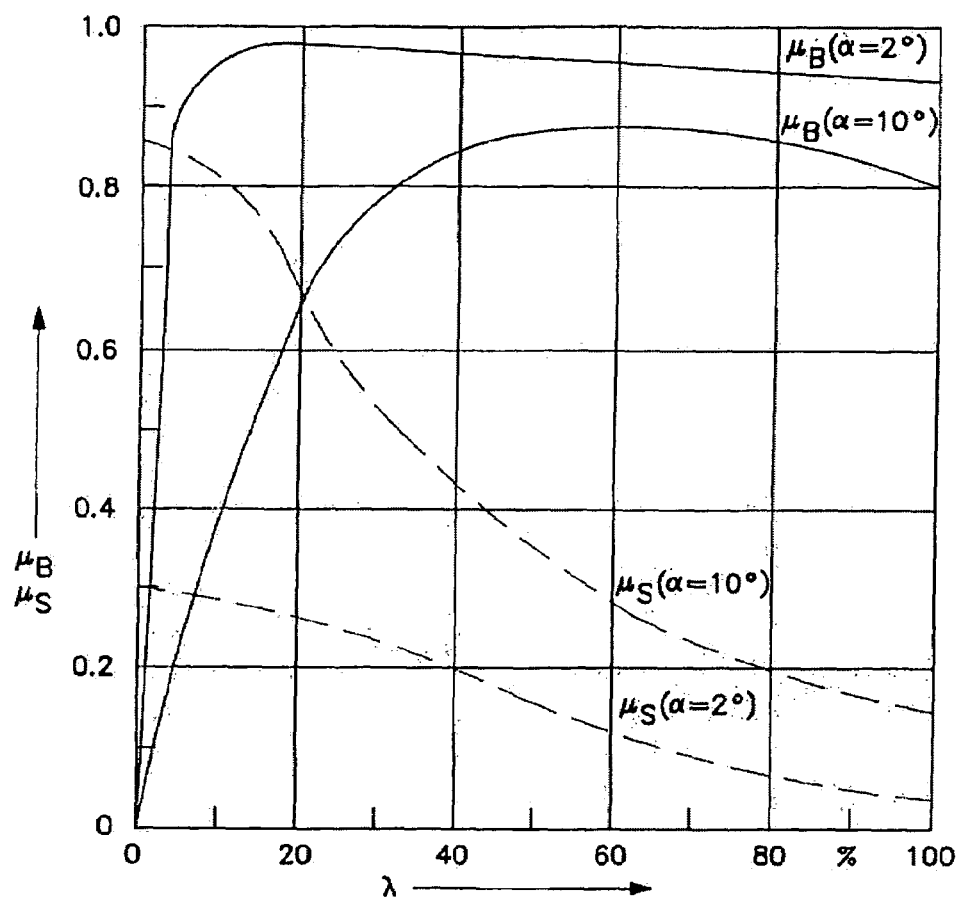
FIG. 24 is a diagram for describing the coefficients of the lateral force and longitudinal force depending on the wheel slip.

The behavior of vehicle wheels shown in FIG. 24 is therefore utilized. This diagram shows slip values λ between 0% and 100% on the X axis, where 0% indicates a freely rolling wheel and 100% a locked wheel. The Y axis shows the frictional force and lateral force values $\mu_B$ and $\mu_S$, respectively, in the range of values from 0 to 1. The solid lines show the dependence of the coefficient of friction on slip for different slip angles α. It is seen, especially in the case of small slip angles, that the curve has a maximum in the slip range of λ=20%. The coefficient of friction slightly decreases toward 100%. The maximum coefficient of friction equals approximately 0.98 for a slip angle of 2°, while it is still 0.93 at λ=100%. However, an examination of the values of the lateral force shows an extreme reduction over the slip range, especially for great slip angles. The value of the lateral force for a slip value of 0% is 0.85 at a slip angle of 10°, to drop to 0.17 for slip values of almost 100%.

Thus, it can be determined from the curves in FIG. 24 that relatively strong brake forces, but weak lateral forces can be transmitted at slip values in the range of 40% to 80%.

This behavior of the wheel can be utilized to specifically reduce the lateral force of a given wheel of the vehicle. The wheel is selected according to the following scheme, which will be explained in greater detail on the basis of FIGS. 25a and 25b.

Figure 25A:
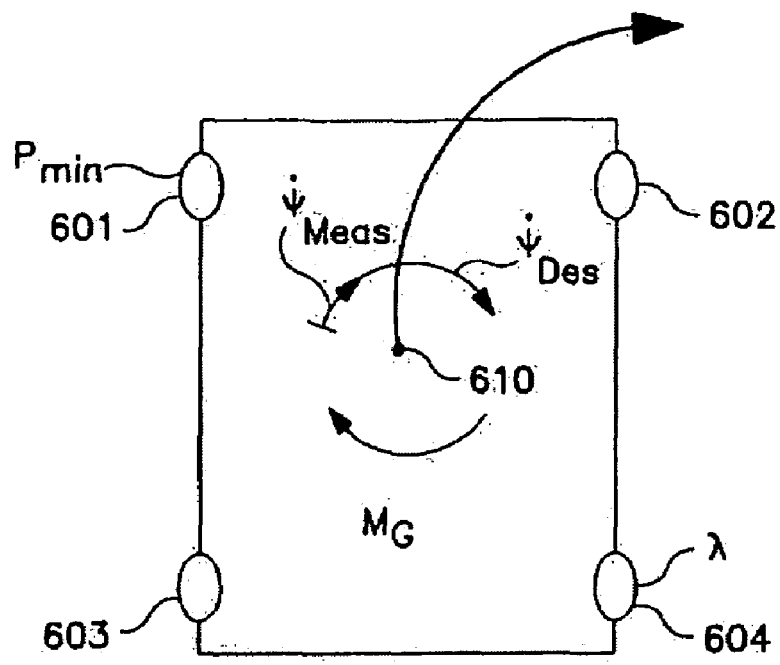
FIG. 25A, B is a schematic illustration of motor vehicles for describing the understeering and oversteering performance.

FIGS. 25a and b show a schematic representation of a vehicle in a right curve. Corresponding to the radius of the curve and the velocity of the vehicle, the vehicle must turn around its vertical axis, i.e., there must be a defined clockwise yaw rate.

As was explained above, the vehicle has a yaw angle sensor. If the measured yaw rate $\dot\Psi_{Meas}$ deviates from the $\dot\Psi_{Desired}$ to be reached, an additional moment $M_G$ around the vertical axis of the vehicle must be applied.

If the measured yaw rate deviates from the yaw rate to be reached to such an extent that the vehicle does not turn sufficiently, a so-called understeering behavior is present. An additional moment, which is counted as negative in this situation, must be applied. It shall cause the vehicle to turn into the curve. This could be achieved in this case by increasing the brake pressure in the right-hand wheels of the vehicle.

However, if the vehicle is already being braked by the driver, it may be possible that these wheels already transmit maximum brake force. If this is determined by an electronic evaluation unit, the pressure in the right rear wheel brake is increased such that the wheel runs at slip values in the range of 40% to 80%. Wheel 604 is therefore marked with a "λ." As was explained above, this leads to a considerable reduction in the lateral force. Consequently, only weak lateral forces are built up on the right rear wheel, as a consequence of which the vehicle swings out with its tail to the left, i.e., a clockwise turning begins. The minimization of the lateral force is maintained until the actual yaw rate $\dot\Psi_{Meas}$ corresponds to the desired $\dot\Psi_{Desired}$ of the vehicle.

Figure 25B:
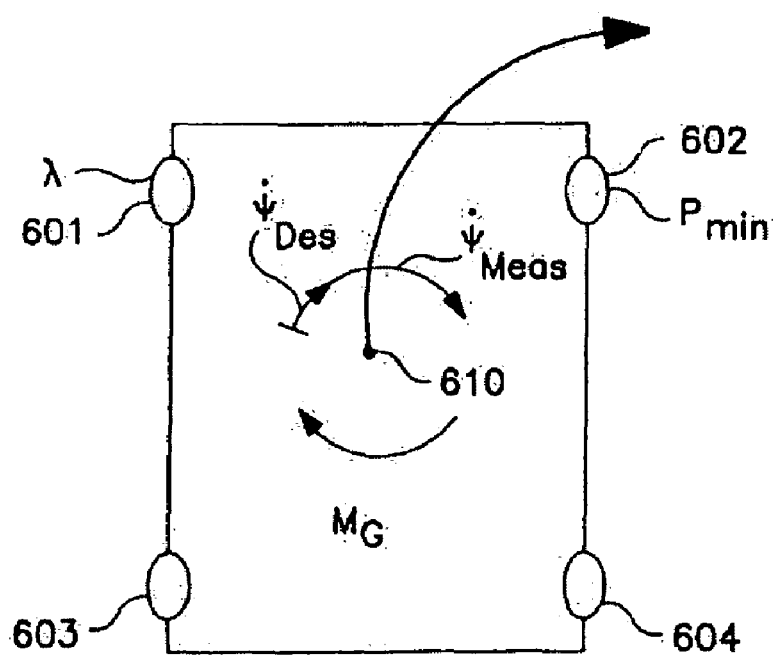

FIG. 25b shows the situation of an oversteering vehicle. The vehicle turns around the vertical axis faster than it would correspond to a calculated desired yaw rate. It is proposed that the lateral force on the front left wheel 601 be reduced in this case. This is also done by introducing slip values between 40% and 80% on this wheel. Wheel 601 is therefore marked with a "λ."

A subprogram that brings about a further reduction in pressure on the front wheel 601 (that is, the outer wheel in the curve for the case of understeering (FIG. 25a)) or on the front wheel 602 (that is, the inner wheel in the curve for the case of oversteering (FIG. 25b)) can be inserted in the control program for both cases. These wheels are marked with "$p_{min}$." The corresponding actuations are laterally reversed for travel in a curve to the left.

The pressure in the individual wheels can be controlled by determining a coefficient, which describes the relationship between the change in pressure and the calculated additional yaw torque $M_G$, for every individual wheel.

These coefficients are a function of parameters that describe the vehicle or the wheel brakes, and of variables which change during travel. These are especially the steering angle δ and the coefficient of friction μ for the road/tire pairing (cf. Section 3.1). A dependence on the longitudinal slip of the corresponding wheel is now additionally introduced for the above-mentioned control. The pressure on individual wheels can be prevented from decreasing by defining lower limits for the coefficients, replacing the calculated value of the coefficients with the minimum if the actual value drops below the minimum.

Figure 26:
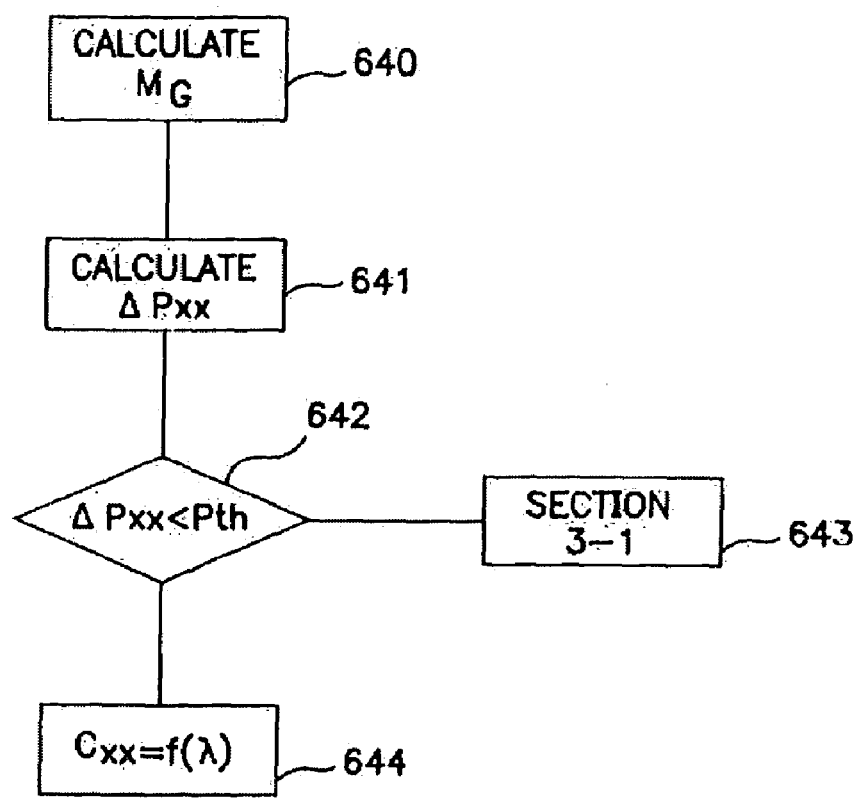
FIG. 26 is a flow chart with a decision logic unit within the distribution logic unit.

A corresponding algorithm is shown in FIG. 26. The additional yaw torque $M_G$ is first calculated (program 640). The corresponding changes in the brake force and in the brake pressure are calculated from this moment for the individual wheels (program part 641). The brake pressures determined are compared with thresholds $p_{th}$, which are determined, among other things, by the road/tire coefficient-of-friction pairing (block 642). The thresholds $p_{th}$ determine whether a further increase in the wheel brake pressure with a simultaneous increase in brake forces is possible. If the pressures to be introduced remain below these limit values, the control is performed according to the procedure mentioned in Section 3.1. If the calculated brake pressures are above these threshold values, the pressures are calculated according to the scheme 644 described above.

4. Priority Circuit

The pressures to be introduced into the wheel brakes are calculated from the additional yaw torque $M_G$ by means of a distribution logic unit (Section 3).

Based on these pressure values, control signals for inlet and outlet valves are sent by a subordinate pressure control circuit. The actual wheel brake pressures are harmonized with the calculated ones in this subordinate pressure control circuit.

If control signals of other controllers (ABS7, TCS8, EBD9) are to be included as well (Section 1), it is also necessary first to convert their control signals into pressure values by means of a hydraulic model of the wheel brakes stored in the computer.

The pressure requirements of the YTC controller 10 are then related to the pressure requirements of the ABS controller and other controllers. This is done in a priority circuit, which decides what requirements are to be prioritized, and whether averaged pressures are to be sent to the pressure control unit 5 for the wheel brakes. The pressure control unit 5 in turn converts the pressures into valve switching times.

Instead of desired pressures, desired changes in pressure may also be sent to the priority circuit (cf. Section 7).

In this case, the priority circuit 3 sends the changes in pressure $\Delta p$ to its output according to the rule that the requirement to reduce the pressure on one of the wheels is preferentially satisfied, and the requirement to maintain the pressure in one wheel brake has priority over the requirements to increase the pressure. Thus, the individual requirements on the priority circuit are processed according to the rule that when there is a requirement to reduce the pressure, requirements to maintain the pressure or to increase pressure are ignored. In the same manner, no pressure is increased when maintenance of pressure is required.

5. Priority Circuit with Direct Comparison of Valve Switching Times

Another method can also be used as an alternative to this.

The distribution logic unit calculates valve switching times directly, like the other controllers as well, rather than pressures, from the additional $M_G$. The valve switching times of the YTC can thus be compared with the required valve switching times of the ABS. Unlike before, different valve switching times rather than different pressure requirements are then evaluated in the priority circuit.

To obtain valve switching times, the distribution logic unit first calculates changes in pressure to be set for each wheel brake.

Switching times for actuating the individual wheel brakes are calculated from the changes in pressure by means of a downstream, nonlinear control element.

This nonlinear control element may be, e.g., a counter.

This counter converts the preset changes in pressure into cycle counts. To do so, the loop time $T_0$ is divided into approximately 3 to 10 switching intervals (cycles). The maximum number of cycles per loop time is a fixed quantity, which is determined according to the quality of control to be reached.

How long a valve within a loop time is to be actuated is determined by the calculated cycle count.

Since there are, in general, two valves per wheel brake, with one valve (inlet valve) regulating the feed of the pressure medium to the wheel brake, and the other valve (outlet valve) regulating the release of the pressure medium from the wheel brake, a total of eight signals are to be generated.

Theses cycle counts are sent to the priority circuit, which receives the cycle counts of other controllers in additional channels.

The priority circuit decides which controller is to be given preference, i.e., which cycle count is taken over for the actual valve control.

The response of the vehicle to the brake forces generated by the actuation of the wheel brakes is a changed yaw rate. This is detected by the YTC controller 10, which will again determine a new additional yaw torque.

Consequently, brake pressures are not calculated or set at any point of the control circuit. Therefore, the control algorithms need no information on the wheel brake, and, in particular, no information on the relationship between the volume received by the wheel brakes and the resulting brake pressures.

Figure 27:
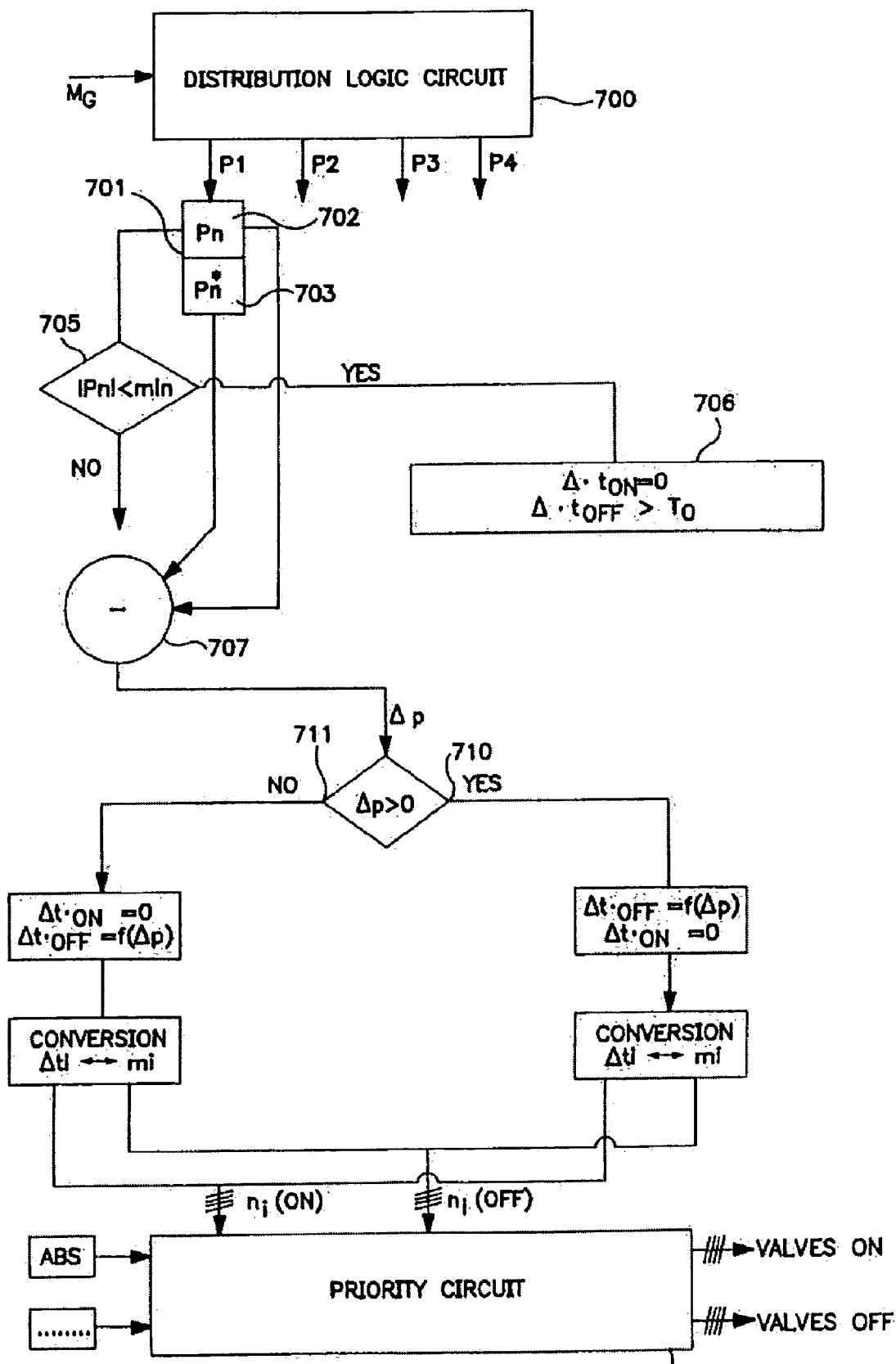
FIG. 27 is a block diagram for calculating on-off times for inlet and outlet valves.

One possibility of calculating the cycle times is explained on the basis of FIG. 27.

Brake pressures, which are to be built up in the individual wheel brakes, are calculated from the additional yaw torque $M_G$ by way of the distribution logic unit 700. How this is done can be found described in Sections 3.1. and 3.2. As a result of the calculation within the distribution logic unit, there are four pressure values $p_1$ through $p_4$ for a four-wheel vehicle. These variables must be converted into switching times for the valves, which control the feed of pressure medium (pressure build-up) and the release of the pressure medium (pressure reduction) and from the wheel brakes. As was mentioned above, the switching times for the valves are calculated from the change in the preset pressure value rather than from the absolute values of the preset pressure value. Each value $p_n$ (n=1 through 4) is therefore sent to a shift register 701. The current value is written to the first register place 702. The previous value from the first register place 702 is received in the second register place 703, so that the pressure requirement from the preceding calculation loop is written there. This value is designated by $p_n^*$.

The current pressure requirement is read from the first register place 702 in the next step 705. If this value is 0 or lower than a minimum, the program branches into a loop 706, with which it shall be ensured that so much pressure medium is removed from the wheel brake that the pressure becoming established becomes zero. To do so, the inlet valve is closed and the outlet valve is opened for at least one loop time $T_0$.

If the current required pressure value is above this minimum, the difference of the two register values 702 and 703 is formed. This is done in the subtractor 707. The calculated change in pressure $\Delta p$ may be either greater or less than 0. If it is greater than 0, the pressure must be increased in the corresponding wheel brake. If it is less than 0, the pressure must be reduced in the corresponding wheel brake. In the case of a pressure build-up, the program runs through the right-hand decision path 710. Taking the pressure difference to be set and the pressure requirement or, if corresponding signals are present, based on the actual pressure in the wheel brake, an opening time $\Delta t_{in}$ is calculated for the inlet valve. The opening time $\Delta t_{out}$ of the outlet valve is set to zero. Conversely (decision path 711), the opening time $\Delta t_{in}$ of the inlet valve is set to zero if a reduction in pressure is required, while the opening time $\Delta t_{out}$ of the outlet valve is calculated from the required pressure difference and the actual pressure in the wheel brake or the required pressure, which is written in the first register place 702.

As a rule, there is a linear relationship between the opening time $\Delta t$ and the intended change in pressure $\Delta p$.

As was explained, the calculation is performed with cycle counts rather than with the opening times. This is explained in greater detail in the diagram in FIG. 28. The above-described calculations are performed at constant time intervals (loop time $T_0$), and the control signals for the valves of the wheel brakes in the next loop are set as the result of a calculation. One loop time $T_0$ is approximately 3 msec.

Depending on how fine the control is to operate, each loop time $T_0$ is divided into N time intervals.

Figure 28:
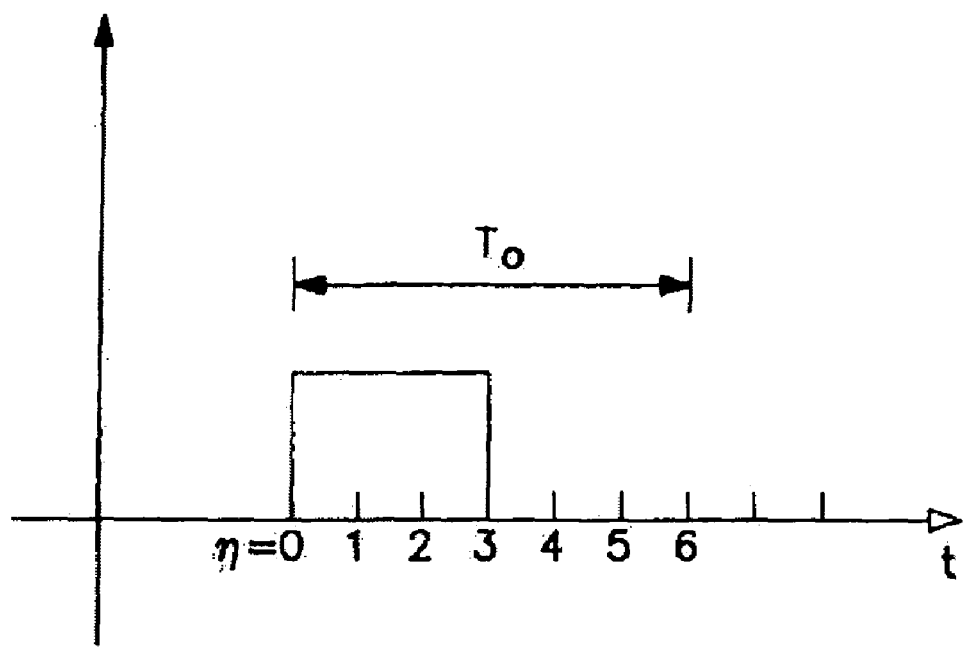
FIG. 28 is a diagram for describing time intervals within a calculation loop.

The diagram in FIG. 28 shows a division into 6 steps. The switching times for the valves are no longer issued as time variables, but as the number of cycles within one loop, during which the valve is to be opened. As can be determined from FIG. 28, an opening time of 1.5 msec is obtained, e.g., for n=3.

Should the required opening time be longer than the loop time, n is set at the corresponding maximum value N (to 6 in the example shown).

This calculation is performed for each wheel brake, i.e., four times for a four-wheel vehicle. The calculations may be performed simultaneously or consecutively. As a result, eight values are available; four values for inlet valves and four values for outlet valves. These values are sent to a modified priority circuit 720. The switching time requirement, likewise expressed in cycle times, of an ABS controller and additional controllers are sent to this priority circuit 720 as well.

This actuation is performed such that a change in the pressure in the wheel brakes is obtained. The pressure forces and consequently the moments exerted on the vehicle will thus change. Thus, a change is obtained in the variables which describe the driving dynamics of the vehicle. These are directly or indirectly detected by sensors and are in turn sent to the calculation.

This again leads to a changed moment requirement, which, as was described above, is converted into new control signals for the valves.

The calculation of the pressure differences to be set is based on the pressure requirements from the preceding calculation loop. However, these do not have to have been actually set, so that the actual pressures in the wheel brakes differ from the corresponding calculated pressure requirements. It is therefore necessary to adjust the actual pressure in the wheel brake to the pressure requirements in certain situations. This can be done in the simplest manner when the pressure requirement is zero, i.e., the distribution logic unit 700 requires a value that corresponds to the pressure zero in a wheel brake. The difference from the preceding value is not formed, and the control signals are not derived from this in such a case, but it is branched off in step 705 into the loop 706 for calculating the switching times, and this loop is to ensure that a pressure value of zero is indeed set. This is done by setting the switching time $\Delta t_{out}$ for the outlet valve to at least the loop time $T_0$.

It may also become necessary to send corresponding information to the priority circuit 720, so that this time requirement, which is to lead to zero pressure in a wheel brake, will not be superimposed by preset values of the other controllers. In addition, it can be determined in this information that the reduction in pressure shall take place over several loop times, so that it is ensured that a complete pressure reduction will indeed take place.

6. Wheel Brake Pressure Detection

The DSC pressure controller described up to Section 4 provides brake pressure values for the wheel brakes as a result. These preset values must be put into practice. One method is to measure the pressures in the wheel brakes and to compare them with the preset values. A pressure controller that operates according to the usual laws adjusts the wheel brake pressure to the predetermined desired value. This procedure requires one pressure sensor per wheel brake, i.e., four pressure sensors for a four-wheel vehicle.

Attempts will be made, in general, even for cost reasons to make do with as few sensors as possible. In addition, each sensor represents another potential source of disturbance. The failure of one sensor may lead to the necessity of switching off the entire control system.

It is therefore proposed that an evaluation system be provided, which derives a pressure variable that corresponds to the pressure in the wheel brakes on the basis of data available from the already existing sensors. The following concept is proposed for doing so.

As was explained above, the pressure in each wheel brake is controlled by two valves. The inlet valve controls the feed of the pressure medium, while the outlet valve controls the release of the pressure medium.

The signals sent by a pressure controller are therefore control times which indicate how long a valve shall be opened or closed. One loop time is divided into a fixed number of time intervals (cycles). The control times can thus be represented as a cycle count, which indicates over how many time intervals a valve shall be opened or closed.

The basic consideration is that these control signals shall be sent not only to the wheel brakes, but as calculated variables also to a vehicle model. The real vehicle responds to the brake pressures introduced, and a certain velocity v of the center of gravity and wheel speeds $\omega_i$ of the individual wheels will become established. The velocity of the vehicle is not directly measured, but it is also derived from the speeds $\omega_i$ of the individual wheels in special calculation steps. They are therefore called the reference velocity $v_{Ref}$.

Corresponding values can also be simulated within one vehicle model.

A correcting variable for the pressure in the individual wheel brakes can be determined from a comparison of the actual values of $\omega_i$, $v_{Ref}$ with the calculated values of $\omega_i$ and $v_{Ref}$ or on the basis of the values of $\omega_i$ and $v_{Ref}$ estimated on the basis of the vehicle model, and a pressure calculated by way of a hydraulic model can be modified by means of the correcting variable, so that a better estimate of the wheel brake pressures can be given.

Figure 29:
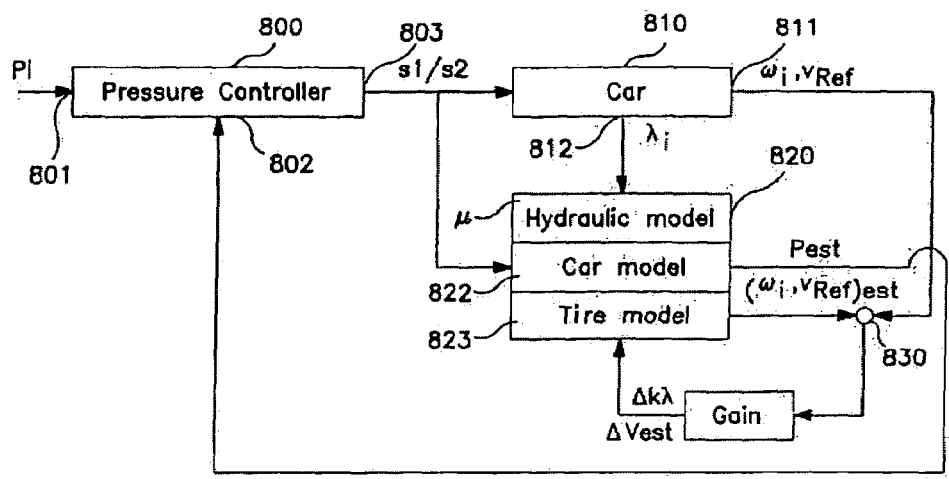
FIG. 29 is a basic block diagram for determining the wheel brake pressure.

The general structure just described is explained in greater detail in FIG. 29.

A pressure control unit, which has number 5 in FIG. 1, is designated by 800. The pressure control unit calculates control times for the valves of the wheel brakes from a first value 801, which characterizes the pressure to be set, and from a second value 802, which marks an existing, estimated or measured pressure in the wheel brake. The control times are represented as an output variable 803 here. The vehicle is designated by 810. This is to illustrate that the vehicle responds to forces which are caused by the pressure set in the wheel brakes. The speeds $\omega_i$ of the individual wheels will change now as well.

Wheel sensors, which detect the speeds of the wheels, so that the $\omega_i$ values are immediately available, shall also belong to the vehicle 810.

An evaluation unit $\omega_i$ also belongs to the vehicle 810; this evaluation unit usually represents a partial area of an ABS controller, which calculates a so-called reference velocity $v_{Ref}$, which is to correspond to the actual velocity of the vehicle, form the wheel speeds $\omega_i$ of the individual wheels under certain boundary conditions.

A slip $\lambda_i$ can be calculated for each wheel from the individual wheel speeds and the vehicle reference velocity.

The values $\omega_i$, $v_{Ref}$ are available as output values 811. The slip $\lambda_i$ is available as the value 812.

The calculation model used is designated as a whole by 820. It contains three sub models, namely, a hydraulic model 821, a vehicle model 822, and a tire model 823.

In two approximation formulas, the hydraulic model 821 describes the relationship between the brake pressure p and the volume V enclosed in the wheel brake and the change $\Delta V$ in volume when the inlet or outlet valve is opened for a certain time.

$$p = a*V + b*V^2 \quad \text{F 6.1}$$

$$\Delta V = \pm c * t_{in/out} * \sqrt{\Delta p} \quad \text{F 6.2}$$

The parameters a, b and c are variables which describe the brake system and are stored as values in corresponding memories. P describes the current pressure in the wheel brake. V describes the current volume enclosed in the wheel brake.

$\Delta p$ is measured either across the inlet valve or across the outlet valve; the difference between a pressure source and p is determined in the case of measurement across the inlet valve, while the difference between p and the pressure in a tank, which is usually 1 bar and therefore can be ignored, is determined in the case of measurement across the outlet valve.

If it is assumed that the pressure in the wheel brakes and the enclosed volume can be set to zero at the beginning of a control, the change in volume and, hence, the change in pressure in the individual wheel brakes can be reconstructed by monitoring the valve opening times.

At any rate, it is clear that the formulas shown can describe the actual conditions only very approximately, so that a corresponding correction is necessary. In model 822, the vehicle is described, in general, by a rigid body, which stands on a plane in four contact points (tire contact points).

The body can move in parallel to the plane, i.e., in the x and y directions, and rotate around its center of gravity, with the axis of rotation being at right angles to the plane of movement.

The forces acting on the body are brake forces in the contact surface of the tires and air resistance forces.

The wheel loads $F_{z,v}$ and $F_{z,h}$ which are directed perpendicular to the plane can be calculated based on these considerations as follows:

$$F_{z,v} = \frac{m*g*l_h + h*(-F_{x,v} - F_{x,h})}{l_v + l_h} = \frac{m*g*l_h - h*m*\dot{v}_{ref}}{l_v + l_h} \quad \text{F 6.3a}$$

$$F_{z,h} = \frac{m*g*l_v + h*(-F_{x,v} - F_{x,h})}{l_v + l_h} = \frac{m*g*l_v - h*m*\dot{v}_{ref}}{l_v + l_h} \quad \text{F 6.3b}$$

Such a model is usually sufficient for performing the desired pressure correction. The model can, of course, be refined, if necessary. For the further calculation, the model provides essentially the loads $F_x$ of the tire contact surfaces as a function of the deceleration of the center of gravity. The wheel is considered to be a rotatable disc, which has a certain moment of inertia.

$$\dot{\omega} = \frac{R_{rad}*F_x - M_{Br}}{\Theta} \quad \text{F 6.4}$$

The decelerating torques acting on the wheel are determined linearly from the wheel brake pressure.

$$M_{Br} = C_{Br}*p \quad \text{F 6.5}$$

It is assumed in the tire model that the utilization of the frictional connection, f, namely, the ratio of the braking force to the wheel load, changes linearly with the slip of the wheel.

$$F_x \sim \lambda * F_z \quad \text{F 6.6}$$

The equations given make it possible to calculate the wheel speed of each wheel and the reference velocity of the vehicle model.

These values can be compared with the actual values 811. This is done at the reference point 830.

Taking a correction factor k into account, an additional volume can be determined from the difference between the measured and estimated speeds of each wheel.

This additional pressure medium volume $\Delta V$ is added to the calculated desired volume to obtain the new desired volume, from which a wheel brake pressure, which corresponds to the actual wheel brake pressure relatively accurately, can be derived according to formula F 6.1.

The accuracy of the estimation depends, of course, on the correction factor k, which may have to be determined by experiments in advance.

This factor differs from one vehicle to the next, and it also depends, among other things, on how well the vehicle model describes the actual conditions.

The additional volume may also include a tolerance volume, with which the fact that the volume throughput through the valves is not proportional to the switching times is taken into account. The opening cross section of the valve increases or decreases only slowly during the opening and closing of a valve, so that only a reduced volume will flow during the time intervals in which the actual opening cross section still increases toward or decreases from the full opening cross-section.

7. Substitution of a Yaw Rate Meter

The yaw rate is a particularly distinctive variable for the above-mentioned control, because it is used as a controlled variable, whose deviation $\Delta\dot{\Psi}$ is to be minimized. However, as will be described below, other controlled variables may be advantageously used as well. The following designations will be used in this section for simplification:

$\dot{\Psi} = g_I$ as the measured actual value of the yaw rate, $\ddot{\Psi}_{Meas} = \dot{g}_I$ as the measured actual value of the yaw acceleration, $d/dt \ddot{\Psi}_{Meas} = \ddot{g}_I$ as the measured actual value of the change in yaw acceleration (yaw angle pressure).

This also applies analogously to the desired values according to FIG. 9, which are always marked with the subscript "s."

Figure 12:
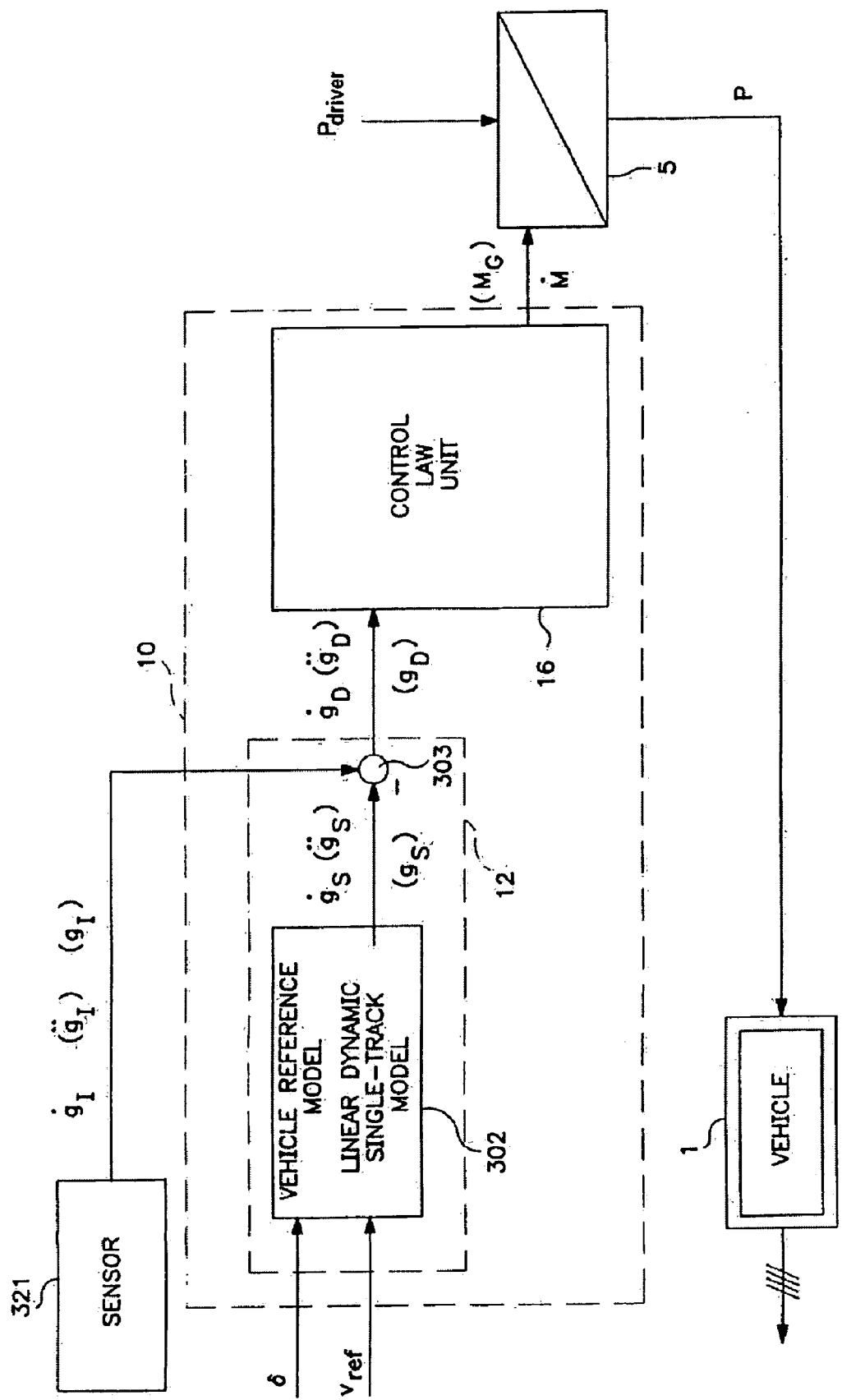
FIGS. 12 to 15 show a block diagram of a control circuit for controlling the driving stability wherein the variables being compared with each other in the comparator represent derivatives of the yaw velocity.

The measured yaw rate in FIG. 12 is usually determined by means of a yaw rate sensor 321, which issues the output signal $g_I$. However, such known yaw rate sensors with direct issuance of the yaw rate are of a rather complicated design and therefore very expensive. This is also true of the downstream comparison unit and the controller belonging to the control circuit. It is therefore desirable in this respect to seek a way out and to offer simpler sensor systems and a controller of a simpler design.

Figure 13:
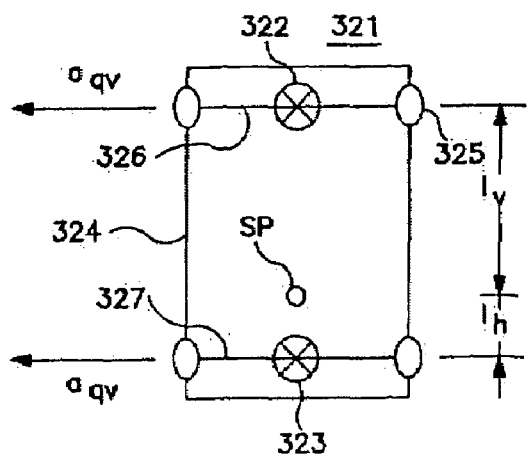

FIG. 13 shows the sketch of the mode of operation of a novel sensor 321, which has a first lateral accelerometer 322 and a second lateral accelerometer 323. The two acceleration meters 322, 323 are arranged on the longitudinal axis of the vehicle above the front axle and the rear axle, respectively. The lateral accelerometers may be arranged, in principle, at any point outside the center of gravity SP, in which case a corresponding conversion is performed.

Figure 15:
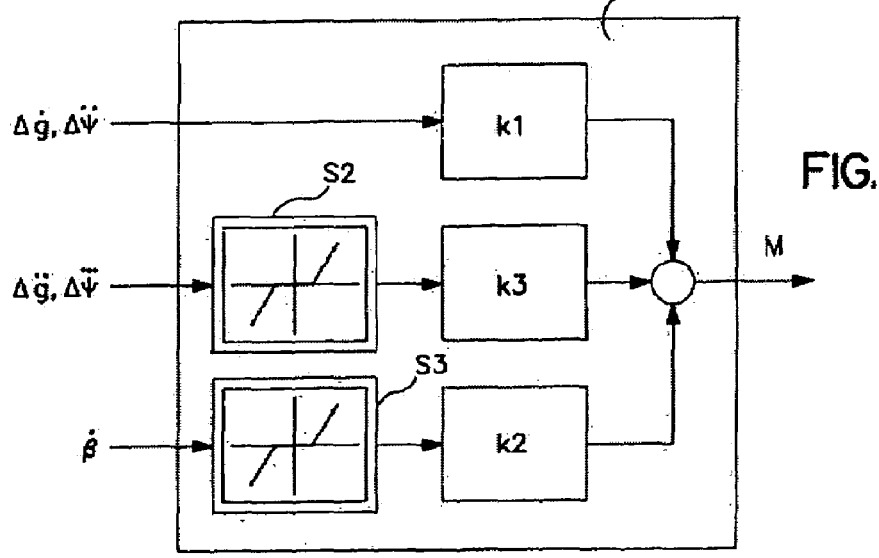

FIG. 15 indicates the rectangular outline 324 of a vehicle with its tires 325 and sensors. Based on this arrangement, the front lateral accelerometer 322 measures the lateral acceleration $a_{qv}$ at the level of the front axle 326, and the rear lateral accelerometer 323 measures the lateral acceleration $a_{qh}$ at the level of the rear axle 327.

The two lateral accelerometers are able to furnish a variable that depends on the yaw rate. It can be shown from mathematical deductions that the yaw acceleration and the lateral acceleration $a_{trans}$ of the center of gravity SP can be determined from the measurement results of the lateral accelerometers as follows:

$$\ddot{\psi} = \frac{a_{qh} - a_{qv}}{l_h + l_v} \qquad \text{F 7.1}$$

$$a_{lat} \approx -\dot{v}_{ref} * \beta - \frac{a_{qh} * l_v + a_{qv} * l_h}{l_h + l_v} \qquad \text{F 7.2}$$

As is apparent from FIG. 13, $l_v$, $l_h$ are the distances between the respective lateral accelerometers 322, 323, on the one hand, and the center of gravity SP, on the other hand, while v is the velocity of the vehicle, and β is the sideslip angle. The yaw acceleration $\dot{g}_I$ can thus be determined from the lateral accelerations and the distances of the acceleration meters 322, 323.

It is therefore proposed that the yaw rate acceleration $\dot{g}_I$ be used instead of the yaw rate proposed in the previous sections, or it is also possible to perform a linear weighting of the individual input values for the comparison unit, similarly to the prior-art condition control. The yaw rate g and the sideslip angle β can be calculated from the yaw angle pressure $\dot{g}_I$ and the velocity of the sideslip angle β by means of a band-limited integration or a first-order, scaled, low-pass filter in order to obtain variables whose dimension corresponds to the output variables of the vehicle reference model 302 (Section 2.3.1.) from sensor 321.

For the band-limited integration:

$$G(z^{-1}) = \frac{\lambda^2 * \frac{T_0}{2} * (1 - z^{-1}) * (1 + z^{-1})}{1 - \lambda * z^{-1}} \qquad \text{F 7.3}$$

applies, while the following dependence is obtained by using a low-pass filter:

$$G(z^{-1}) = \frac{T_1 * (1 - \lambda)}{1 - \lambda * z^{-1}} \qquad \text{F 7.4}$$

The velocity of the sideslip angle is obtained after evaluating the equation $$a_{lat} = v + (\dot{\psi} + \dot{\beta}) \qquad \text{F 7.5}$$

Thus, it is seen that even though a prior-art yaw rate meter can be replaced by using two lateral accelerometers, the measures just described must be taken to transform the yaw acceleration into the yaw rate. However, the measures just described must be taken to transform the yaw acceleration into the yaw rate. After forming Δg and Δġ, the control law unit 16 from FIG. 1 can follow unchanged. The moment $M_G$ thus calculated is additionally converted in the control law unit 16 into a change in moment M by a derivation with respect to time.

Figure 17:
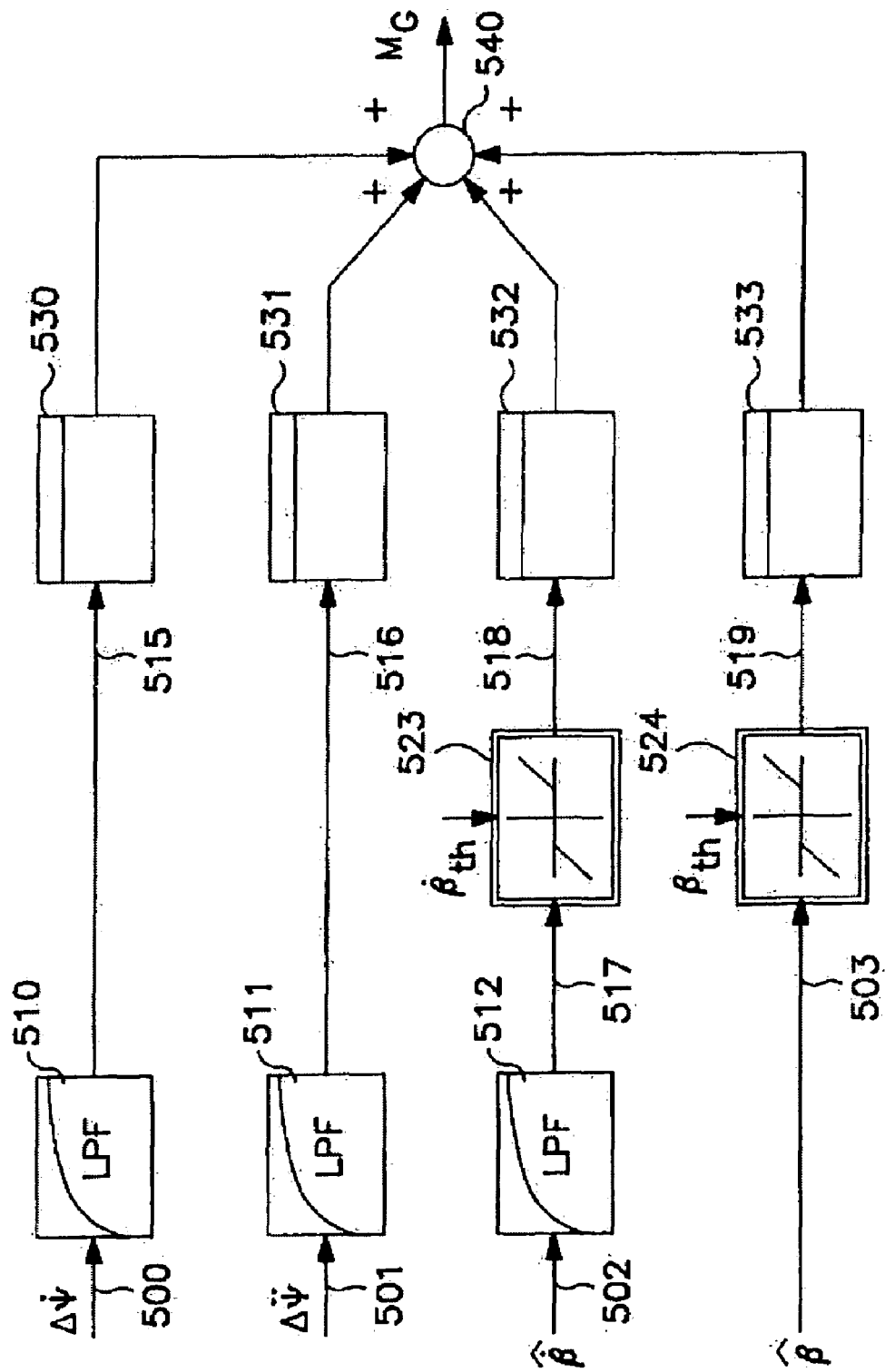
FIG. 17 is a block diagram for describing the controller in order to calculate the additional yaw torque.

However, it is more expedient under certain circumstances to pass over to a nonlinear control according to FIG. 17, in which the yaw acceleration ġ is sent to the comparison unit 303 both as an actual value and as a desired value as a result from the vehicle reference model 302. To do so, corresponding derivatives must be formed within the vehicle reference model.

As a consequence, the deviation of the yaw acceleration Δġ, rather than the yaw rate difference Δg, is present at the output of the comparison unit 303 and is sent as an input variable to the control law unit 16. Furthermore, as is apparent from FIG. 15, the velocity of the sideslip angle β̇ can be additionally sent to the yaw torque control law unit 16 for the more accurate determination of the change in the moment.

Figure 14:
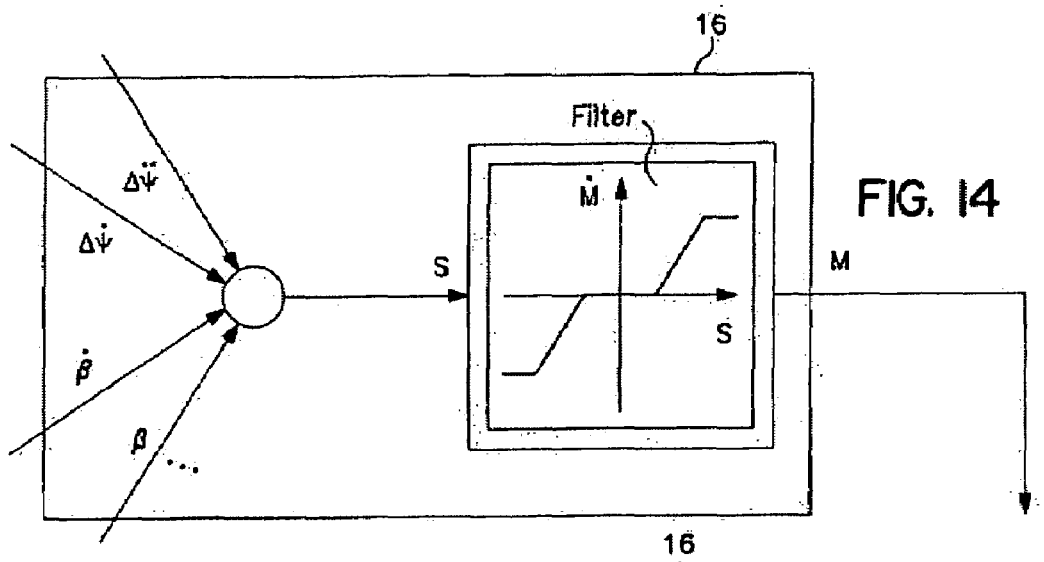

As was mentioned in connection with FIG. 14, it is possible to abandon an additional yaw torque $M_G$ as an output signal of the control law unit 16, and to use the change in moment Ṁ, as the output signal, instead. The change in moment, Ṁ, i.e., the derivative of the additional yaw torque $M_G$, is converted into individual changes in pressure in a modified distribution logic unit. This means that the changes in pressure are distributed among the individual wheel brakes such that the desired additional yaw torque $M_G$ is obtained, on the whole. Details of this will be described below in connection with FIG. 16.

It should be borne in mind that at the same time, there may be a certain pressure distribution in the wheel brakes due to the driver actuating the brake. It is more favorable in this case to determine the moment $M_G$ by integrating the change in moment Ṁ, whereafter the pressure differences that must be brought about with respect to the pressure occurring in every individual wheel brake can be directly determined from the moment $M_G$. The above-described advantageous variant, in which the derivatives of the controlled variables used in Sections 1 through 3 are used, may also be combined with the distribution logic unit according to Section 3. Two control principles are available here; one of them yields an additional yaw torque $M_G$, and the other a change in the additional yaw torque M as a preset value. Switching over between the principles may be provided for. Switching over to the respectively other control principle must be performed especially when the other calculation of additional controlled variables (sideslip angle, etc.) according to one principle cannot be performed with sufficient accuracy (cf., e.g., Section 2.2.2.). It should also be noted that Δġ can also be sent as a correcting variable to the control law unit 16 according to FIG. 15, in addition to Δġ.

Besides adapting amplifiers k1, k2, k3, two threshold value switches S2, S3 are shown in the control law unit 16 according to FIG. 15; these threshold value switches are to improve the control behavior within the control law unit 16 and to optimally adapt the influence of the introduced variables to the ideal control behavior as a function of the velocity. The amplifiers k1 through k3 have a comparable task. The individual values are then added in an adder and sent as an output signal to the YTC controller 10. General explanations with respect to the control law unit which apply here can be found in Section 2.4.

How the pressure preset values at the output of the controllers 7, 8, 9 are linked with the pressure preset value of a distribution logic unit 2 in a priority circuit 3 was shown in connection with FIG. 1. The use of pressure preset values always requires a corresponding prior conversion in the devices that issue these preset values. The effort involved in the exchange of information between the program modules of the control circuit can be simplified by the measures described below.

Figure 16:
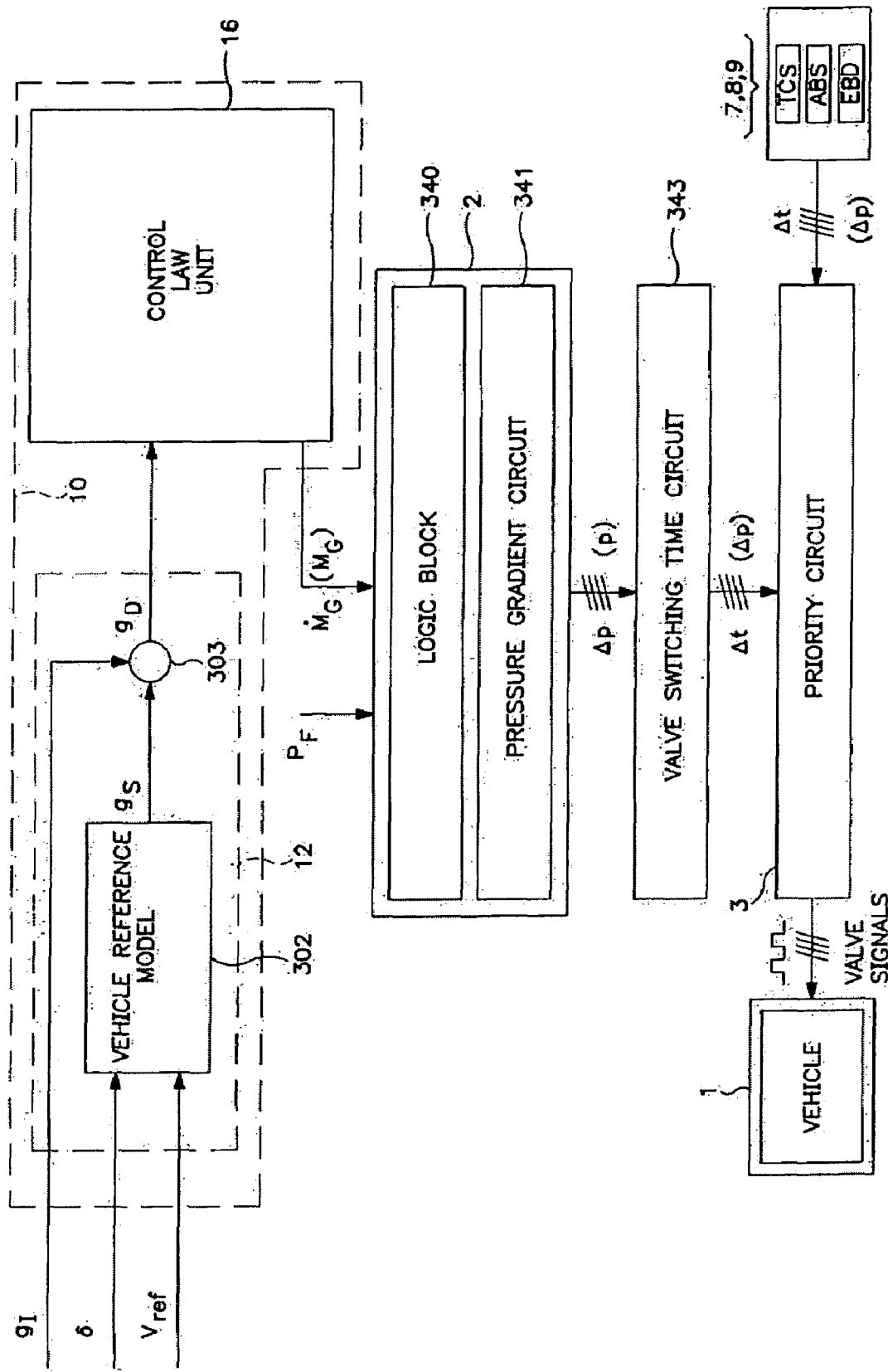
FIG. 16 is a control circuit for determining the driving stability wherein the pressure gradient and/or the valve on/off time of the vehicle brakes is employed as a regulating variable.

The control circuit for controlling the driving stability according to FIGS. 9 and 14 is shown in an even more simplified form in FIG. 16; the designations introduced there are maintained.

The YTC controller 10 according to FIG. 1 is modified here inasmuch as the change M in the additional yaw torque $M_G$, which is sent to the distribution logic unit 2 together with the pressure distribution on the brakes desired by the driver (desire to brake), is present at the output. FIG. 12 is referred to for the calculation of $\dot{M}$.

The distribution logic unit 2 has a logic block 340 and a pressure gradient circuit 341. The essential task of the logic block 340 is to ensure that despite the intervention of the driving stability control, the vehicle as a whole is not braked more strongly than is desired by the driver by presetting a pressure signal at the input of the distribution logic unit 2. This is to prevent instabilities from being additionally introduced by the driving stability control system. Consequently, when a brake pressure is provided on a wheel based on the driver's desire to brake, and, on the other hand, a pressure build-up on one or two wheels is required by way of the DSC controller and a reduction in pressure on the opposite wheels is required in order to reach the additional yaw torque, there may be mutually contradictory requirements with respect to the individual wheels, namely, a pressure build-up with a simultaneous reduction in pressure. Regarding other wheels, it may be required to increase the pressure not only based on the driver's desire to brake, but at the same time also based on the stability control. The logic block ensures that the brake pressure is first reduced in the corresponding wheels, after which an increase in brake pressure beyond the driver's desire up to a certain limit value can take place. It is thus ensured that the average brake force will not become greater, considering all wheels and taking the additional torque brought about by the DSC control into account, than that desired by the driver.

As was explained in Section 3.2., a specific increase in the longitudinal slip λ on one wheel can be used to reduce the lateral forces, while the brake force is preserved in the longitudinal direction. Consequently, a yaw torque can thus be generated without the deceleration of the vehicle decreasing.

The changes in pressure $\Delta P_{xx}$ on the individual wheels xx are calculated in the pressure gradient circuit 341 of the distribution logic unit 2 on the basis of predetermined constants $c_{xx}$ and the change in moment $\dot{M}$, and the difference between the brake pressure desired by the driver, $P_{Brake}$, and the brake pressure actually measured, $P_{xxist}$, is also included in the calculation. Thus, the following equation applies $$\Delta P_{xx} = \pm \frac{d_{xx} * \dot{M}}{\sum c_{xx}^2} + g_l * (P_{Brake} - P_{xxist})  \qquad \text{F 7.6}$$

and $$xx \in [vr, vl, hr, hl]$$

and $g_l$ = proportionally factor.

The actual brake pressure $P_{xxist}$ is determined either by a pressure gauge at the corresponding wheel, or it is calculated by way of a brake model, which follows the changes in pressure specified for the wheel and is therefore an image of the pressure occurring on the wheel (Section 6).

The pressure requirements calculated are sent to a priority circuit 3 and they are evaluated there (See section 4, above).

The above description presupposes that pressure gradients were directly processed in the priority circuit. However, this is not necessary. It is also possible to process valve switching times $\Delta t$ in the priority circuit 3 (Section 5). However, a valve switching time circuit 343 must be inserted in this case between the distribution logic unit 2 and the priority circuit 3, and valve switching times $\Delta t$ will be sent by the other controllers 7, 8, 9 as well. The priority circuit now processes the valve switching times $\Delta t$ entered according to a corresponding scheme, as was described in Section 4 for the brake pressures. The output variables of the priority circuit are valve switching times. The required changes in pressure $\Delta t_{xx}$ of the individual wheels xx are converted into valve switching times $\Delta p$ according to the equation $$S_{xx} = Kr p_{xxist} \cdot \Delta p_{xx} \qquad \text{F 7.7}$$

Here, $Kr_{xx}$ is a gain factor that depends on the actual pressure of the individual wheels and is calculated during pressure build-up according to the following rule:

$$Kr_{xx}(P_{xxist}) = \frac{1}{Dv_{up} * T_0 * \sqrt{a^2 + 4} * b * P_{xxist} * \sqrt{160 - P_{xxist}}} \qquad \text{F 7.8}$$

while $$Kr_{xx}(P_{xxist}) = \frac{1}{Dv_{down} * T_0 * \sqrt{a^2 + 4} * b * P_{xxist} * \sqrt{P_{xxist}}} \qquad \text{F 7.9}$$

applies to a reduction in pressure. Here, xx is again a subscript indicating the position of the individual wheels.

What is claimed is:

1. A driving situation detection system for observing and analyzing driving situations of a vehicle, at least including the situations of straight travel and cornering,
    wherein the system is capable of observing and analyzing driving situations with almost steady-state courses of the vehicle at a steering angle velocity of lower than, or equal to, 120°/s, wherein the system is designed as a state machine capable of detecting at least one of the states which are members of the group consisting of straight travel with partial braking, cornering with partial braking, and cornering with a change of load; and wherein the system is capable of activating a controller depending on the states which reflect a course deviation,
    the detection system being connected to a reference signal model in which a YTC reference variable with an offset is corrected by means of an offset value, wherein the driving situation detection system determines the time at which the offset correction is started and terminated, and the offset value is superposed on the reference variable at the starting point.

* * * * *